United States Patent
Taki et al.

(10) Patent No.: US 7,401,231 B2
(45) Date of Patent: Jul. 15, 2008

(54) INFORMATION RECORDING/PLAYBACK DEVICE AND METHOD

(75) Inventors: Ryuta Taki, Kanagawa (JP); Tomoyuki Asano, Kanagawa (JP); Tateo Oishi, Saitama (JP); Yoshitomo Osawa, Kanagawa (JP)

(73) Assignee: Sony Corporation (JP)

( * ) Notice: Subject to any disclaimer, the term of this patent is extended or adjusted under 35 U.S.C. 154(b) by 749 days.

(21) Appl. No.: 10/221,302

(22) PCT Filed: Jan. 11, 2002

(86) PCT No.: PCT/JP02/00119

§ 371 (c)(1),
(2), (4) Date: Apr. 15, 2003

(87) PCT Pub. No.: WO02/056535

PCT Pub. Date: Jul. 18, 2002

(65) Prior Publication Data

US 2003/0159037 A1    Aug. 21, 2003

(30) Foreign Application Priority Data

Jan. 16, 2001    (JP)    ................................ 2001-7238

(51) Int. Cl.
*G06F 11/30*    (2006.01)
*G06F 12/14*    (2006.01)
*H04L 9/32*    (2006.01)

(52) U.S. Cl. .................. 713/193; 713/168; 360/281
(58) Field of Classification Search ............. 713/193, 713/168; 380/281
See application file for complete search history.

(56) References Cited

U.S. PATENT DOCUMENTS

| 5,406,624 | A | * | 4/1995 | Tulpan ....................... 713/192 |
| 5,757,919 | A |   | 5/1998 | Herbert et al. |
| 5,892,900 | A | * | 4/1999 | Ginter et al. .................. 726/26 |

(Continued)

FOREIGN PATENT DOCUMENTS

| EP | 1 059 632 A1 | 12/2000 |
| EP | 1 076 332 A1 | 2/2001 |
| JP | 11-187013 A1 | 7/1999 |
| JP | 2000-76141 A1 | 3/2000 |
| JP | 2000-242929 A1 | 9/2000 |
| JP | 2000-330870 A1 | 11/2000 |
| WO | WO-98/33296 | 7/1998 |

OTHER PUBLICATIONS

Menezes, A.J., et al., Handbook of Applied Cryptography, CRC Press, 1997, pp. 352 to 354.

(Continued)

*Primary Examiner*—Nasser Moazzami
*Assistant Examiner*—David García Cervetti
(74) *Attorney, Agent, or Firm*—Lerner, David, Littenberg, Krumholz & Mentlik, LLP

(57) ABSTRACT

A system and method are realized which enables valid use of content by preventing unauthorized use of content which is caused by rewriting rights data. A structure is employed in which rights data including use-restriction information on content and DRM data including an encrypted content key are recorded in a digital data recording medium (media), and in which an integrity check value (ICV) for the DRM data can be stored in a recordable/playable area (protected area) by using only a dedicated IC. EKB distribution is used to execute the tree-structure key distribution to distribute keys for generating ICV-generation verifying keys. In this structure, unauthorized use of content by rewriting of the rights data is prevented.

68 Claims, 35 Drawing Sheets

U.S. PATENT DOCUMENTS

| | | | | |
|---|---|---|---|---|
| 5,910,987 | A * | 6/1999 | Ginter et al. | 705/52 |
| 5,915,018 | A * | 6/1999 | Aucsmith | 380/201 |
| 6,049,878 | A * | 4/2000 | Caronni et al. | 726/3 |
| 6,188,659 | B1 * | 2/2001 | Mueller et al. | 369/59.24 |
| 6,253,193 | B1 * | 6/2001 | Ginter et al. | 705/57 |
| 6,253,281 | B1 * | 6/2001 | Hall | 711/112 |
| 6,341,328 | B1 * | 1/2002 | Heer | 711/112 |
| 6,438,235 | B2 * | 8/2002 | Sims, III | 380/285 |
| 6,609,116 | B1 * | 8/2003 | Lotspiech | 705/57 |
| 6,654,820 | B1 * | 11/2003 | Ishibashi et al. | 710/34 |
| 6,708,274 | B2 * | 3/2004 | Herbert et al. | 713/190 |
| 6,748,539 | B1 * | 6/2004 | Lotspiech | 726/20 |
| 6,782,190 | B1 * | 8/2004 | Morito | 386/94 |
| 6,804,453 | B1 * | 10/2004 | Sasamoto et al. | 386/94 |
| 6,832,319 | B1 * | 12/2004 | Bell et al. | 713/193 |
| 6,880,081 | B1 * | 4/2005 | Itkis | 713/163 |
| 6,883,097 | B1 * | 4/2005 | Lotspiech et al. | 713/193 |
| 6,938,162 | B1 * | 8/2005 | Nagai et al. | 713/189 |
| 6,993,135 | B2 * | 1/2006 | Ishibashi | 380/277 |
| 6,993,508 | B1 * | 1/2006 | Major et al. | 705/51 |
| 7,007,162 | B1 * | 2/2006 | Lotspiech | 713/151 |
| 7,016,493 | B2 * | 3/2006 | Henson et al. | 380/44 |
| 7,039,803 | B2 * | 5/2006 | Lotspiech et al. | 713/163 |
| 7,080,249 | B1 * | 7/2006 | Jakubowski et al. | 713/165 |
| 2001/0008016 | A1 * | 7/2001 | Kotani et al. | 713/193 |
| 2001/0021255 | A1 * | 9/2001 | Ishibashi | 380/277 |
| 2001/0042043 | A1 * | 11/2001 | Shear et al. | 705/51 |
| 2001/0046298 | A1 * | 11/2001 | Terada et al. | 380/252 |
| 2002/0023219 | A1 * | 2/2002 | Treffers et al. | 713/176 |
| 2002/0099946 | A1 * | 7/2002 | Herbert et al. | 713/193 |
| 2002/0159592 | A1 * | 10/2002 | Matsushima et al. | 380/201 |
| 2004/0156503 | A1 * | 8/2004 | Bell et al. | 380/44 |

OTHER PUBLICATIONS

International Standard—ISO/IEC 9797-1, "Information Technology — Security Techniques—Message Authentication Codes (MACS)—Part 1: Mechanisms Using a Block Cipher", Dec. 15, 1999, pp. 1-15.

* cited by examiner

FIG. 5

(A) ENABLING KEY BLOCK (EKB)    EXAMPLE 1

SEND NODE KEY IN WHICH VERSION: t TO DEVICES 0, 1, AND 2

| VERSION: t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

(B) ENABLING KEY BLOCK (EKB)    EXAMPLE 2

SEND NODE KEY IN WHICH VERSION: t TO DEVICES 0, 1, AND 2

| VERSION: t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

USER AREA:
| EKB1 | CONTENT 1 [EKB1] |
| EKB2 | CONTENT 2 [EKB2] |
| EKB3 | CONTENT 3 [EKB3] |

PROTECTED AREA:
| ICV1 [ICV Key1, EKB1] | ICV Key1 |
| ICV2 [ICV Key2, EKB2] | ICV Key2 |
| ICV3 [ICV Key3, EKB3] | ICV Key3 |

(A')

USER AREA:
| EKB1: POINTER TO EKB1 | CONTENT 1 [EKB1] |
| EKB2: POINTER TO EKB1 | CONTENT 2 [EKB2] |
| EKB3: POINTER TO EKB1 | CONTENT 3 [EKB3] |
| EKB1 | |

PROTECTED AREA:
| ICV1 [ICV Key1, EKB1] | ICV Key1 |
| ICV2 [ICV Key2, EKB2] | ICV Key2 |
| ICV3 [ICV Key3, EKB3] | ICV Key3 |

INFORMATION RECORDING/PLAYBACK DEVICE AND METHOD

TECHNICAL FIELD

The present invention relates to information recording devices, information playback devices, information recording methods, information playback methods, information recording media, and program storage media, and in particular, to a device and method that can appropriately execute processing for using digital content data to which limitation of usage is added. In particular, the present invention relates to an information recording device, an information playback device, an information recording method, an information playback method, an information recording medium, and a program storage medium in which, by using a tree-structure hierarchical key distribution method to provide an enabling key block (EKB) key, and using the EKB key to generate an integrity check value (ICV) for digital rights management (DRM) data, authorized use of content can be performed.

BACKGROUND ART

At present, digital-data recordable media, such as digital audio tapes (DATs), compact discs (CDs), and digital video discs (DVDs), are distributed, and various types of content such as music data and picture data are recorded as digital data in the media and are widely distributed.

Such digital data differs from analog data, and is free from data deterioration due to data copying between recording media. If copying is limitlessly permitted, there is a possibility that the rights of a content-copyright holder and other content-related-right holders may be violated. For protecting the right of the digital data, there is the SCMS (Serial Copy Management System) as a copyright protection technology.

The SCMS (Serial Copy Management System) is a digital-data-copying restriction system. It allows only-one-generation (1-Generation) copying, and prohibits digital copying for two or more generations. Specifically, by recording, in digital-data-recorded media, a code representing copying only once, restriction of copying is performed based on the code.

Nevertheless, in one-generation copying control using the SCMS, based on the recorded code in the media which represents copying only once, that is, the bit state, it is determined whether or not copying is allowed. Accordingly, by using a device that can freely operate the bit, rewriting of the code is made possible, and many copies identical to the original data can be made. Therefore, in particular, PC-used (personal computer-used) copying of digital data such as CDs, which is free from restrictions of law, is actually free.

In addition, for systems for the purpose of protecting copyright that records/plays back content such as pictures and music, a system has been proposed in which content is encrypted and provided to a user and in which a key for decryption is provided to a normal user.

By way of example, there is a system configuration in which various types of content, such as music data, picture data, and game programs which are encrypted, are distributed to users by using the Internet or media such as CDs and DVDs and in which only a person identified as a normal user is provided with a means for decrypting the encrypted content, that is, a decryption key.

The encrypted data can be returned to usable decrypted data (plaintext) by decryption processing based on a predetermined procedure. Such a data encryption/decryption method is conventionally known in which an encryption key is used for information-encrypting processing and a decryption key is used for decrypting processing.

Among various types of examples of data encryption/decryption methods using an encryption key and a decryption key, there is a method as an example that is a so-called a common key cryptosystem. In the common key cryptosystem, by setting an encryption key for data-encrypting processing and a decryption key for data decryption to be common, and providing a normal user with a common key for the encryption processing and decryption, data accessing by a user having no key is excluded. A typical of this system is the DES (Data encryption standard)

The encryption key and the decryption key for the above encryption processing and decryption can be obtained by using a unidirectional function, such as the Hash function, based on, for example, a password or the like. The unidirectional function is a function in which reverse finding of its input from its output is very difficult. For example, by using a user-decided password as an input in an application of the unidirectional function, an encryption key and a decryption key are generated based on the output. It is substantially impossible to perform reverse finding of the password as the original data from the encryption key and the decryption key obtained as described above.

A system in which a process using the encryption key for use in encryption and a process using the decryption key for use in decryption have different algorithms is a so-called public key cryptosystem. The public key cryptosystem is a system in which unspecified users use an usable public key, and an encrypted document for a specified person is encryption-processed by using a public key issued by the specified person. The document encrypted by the public key becomes able to be decryption-processed by using only a secret key corresponding to the public key used in the encryption process. Since a secret key is possessed by a person who issues a public key, a document encrypted by the public key can be decrypted by only the person who possesses the secret key. One typical public key cryptosystem is the RSA (Rivest-Shamir-Adelman) cryptography. Use of such a cryptosystem enables a system in which encrypted content can be decrypted only for a normal user.

In this system, for example, a 2-bit EMI (Encryption Mode Indicator) is defined as copy control information. When the EMI is 00B (B indicates that the value before it is a binary number), it indicates that content is of a Copy-freely type, and when the EMI is 01B, it indicates that content is of a No-more-copies type in which the content may further not be copied. When the EMI is 10B, it indicates that content is of a Copy-one-generation type in which copying only once is allowed, and when the EMI is 11B, it indicates that content is a Copy-never type in which copying is prohibited.

When the EMI represents the Copy-freely or Copy-one-generation type, it is determined that content can be copied. Alternatively, when the EMI represents the No-more-copies or Copy-never type, it is determined that content cannot be copied. If management of the copy rule information is appropriately executed, copyright protection is realized.

However, even in the content providing system using encryption, if information on copying rules which is recorded on a medium such as a CD or a DVD is rewritten by an invalid user, a problem occurs in that copying ignoring the original copying rules becomes executable.

DISCLOSURE OF INVENTION

It is an object of the present invention to provide an information recording device, an information playback device, an information recording method, an information playback method, an information recording medium, and a program storage medium which exclude invalid use of content in execution of the above data copying or data playback, and which enable only valid use of content by a valid user.

According to a first aspect of the present invention, there is an information recording device for executing data-recording processing to a recording medium, in which the information recording device comprises:

encryption-processing means which generates encrypted content by executing a process for encrypting content to be stored in the recording medium and which generates an integrity check value (ICV) for digital-rights-management (DRM) data on content including use-restriction information on content; and a dedicated secret-information recording circuit which is used for a process for recording the integrity check value (ICV) on a physically protected area on the recording medium and which is not used for a process for recording the encrypted content.

In an embodiment of the information recording device of the present invention, the digital-rights-management (DRM) data includes information on use of the content, an encrypted content key obtained by encrypting a content key serving as a content encryption key, and a content identifier (ID).

In an embodiment of the information recording device of the present invention, the dedicated secret-information recording circuit has a structure in which a process for recording the integrity check value (ICV) in the physically protected area on the recording medium is executed by using signal processing different from the signal processing used for a method for recording the content.

In an embodiment of the information recording device of the present invention, the dedicated secret-information recording circuit has a structure in which a process for recording the integrity check value (ICV) in the physically protected area on the recording medium is executed by using signal processing different from the signal processing used for a method for recording the content, and the dedicated secret-information recording circuit has a structure which executes a process for recording secret information, which includes the integrity check value (ICV), in a recording area superimposed on a recording area on a recording medium for content corresponding to the secret information.

In an embodiment of the information recording device of the present invention, the dedicated secret-information recording circuit has a structure which executes the process for recording the integrity check value (ICV) in the physically protected area on the recording medium when the physically protected area is formed separately from a recording area for the content.

In an embodiment of the information recording device of the present invention, the dedicated secret-information recording circuit has a structure which executes the process of recording, in the physically protected area on the recording medium, both the integrity check value (ICV) for the digital-rights-management (DRM) data on the content, and an ICV key used for generating an ICV-generation verifying key for verifying the generation of the ICV.

In an embodiment of the information recording device of the present invention, the encryption-processing means has a structure in which the process for generating the integrity check value (ICV) for the digital-rights-management (DRM) data is executed as a message-authentication-code (MAC) generating process in which DES encryption processing is used.

In an embodiment of the information recording device of the present invention, the information recording device possesses, in a hierarchical tree structure having a plurality of different information recording devices serving as leaves, different key sets of node keys unique to nodes and leaf keys unique to the information recording devices, and the encryption-processing means has a structure in which, by using an enabling key block (EKB) key acquired by decrypting an EKB which can be decrypted only by a selected information recording device included in the leaves in the hierarchical tree structure, a process for generating an ICV key used for generating the integrity check value (ICV) for the digital-rights-management (DRM) data is executed.

In an embodiment of the information recording device of the present invention, the encryption-processing means has a structure in which, from a usable enabling key block (EKB) stored in one information recording device, and an enabling key block (EKB) stored in a recording medium for content storage, an EKB having a newer version is selected and an EKB key is acquired.

In an embodiment of the information recording device of the present invention, the encryption-processing means has a structure in which, by using the EKB key acquired by the process of decrypting the enabling key block (EKB), encryption on a content key, serving as an encrypted key for the content, is executed.

In an embodiment of the information recording device of the present invention, the encryption-processing means has a structure in which, in the process of recording the content in the recording medium, when an integrity check value (ICV) for digital-rights-management (DRM) data corresponding to the content is added, a process for verifying the ICV is executed, and on condition that it is verified that there is no falsification of the digital-rights-management (DRM) data, processing associated with the process of recording the content in the recording medium is executed.

In an embodiment of the information recording device of the present invention, the encryption-processing means has a structure in which, in the process of recording the content in the recording medium, when the content is transmitted from another device, processing associated with the process of recording the content in the recording medium is executed on condition that mutual authentication with the device is established.

In an embodiment of the information recording device of the present invention, the encryption-processing means has a structure in which, in the process of recording the content in the recording medium, when updating of the digital-rights-management (DRM) data is executed, an integrity check value (ICV) based on the updated digital-rights-management (DRM) data is generated, and in the recording medium, the integrity check value (ICV) based on the updated digital-rights-management (DRM) data is recorded.

In an embodiment of the information recording device of the present invention, in the case of the updated integrity check value (ICV), a process for overwriting the integrity check value (ICV) is executed before the updating.

In an embodiment of the information recording device of the present invention, in the case of the updated integrity check value (ICV), a process for recording to an area different from the recording area of the integrity check value (ICV) is executed before the updating.

According to a second aspect of the present invention, there is provided an information playback device for executing data-playback processing from a recording medium, in which the information playback device comprises:

cryptosystem-processing means which executes a process for decrypting content stored in the recording medium and which executes verification of an integrity check value (ICV) for digital-rights-management data (DRM) on content including use-restriction information on content; and a dedicated secret-information playback circuit which is used for a process for playing back the integrity check value (ICV) from a physically protected area on the recording medium and which is not used for a process for playing back the encrypted content.

In an embodiment of the information playback device of the present invention, the digital-rights-management (DRM) data includes information on use of the content, an encrypted content key obtained by encrypting a content key serving as a content encryption key, and a content identifier (ID).

In an embodiment of the information playback device of the present invention, the dedicated secret-information playback circuit has a structure in which a process for playing back the integrity check value (ICV) from the physically protected area on the recording medium is executed by using signal processing different from signal processing used for a method of playing back the content.

In an embodiment of the information playback device of the present invention, the dedicated secret-information playback circuit has a structure in which a process for playing back the integrity check value (ICV) from the physically protected area on the recording medium is executed by using signal processing different from signal processing used for a method of playing back the content, and the dedicated secret-information playback circuit has a structure which executes a process for playing back secret information, which includes the integrity check value (ICV), from a recording area superimposed on a recording area on a recording medium for content corresponding to the secret information.

In an embodiment of the information playback device of the present invention, the dedicated secret-information playback circuit has a structure which executes the process for playing back the integrity check value (ICV) from the physically protected area on the recording medium when the physically protected area is formed separately from a recording area for the content.

In an embodiment of the information playback device of the present invention, the dedicated secret-information playback circuit has a structure which executes the process of playing back the integrity check value (ICV) for the digital-rights-management (DRM) data on the content and an ICV key used for generating an ICV-generation verifying key for verifying the generation of the ICV from the physically protected area on the recording medium.

In an embodiment of the information playback device of the present invention, the verifying processing on the integrity check value (ICV) for the digital-rights-management (DRM) data is executed as processing in which a message authentication code (MAC) in which DES encryption processing is used for the played back digital-rights-management (DRM) and is compared with a recorded ICV.

In an embodiment of the information playback device of the present invention, the information playback device possesses, in a hierarchical tree structure having a plurality of different information recording devices serving as leaves, different key sets of node keys unique to nodes and leaf keys unique to the information recording devices, and the cryptosystem-processing means has a structure in which, by using an enabling key block (EKB) key acquired by decrypting an EKB which can be decrypted only by a selected information playback device included in the leaves in the hierarchical tree structure, a process for generating an ICV key used for generating the integrity check value (ICV) for the digital-rights-management (DRM) data is executed.

In an embodiment of the information playback device of the present invention, the cryptosystem-processing means has a structure in which the EKB key is acquired by selecting an enabling key block (EKB) correlated with content stored in the recording medium storing the content.

In an embodiment of the information playback device of the present invention, the cryptosystem-processing means has a structure in which decryption of the content key, serving as an encrypted key for the content, is executed by using the EKB key acquired by the process for decrypting the enabling key block (EKB).

In an embodiment of the information playback device of the present invention, the cryptosystem-processing means has a structure in which, in the process for playing back the content from the recording medium, the verifying processing on the integrity check value (ICV) for the digital-rights-management (DRM) data corresponding to the content is executed, and on condition that it is verified that there is no falsification of the digital-rights-management (DRM) data, processing associated with the process of playing back the content from the recording medium is executed.

In an embodiment of the information playback device of the present invention, the cryptosystem-processing means has a structure in which, in the process of playing back the content from the recording medium, when the content is transmitted from another device, processing associated with the process of transmitting the content in the recording medium is executed on condition that mutual authentication with the device is established.

In an embodiment of the information playback device of the present invention, in the process of playing back the content from the recording medium, when updating of the digital-rights-management (DRM) data is executed, the cryptosystem-processing means generates an integrity check value (ICV) based on the updated digital-rights-management (DRM) data, and records in the recording medium the integrity check value (ICV) based on the updated digital-rights-management (DRM) data.

In an embodiment of the information playback device of the present invention, in the case of the updated integrity check value (ICV), a process for overwriting the integrity check value (ICV) is executed before the updating.

In an embodiment of the information playback device of the present invention, in the case of the updated integrity check value (ICV), a process for recording to an area different from the recording area of the integrity check value (ICV) is executed before the updating.

According to a third aspect of the present invention, there is provided an information recording medium on which content data capable of being played back is recorded, wherein an integrity check value (ICV) for digital-rights-management (DRM) data on content including use-restriction information on content is stored in a physically protected area on the recording medium.

In an embodiment of the information recording medium of the present invention, the digital-rights-management (DRM) data includes information on use of the content, an encrypted content key obtained by encrypting a content key serving as a content encryption key, and a content identifier (ID).

In an embodiment of the information recording medium of the present invention, the physically protected area has a structure based on a data recording area for which signal processing different from signal processing used for a method for recording the content is used.

In an embodiment of the information recording medium of the present invention, the physically protected area is a data recording area for which signal processing different from signal processing used for a method for recording the content is used, and is an area superimposed on a recording area on a recording medium for the corresponding content.

In an embodiment of the information recording medium of the present invention, the physically protected area is provided separately from a recording area for the content.

In an embodiment of the information recording medium of the present invention, in the physically protected area, both an integrity check value (ICV) for digital-rights-management (DRM) data of the content, and an ICV key used for generating an ICV-generation verifying key for verifying the generation of the ICV are stored.

According to a fourth aspect of the present invention, there is provided an information recording method for executing data recording processing to a recording medium, in which the information recording method comprises:

an encryption-processing step which generates encrypted content by executing a process for encrypting content to be stored in the recording medium and which generates an integrity check value (ICV) for digital-rights-management (DRM) data on content including use-restriction information on content; and a secret-information recording step which, by using a dedicated secret-information recording circuit, executes a process for recording the integrity check value (ICV) in a physically protected area on the recording medium.

In an embodiment of the information recording method of the present invention, the digital-rights-management (DRM) data includes information on use of the content, an encrypted content key obtained by encrypting a content key serving as a content encryption key, and a content identifier (ID).

In an embodiment of the information recording method of the present invention, by using the dedicated secret-information recording circuit, signal processing different from signal processing used for a method for recording the content is used to execute a process for recording of the integrity check value (ICV) in the physically protected area on the recording medium.

In an embodiment of the information recording method of the present invention, in the secret-information recording step, by using the dedicated secret-information recording circuit, signal processing different from signal processing used for a method for recording the content is used to execute a process for recording of the integrity check value (ICV) in the physically protected area on the recording medium, and the dedicated secret-information recording circuit is used to execute a process for recording secret information including the integrity check value (ICV) in an area superimposed on a recording area on a recording medium for the corresponding content.

In an embodiment of the information recording method of the present invention, in the secret-information recording step, the dedicated secret-information recording circuit is used to execute a process for recording the integrity check value (ICV) in the physically protected area on the recording medium which is provided separately from a recording area for the content.

In an embodiment of the information recording method of the present invention, in the secret-information recording step, the dedicated secret-information recording circuit is used to execute a process for recording, in the physically protected area on the recording medium, both the integrity check value (ICV) for the digital-rights-management (DRM) data on the content, and an ICV key used for generating an ICV-generation verifying key for verifying the generation of the ICV.

In an embodiment of the information recording method of the present invention, in the encryption-processing step, the process for generating the integrity check value (ICV) for the digital-rights-management (DRM) data is executed as a message-authentication-code (MAC) generating process in which DES encryption processing is used.

In an embodiment of the information recording method of the present invention, an information recording device possesses, in a hierarchical tree structure having a plurality of different information recording devices serving as leaves, different key sets of node keys unique to nodes and leaf keys unique to the information recording devices, and in the encryption-processing step, by using an enabling key block (EKB) key acquired by decrypting an EKB which can be decrypted only by a selected information recording device included in the leaves in the hierarchical tree structure, a process for generating an ICV key used for generating the integrity check value (ICV) for the digital-rights-management (DRM) data is executed.

In an embodiment of the information recording method of the present invention, the encryption-processing step further comprises a step in which, from a usable enabling key block (EKB) stored in one information recording device, and an enabling key block (EKB) stored in a recording medium for content storage, an EKB having a newer version is selected and an EKB key is acquired.

In an embodiment of the information recording method of the present invention, the encryption-processing step further comprises a step in which, by using the EKB key acquired by the process of decrypting the enabling key block (EKB), encryption on a content key, serving as an encrypted key for the content, is executed.

In an embodiment of the information recording method of the present invention, in the encryption-processing step, in the process of recording the content in the recording medium, when an integrity check value (ICV) for digital-rights-management (DRM) data corresponding to the content is added, a process for verifying the ICV is executed, and on condition that it is verified that there is no falsification of the digital-rights-management (DRM) data, processing associated with the process of recording the content in the recording medium is executed.

In an embodiment of the information recording method of the present invention, in the process of recording the content in the recording medium, when the content is transmitted from another device, processing associated with the process of recording the content in the recording medium is executed on condition that mutual authentication with the device is established.

In an embodiment of the information recording method of the present invention, the information recording method further comprises a step in which, in the process of recording the content in the recording medium, when updating of the digital-rights-management (DRM) data is executed, the encryption-processing means generates an integrity check value (ICV) based on the updated digital-rights-management (DRM) data, and records in the recording medium the integrity check value (ICV) based on the updated digital-rights-management (DRM) data.

In an embodiment of the information recording method of the present invention, in the case of the updated integrity check value (ICV), a process for overwriting the integrity check value (ICV) is executed before the updating.

In an embodiment of the information recording method of the present invention, in the case of the updated integrity check value (ICV), a process for recording to an area different from the recording area of the integrity check value (ICV) is executed before the updating.

According to a fifth embodiment of the present invention, there is provided an information playback method for executing data-playback processing from a recording medium, in which the information playback device comprises:

a cryptosystem-processing step which executes a process for decrypting content stored in the recording medium and which executes verification of an integrity check value (ICV) for digital-rights-management data (DRM) on content including use-restriction information on content; and a secret information playback step which, by using a dedicated secret-information playback circuit, executes a process for playing back the integrity check value (ICV) from a physically protected area on the recording medium.

In an embodiment of the information playback method of the present invention, the digital-rights-management (DRM) data includes information on use of the content, an encrypted content key obtained by encrypting a content key serving as a content encryption key, and a content identifier (ID).

In an embodiment of the information playback method of the present invention, by using the dedicated secret-information playback circuit, a process for playing back the integrity check value (ICV) from the physically protected area on the recording medium is executed by using signal processing different from signal processing used for a method of playing back the content.

In an embodiment of the information playback method of the present invention, in the secret information playback step, by using the dedicated secret-information playback circuit, a process for playing back the integrity check value (ICV) from the physically protected area on the recording medium is executed by using signal processing different from signal processing used for a method of playing back the content, and by using the dedicated secret-information playback circuit, a process for playing back the secret information, which includes the integrity check value (ICV), from a recording area superimposed on a recording area on a recording medium for the corresponding content is executed.

In an embodiment of the information playback method of the present invention, in the secret information playback step, the dedicated secret-information playback circuit is used to execute the process for playing back the integrity check value (ICV) from the physically protected area on the recording medium when the physically protected area is formed separately from a recording area for the content.

In an embodiment of the information playback method of the present invention, in the secret information playback step, the dedicated secret-information playback circuit is used to execute the process of playing back the integrity check value (ICV) for the digital-rights-management (DRM) data on the content and an ICV key used for generating an ICV-generation verifying key for verifying the generation of the ICV from the physically protected area on the recording medium.

In an embodiment of the information playback method of the present invention, in the cryptosystem-processing step, the verifying processing on the integrity check value (ICV) for the digital-rights-management (DRM) data is executed as processing in which a message authentication code (MAC) in which DES encryption processing is used for the played back digital-rights-management (DRM) and is compared with a recorded ICV.

In an embodiment of the information playback method of the present invention, an information playback device possesses, in a hierarchical tree structure having a plurality of different information recording devices serving as leaves, different key sets of node keys unique to nodes and leaf keys unique to the information recording devices, and in the cryptosystem-processing step, by using an enabling key block (EKB) key acquired by decrypting an EKB which can be decrypted only by a selected information playback device included in the leaves in the hierarchical tree structure, a process for generating an ICV key used for generating the integrity check value (ICV) for the digital-rights-management (DRM) data is executed.

In an embodiment of the information playback method of the present invention, the cryptosystem-processing step further comprises a step in which the EKB key is acquired by selecting an enabling key block (EKB) correlated with content stored in the recording medium storing the content.

In an embodiment of the information playback method of the present invention, the cryptosystem-processing step further comprises a step in which decryption of the content key, serving as an encrypted key for the content, is executed by using the EKB key acquired by the process for decrypting the enabling key block (EKB).

In an embodiment of the information playback method of the present invention, in the cryptosystem-processing step, in the process for playing back the content from the recording medium, the verifying processing on the integrity check value (ICV) for the digital-rights-management (DRM) data corresponding to the content is executed, and on condition that it is verified that there is no falsification of the digital-rights-management (DRM) data, processing associated with the process of playing back the content from the recording medium is executed.

In an embodiment of the information playback method of the present invention, in the process of playing back the content from the recording medium, when the content is transmitted from another device, processing associated with the process of transmitting the content in the recording medium is executed on condition that mutual authentication with the device is established.

In an embodiment of the information playback method of the present invention, the information playback method further comprises a step in which, in the process of playing back the content from the recording medium, when updating of the digital-rights-management (DRM) data is executed, the encryption-processing means generates an integrity check value (ICV) based on the updated digital-rights-management (DRM) data, and records in the recording medium the integrity check value (ICV) based on the updated digital-rights-management (DRM) data.

In an embodiment of the information playback method of the present invention, in the case of the updated integrity check value (ICV), a process for overwriting the integrity check value (ICV) is executed before the updating.

In an embodiment of the information playback method of the present invention, in the case of the updated integrity check value (ICV), a process for recording to an area separate from the recording area of the integrity check value (ICV) is executed before the updating.

According to a sixth aspect of the present invention, there is provided a program storage medium for providing a computer program for controlling a computer system to execute data recording processing to a recording medium, in which the computer program comprises:

an encryption-processing step which generates encrypted content by executing a process for encrypting content to be stored in the recording medium and which generates an integrity check value (ICV) for digital-rights-management (DRM) data on content including use-restriction information on content; and a secret-information recording step which, by using a dedicated secret-information recording circuit, executes a process for recording the integrity check value (ICV) in a physically protected area on the recording medium.

According to a seventh aspect of the present invention, there is provided a program storage medium for providing a computer program for controlling a computer system to execute data playback processing from a recording medium, in which the computer program comprises:

a cryptosystem-processing step which executes a process for decrypting content stored in the recording medium and which executes verification of an integrity check value (ICV) for digital-rights-management data (DRM) on content including use-restriction information; and a secret information playback step which, by using a dedicated secret-information playback circuit, executes a process for playing back the integrity check value (ICV) from a physically protected area on the recording medium.

A program storage medium of the present invention is a medium that provides a computer program in a computer-readable form, for example, to a multi-purpose computer system in which various program codes are executable. The medium is particular not limited in form, such as a recording medium such as a CD (compact disc), an FD (floppy disk), or an MO (magneto-optical), or a transmission medium such as a network.

In this type of program storage medium, for implementing the functions of a predetermined computer program in a computer system, a cooperative relationship in structure or in function between the computer program and the storage medium is defined. In other words, by using the storage medium to install the computer program into the computer system, the computer system exhibits cooperative operations, and operations and advantages similar to those in other aspects of the present invention can be obtained.

Other objects, features, and advantages of the present invention become apparent by a detailed description based on below-described embodiments of the present invention and the accompanying drawings.

BRIEF DESCRIPTION OF THE DRAWINGS

FIG. 5 is an illustration of examples of various keys in the system of the present invention and enabling key block (EKBs) for use in the distribution of data.

FIG. 31 is an illustration of a data storage form in media in the system of the present invention.

BEST MODE FOR CARRYING OUT THE INVENTION

[Device Structure]

Figure 1:
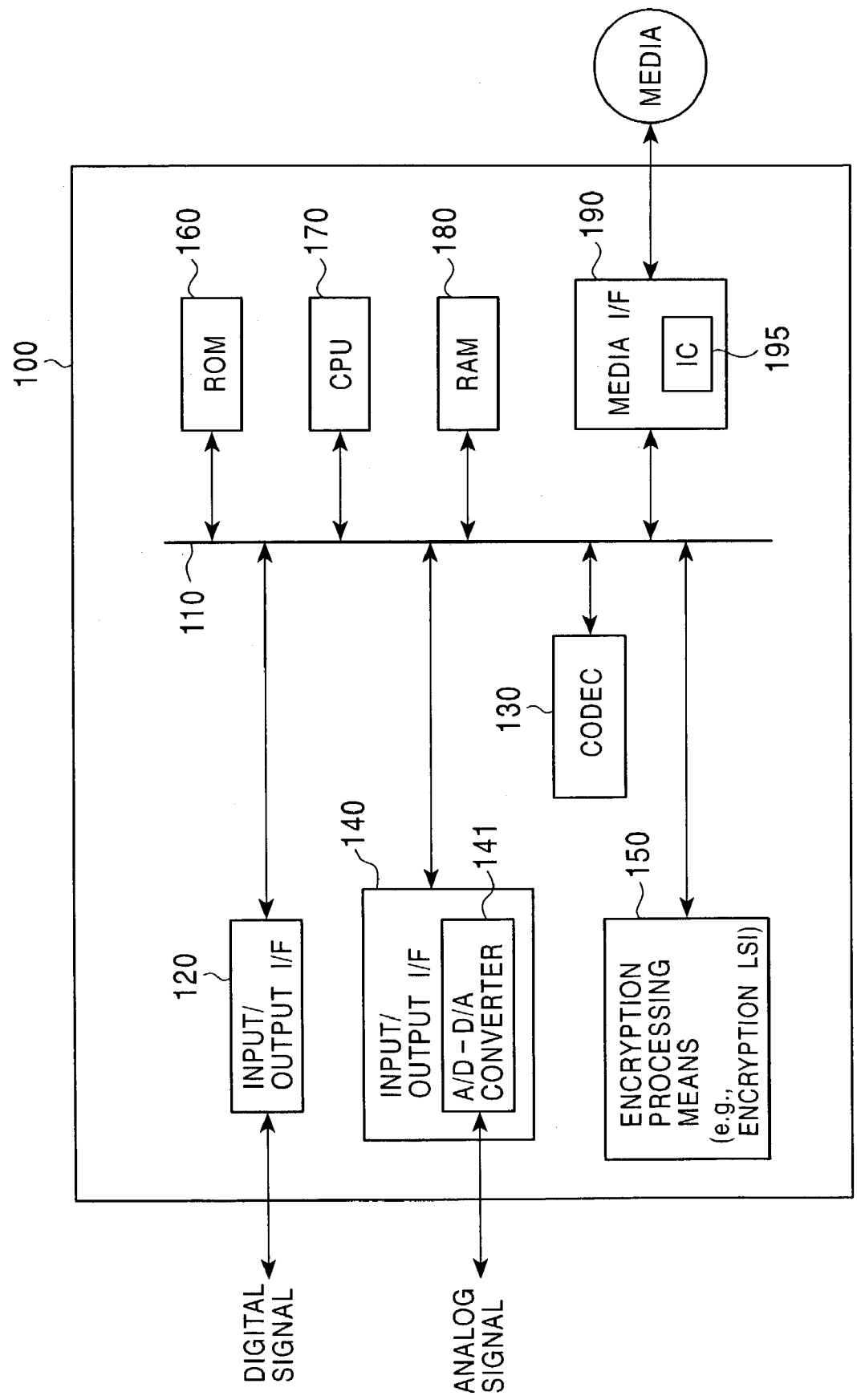
FIG. 1 is a block diagram showing an example of a recording/playback device that is usable in the system of the present invention.

In FIG. 1, a block diagram showing the structure of a recording/playback device 100 is shown as an example of a device using content such as music data and image picture data. The recording/playback device 100 includes, for example, stationary and portable devices such as a PC, a music recording/playback device, and picture recording/playback device. Although the following description illustrates, as a typical device, a device having both recording and playback functions, the construction of the present invention can be applied to also a device having a recording-only function or playback-only function.

The device in FIG. 1 is described. The recording/playback device 100 includes an input/output I/F (Interface) 120, a codec 130, an input/output I/F (Interface) 140 including an analog/digital-digital/analog (A/D-D/A) converter 141, an encryption processing means 150, a ROM (Read Only Memory) 160, a CPU (Central Processing Unit) 170, a RAM (Random Access Memory) 180, and a media interface 190 as an interface for recording media, and these are mutually connected by a bus 110.

The input/output I/F 120 receives digital signals constituting various types of externally supplied content, such as pictures, sound, and programs, and outputs the signals to the bus 110, while it receives digital signals on the bus 110 and outputs the signals to the exterior. The codec 130 decodes data supplied through the bus 110, for example, encoded (e.g., MPEG (Moving Picture Experts Group)-coded) data if the data represents a picture, and outputs the data to the input/output I/F 140, while it encodes a digital signal supplied from the input/output I/F 140 and outputs the signal to the bus 110. In the case of audio data, data that is compressed in a form such as ATRAC3 (Adaptive TRansform Acoustic Coding) or MP3 (MPEG-1 Audio Layer 3), or is encoded by linear PCM is decoded and output to the input/output I/F 140, while a digital signal supplied from the input/output I/F 140 is encoded and output to the bus.

The input/output I/F 140 includes the A/D-D/A converter 141. The input/output I/F 140 receives an analog signal as externally supplied content, and outputs the signal as a digital signal to the codec 130 after converting A/D (Analog Digital) conversion on the signal, while it outputs the digital signal as an analog signal to the exterior by performing D/A (Digital Analog) conversion in the A/D-D/A converter 141.

The encryption processing means 150 is formed by, for example, a single chip LSI (Large Scale Integrated Circuit), and has a construction in which encryption, decryption processing, or certification processing is executed on the digital signal which is supplied as content through the bus 110, and encrypted data, decrypted data, or the like, is output to the bus 110. The encryption processing means 150 can be realized not only by the single chip LSI, but also by a combination of various types of software and hardware.

The ROM 160 stores program data to be processed by the recording/playback device. The CPU 170 controls the codec 130, the encryption processing means 150, etc., by executing programs stored in the ROM 160 and RAM 180. The RAM 180 is, for example, a nonvolatile memory, and stores a program that the CPU 170 executes, the data required for the operation of the CPU 170, and a key set for use in encryption processing that is executed by the CPU 170. The key set is described later. The media interface 190 reads (plays back) digital data from the recording medium and outputs the data to the bus 110 by driving media (recording media) capable of recording and playing back the digital data, and supplies media (recording media) with the digital data supplied through the bus 110 so that the data is recorded.

Here, the media (recording media) are, for example, optical disks such as DVDs and CDs, magnetooptical disks, magnetic tapes, or media capable of storing digital data, such as semiconductor memories such as RAMs, and are those including both a structure capable of being removably loaded into the recording/playback device 100 and a structure capable of being built into the recording/playback device 100.

Content recorded in the media is protected in encryption. A key to breaking encryption is recorded in the media in a safety method, with the content, in a form in which its validity based on an integrity check value (ICV) is guaranteed with rights data representing rules about the identifier (ID) of the content and the form of using the content. In the rights data, rules about use of content such as content playback and copying, for example, the number of times playback may be performed: N; the number of times copying may be performed: N; the number of times copying between generations may be performed: N; etc., are recorded. In other words, the rights data is recorded as protected data that cannot be recorded or played back by an ordinary recording/playback method for user data (content). The generation of the integrity check value (ICV) and an integrity verification method using the ICV are described later.

Secret data such as the integrity check value (ICV) and key data for generating the ICV is controlled so as to be recorded or played back only when a method different from ordinary recording/playback of content is used. Protected data recorded in the storage area of the secret data is controlled to be played back or recorded by processing using an IC as a dedicated secret-information-recording/playback circuit which is only set in a valid device. An IC 195 in the media interface 190 in FIG. 1 is this dedicated secret-information-recording/playback circuit. The IC 195 is set only in the valid device and is provided to a user.

[Integrity Check Value (ICV)]

Next, an integrity check value (ICV) for preventing data from being falsified is described.

The integrity check value (ICV) is generated as falsification preventing data, for content, copy control information, etc., and based on the ICV, verification of falsification of the subject data of the above types is executed. In the system of the present invention, the integrity check value (ICV) is generated for DRM (Digital Rights Management) data as a complex of the above-described rights data, the content ID, and encrypted content key, and verification of whether or not the rights management (DRM) data of the content is falsified.

Figure 2:
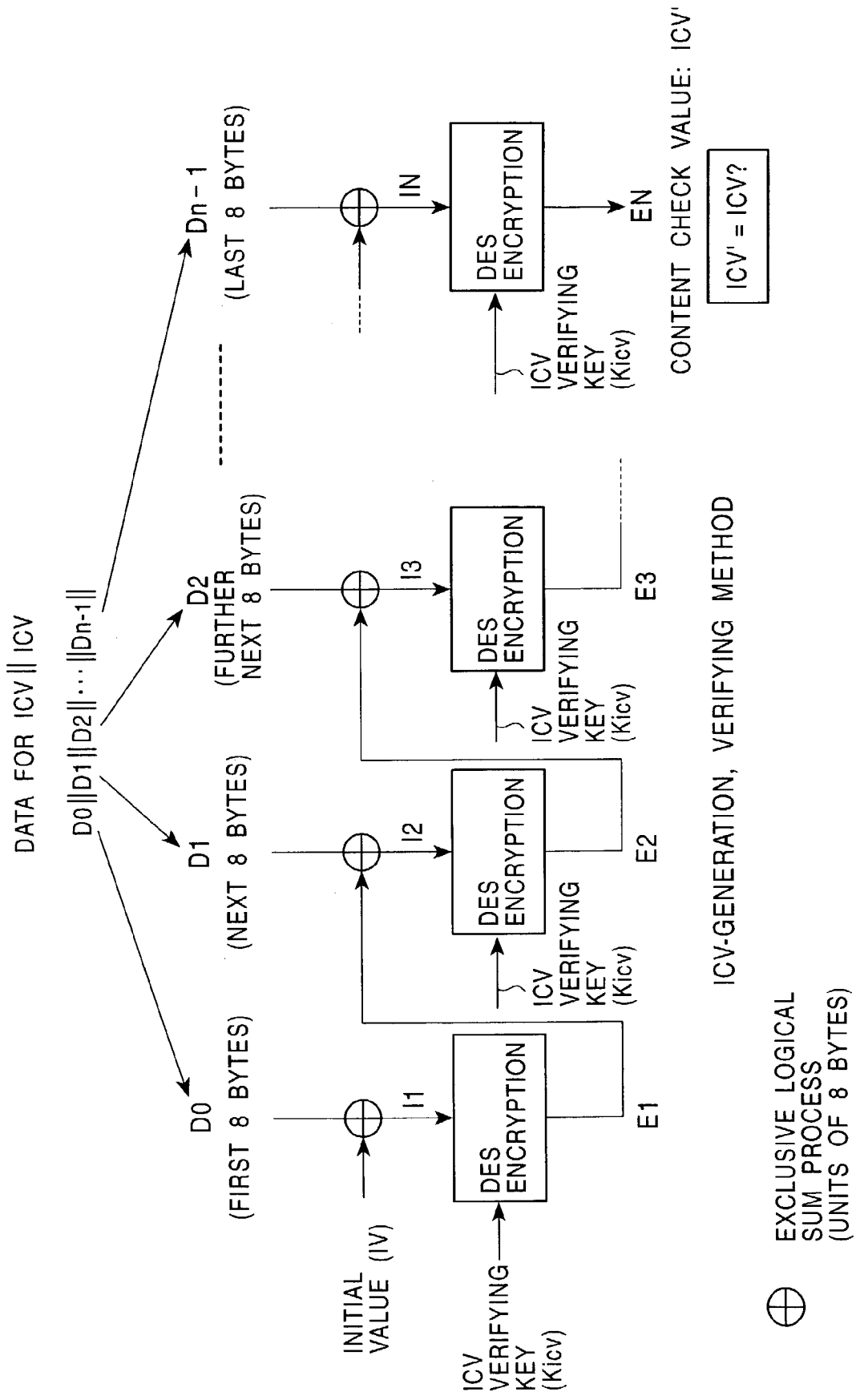
FIG. 2 is an illustration of the generation of an integrity check value (ICV) and a verifying processing construction which are usable in the system of the present invention.

An example of generating the integrity check value (ICV) by using DES encryption processing construction is shown in FIG. 2. As the construction in FIG. 2 shows, a message constituting subject integrity check data is divided in units of eight bytes (divided massages are hereinafter referred to as D0, D1, D2, . . . , Dn−1). The integrity check data is, for example, the above-described rights management 8 (DRM) data.

First, an initial value (hereinafter represented by IV) and D0 are exclusive-ORed (the result is represented by I1). Here, processing using the initial value IV is described, but a construction (e.g., ISO9797, DES-MAC) that does not use the initial value IV may be employed. Although the security of the entire system can be enhanced by using the initial value IV, it is required that the initial value IV be also managed in a safety method, with the ICV and the ICV key. Next, I1 is put into a DES encryption unit, and is encrypted using an integrity check value (ICV) generating key (ICV-generation verifying key: Kicv) (the output is represented by E1). Subsequently, E1 and D1 are exclusive-ORed, the output I″ is put into a DES encryption unit, and is encrypted (the output E2) by using the integrity check value (ICV) generating key (ICV-generation verifying key: Kicv). By repeatedly performing this thereafter, the encryption processing is performed on all messages. Finally output EN is used as a DRM check value ICV'.

When a valid ICV which is guaranteed to be free from falsification and which is generated, for example, in a DRM generating mode, and an ICV' newly generated based on the DRM are compared and identity is verified, in other words, when ICV'=ICV, it is guaranteed that the input message, here, rights management (DRM) data as a complex of the rights data, the content ID and the encrypted content key is free from falsification. When ICV'≠ICV, it is determined that there is falsification.

Figure 3:
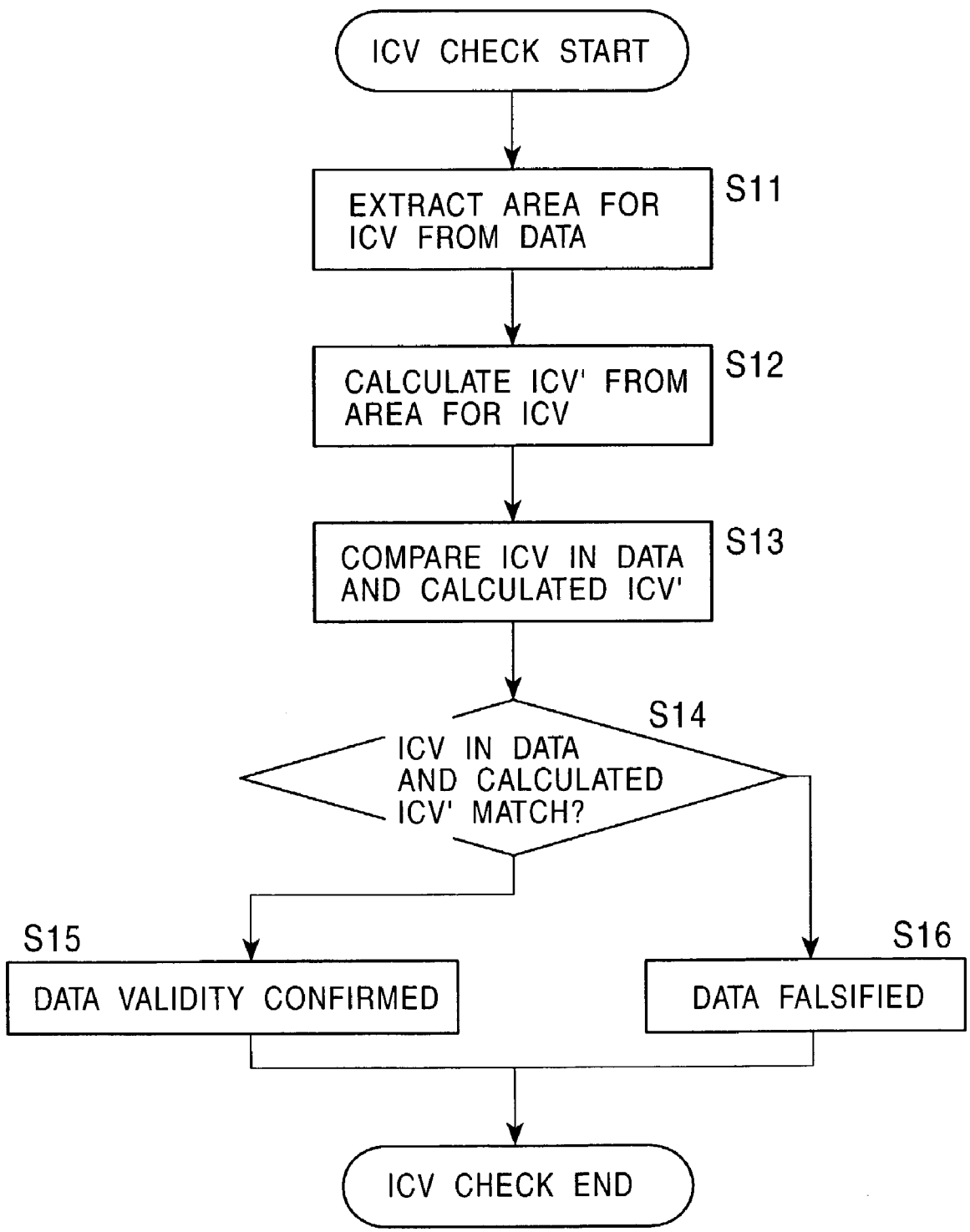
FIG. 3 is an illustration of the generation of an integrity check value (ICV) and a verifying processing flow.

A data integrity check process flow using the ICV is shown in FIG. 3. First, data for use in integrity check is extracted (S11), and based on the extracted data, an ICV' is calculated by using, for example, the DES encryption processing construction shown in FIG. 2. The calculated ICV' as a result of the calculation, and an ICV stored in the data are compared (S13). When identity is confirmed, it is determined (S14 to S15) that the data is valid data free from data falsification. When both are not identical, it is determined (S14 to S16) that the data has falsification.

[Tree Structure as Key Distribution Configuration]

In the system of the present invention, each content-using device such as the recording/playback device shown in FIG. 1 possesses cryptosystem keys based on a tree structure as a key distribution configuration. The key distribution configuration based on the tree structure is described using FIG. 4.

Figure 4:
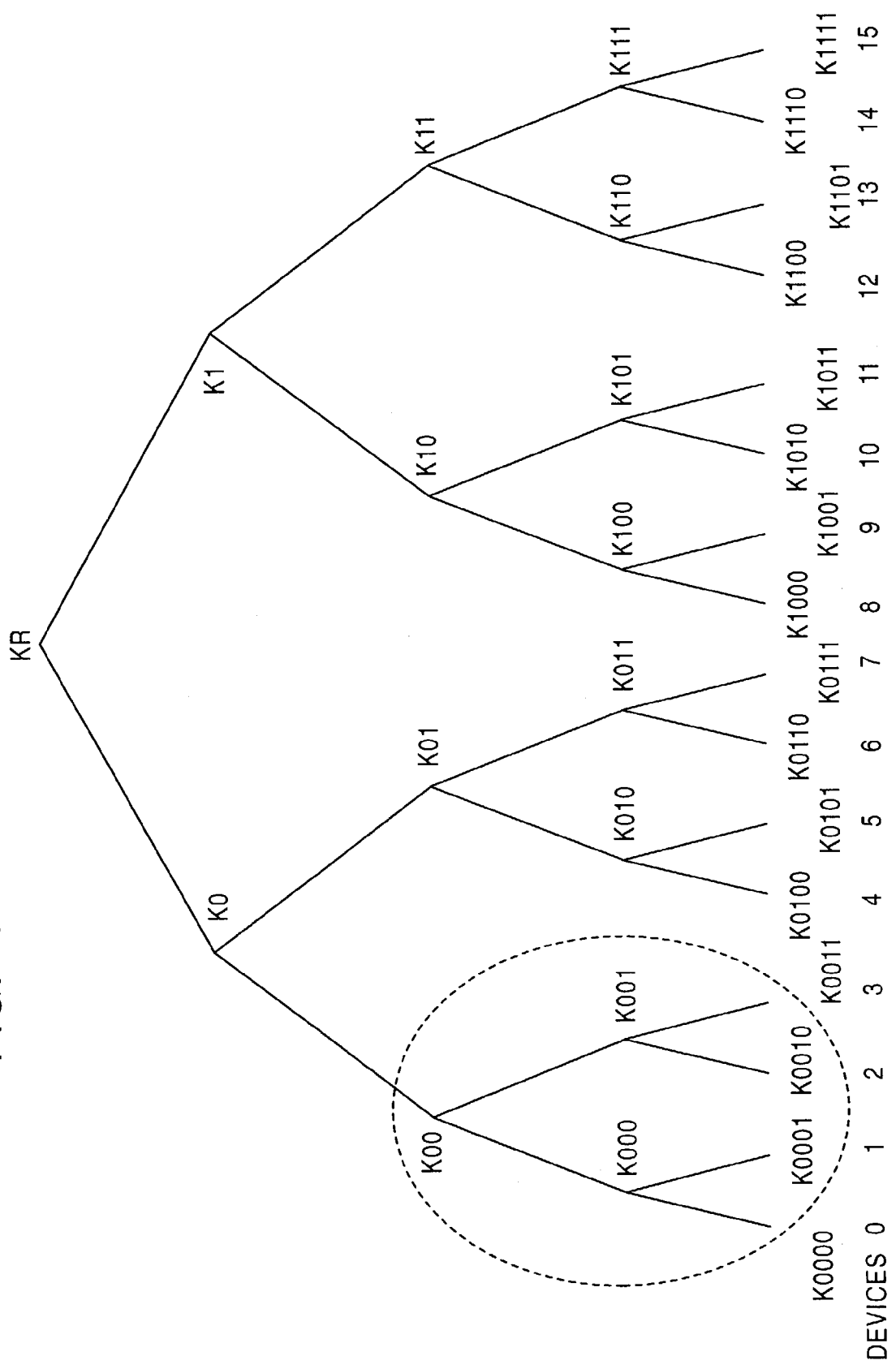
FIG. 4 is a tree-structure diagram illustrating various keys and data encryption processing in the system of the present invention.

Number 0 to 15 shown at the bottom of FIG. 4 indicate devices that use content. In other words, the leaves of the hierarchical tree structure shown in FIG. 4 correspond to the devices, respectively.

When being produced or shipped, or thereafter, each of devices 0 to 15 stores, in memory, a key set consisting of keys (node keys) assigned to nodes and leaf keys for leaves from its leaf to the root in the hierarchical tree structure shown in FIG. 4. K0000 to K1111 shown at the bottom in FIG. 4 are leaf keys assigned to devices 0 to 15, and the keys KR to K111 indicated from the KR (root key) at the top to the keys at the second row from the bottom serve as node keys.

In the tree structure shown in FIG. 4, for example, device 0 possesses a leaf key K0000, and node keys K000, K00, K0, and KR. Device 5 possesses K0101, K010, K01, K0, and KR. Device 15 possesses K111, K111, K11, K1, and KR. In the tree in FIG. 4, only sixteen devices from 0 to 15 are described, and the tree structure is also shown as a symmetric structure having four stages. However, it is possible that more devices be provided, and it is possible that each portion of the tree have a different number of stages.

The devices included in the tree structure in FIG. 4 include various recording media, for example, various types of devices using DVDs, CDs, MDs, flash memories, etc., which are built into the device or can be loaded into or unloaded from the device. Also various application services can coexist. The content or the hierarchical tree structure as the key distribution configuration which is shown in FIG. 4 is applied to such a coexistent construction of different devices and different applications.

In the system in which the different devices and applications coexist, for example, a portion surrounded by the dotted line in FIG. 4, that is, devices 0, 1, 2, and 3 are set as one group using a single recording medium. For example, collectively, for the devices included in the group surrounded by the dotted line, processes are executed in which common content is encrypted and is sent from a provider, in which a content key for use as a content encryption key or decryption key in common to the devices is sent, and in which data on payment of content charges is also encrypted and output from each device to a provider or a settlement organization, etc. An organization that performs data transmission and reception with the devices, such as a content provider or a settlement processing organization, executes a process for simultaneously transmitting the data to the devices 0, 1, 2, and 3 while treating the devices 0, 1, 2, and 3 as one group. The tree in FIG. 3 has a plurality of similar groups. An organization that transmits/receives data to/from each device, such as a content provider or a settlement organization, functions as a message data distribution means.

Node keys and leaf keys may collectively be managed by a certain key management center, or may be managed for each group by the message data distribution means such as a content provider that performs transmission/reception of various types of data for each group, or a settlement organization. Regarding the node keys and the leaf keys, updating processing is executed, for example, when a key leaks, etc., and the updating processing is executed by the key management center, the provider, the settlement organization, etc.

In this tree structure, as is clear from FIG. 4, three devices 0, 1, 2, and 3 included in one group possess common keys K00, K0, and KR as node keys. By using this node-key-sharing structure, for example, a common content key can be provided only to devices 0, 1, 2, and 3. By way of example, by setting the common node key K00 itself as a content key, a common content key can be set only in devices 0, 1, 2, and 3 without executing sending of a new key. Also, by distributing, to devices 0, 1, 2, and 3, through a network or in a form stored in the recording medium, a value Enc(K00, Kcon) obtained by using the node key K00 to encrypt a new content key Kcon, only devices 0, 1, 2, and 3 become able to obtain a content key Kcon by using the shared node key K00 that each device possesses to decrypt a code Enc(K00, Kcon). Enc(Ka, Kb) represents data obtained by using Ka to encrypt Kb.

Also, when it is found at a time t that the keys K0011, K001, K00, K0, and KR that device 3 possesses are analyzed by an attacker (hacker) and are revealed, in order to thereafter protect data that is transmitted and received in the system (the group of devices 0, 1, 2, and 3), device 3 needs to be cut off from the system. Accordingly, it is required that the node keys K001, K00, K0, and KR be updated into new keys K(t)001, K(t)00, K(t)0, and K(t)R, respectively, and it is required that the updated keys be conveyed to devices 0, 1, and 2. Here, K(t)aaa represents an updated key of the generation t of a key Kaaaa.

A process for distributing an updated key is described. Key updating is executed, for example, by supplying devices 0, 1, and 2 with a table formed by a block data called an enabling key block (EKB) as shown in FIG. 5(A), for example, through the network or in a form stored in the recording medium. The enabling key block (EKB) is constituted by encrypted keys for distributing newly updated keys to devices context the leaves of the tree structure shown in FIG. 4.

In the enabling key block (EKB) shown in FIG. 5(A), only devices that requires node key updating are formed as block data having updatable data structure. The example in FIG. 5 shows block data formed for the purpose of distributing updated node keys in devices 0, 1, and 2 in the tree structure shown in FIG. 4. As is clear from FIG. 4, device 0 and device 1 need K(t)00, K(t), and K(t)R as updated node keys, and device 2 needs K(t)001, K(t)00, K(t), and K(t)R as updated node keys.

As shown in the EKB in FIG. 5(A), a plurality of encrypted keys are included in the EKB. The encrypted key at the bottom is Enc(K0010, K(t)001). This is an updated node key K(t)001 that is encrypted by the leaf key K0010 that device 2 possesses, and device 2 can obtain K(t)001 by using its own leaf key to decrypt the encrypted key. Also, by using K(t)001 obtained by decryption, the encrypted key Enc(K(t)001, K(t)00) at the second row from the bottom in FIG. 5(A) can be decrypted, and an updated node key K(t)00 can be obtained. After that, sequentially, the encrypted key Enc(K(t)00, K(t)0) in the second row from the top in FIG. 5(A) is decrypted, and the updated node key K(t)0, and the encrypted key Enc(K(t)0, K(t)R) in the first row from the top in FIG. 5(A) are decrypted, so that K(t)R is obtained. In addition, in devices K0000 and K0001, the node key K000 is included as a key to be updated, and those required as updated node keys are K(t)00, K(t)0, and K(t)R. Devices K0000 and K0001 obtain K(t)00 by decrypting the encrypted key Enc(K000, K(t)00) in the third row from the top in FIG. 5(A). After that, they obtain the updated node key K(t)0 by decrypting the encrypted key Enc(K(t)00, K(t)0) in the second row from the top in FIG. 5(A), and obtains K(t)R by decrypting the encrypted key Enc(K(t)0, K(t)R) in the first row from the top in FIG. 5(A). In this way, devices 0, 1, and 2 can obtain the updated keys K(t)001, K(t)00, K(t)0, and K(t)R. The index in FIG. 5(A) shows the absolute addresses of node keys and leaf keys used as decryption keys.

When it is not necessary to update the node keys K(t)0 and K(t)R in an upper stage in the tree structure shown in FIG. 4, and it is necessary to perform the process for updating only the node key K00, the updated node key K(t)00 can be distributed to devices 0, 1, and 2 by using the enabling key block (EKB) in FIG. 5(B).

The EKB shown in FIG. 5(B) can be used for the case of distributing a new content key shared by, for example, a particular group. A specific example is assumed in which devices 0, 1, 2, and 3 in the dotted group in FIG. 4 use a certain recording medium and needs a new common content key K(t)con. At this time, by using K(t)00 obtained by updating the node key K00 common to devices 0, 1, 2, and 3, data Enc(K(t), K(t)con) obtained by encrypting the new common content key is distributed, with the EKB shown in FIG. 5(B). This distribution enables distribution of the encrypted data as data that cannot be decrypted by in devices of other groups.

In other words, by using K(t)00 obtained by processing the EKB to decrypt the above code, devices 0, 1, and 2 can obtain the content key K(t)con at the time t.

[Key Distribution Using EKB]

Figure 6:
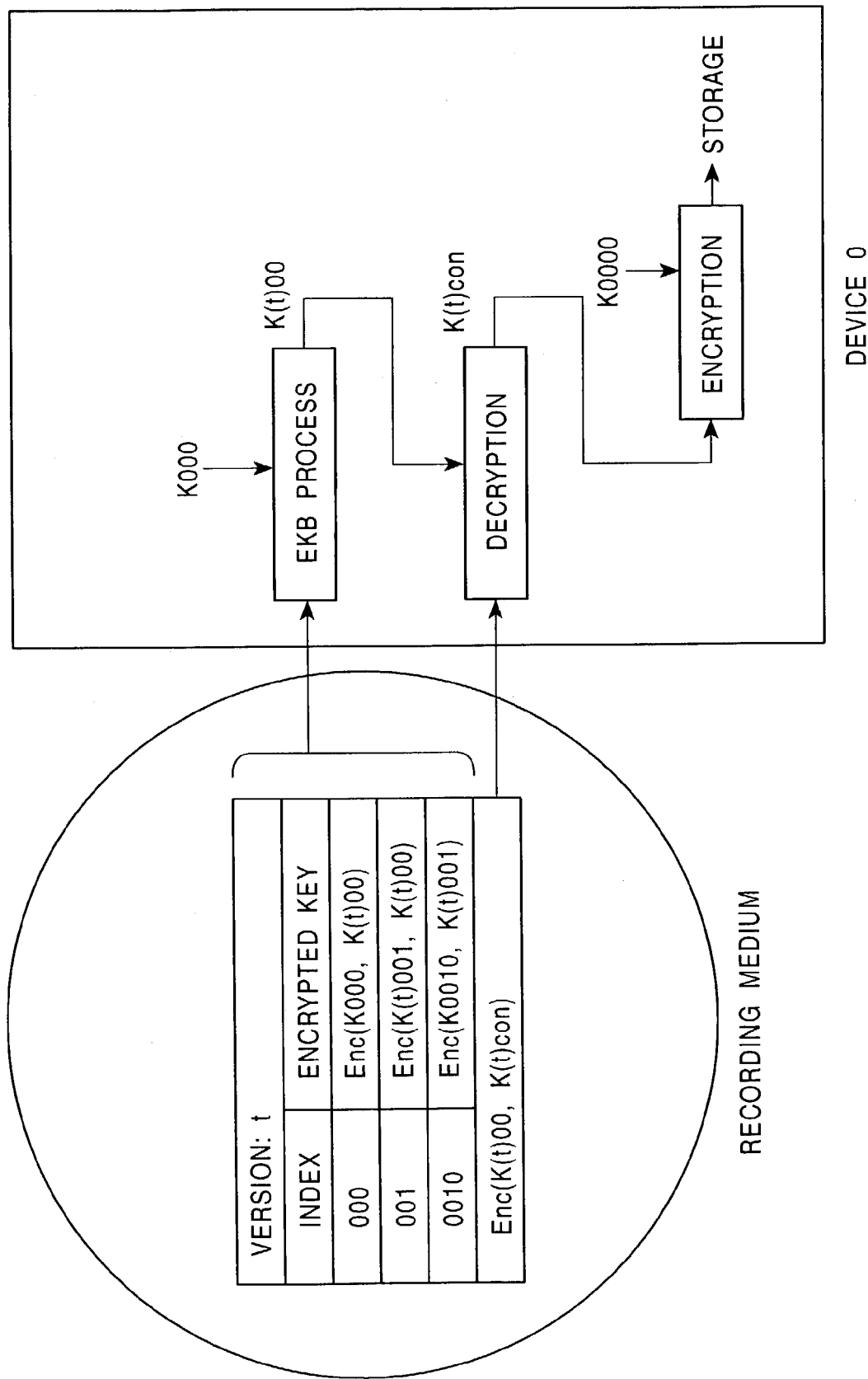
FIG. 6 is an illustration of an example of distribution using an enabling key block (EKB) for a content key and an example of a decryption process in the system of the present invention.

FIG. 6 shows, as a processing example of obtaining the content key K(t)con at the time t, the process of device 0 in which data Enc(K(t)00, K(t)con) obtained by using K(t)00 to encrypt the new common content key K(t)con, and the EKB shown in FIG. 5(B) are received by using a recording medium. In other words, this is a case in which a message encrypted by using the EKB is used as the content key K(t)con.

As FIG. 6 shows, device 0 generates the node key K(t)00 by performing EKB processing similar to that described above by using an EKB at the time t, which is the generation stored in the recording medium, and the node key K000 stored beforehand by it. Also, after the updated content key K(t)con is decrypted by using the decrypted updated node key K(t)00, in order that it may be used later, it is encrypted by using the leaf key K0000 that only device 0 possesses and is stored.

[EKB Format]

Figure 7:
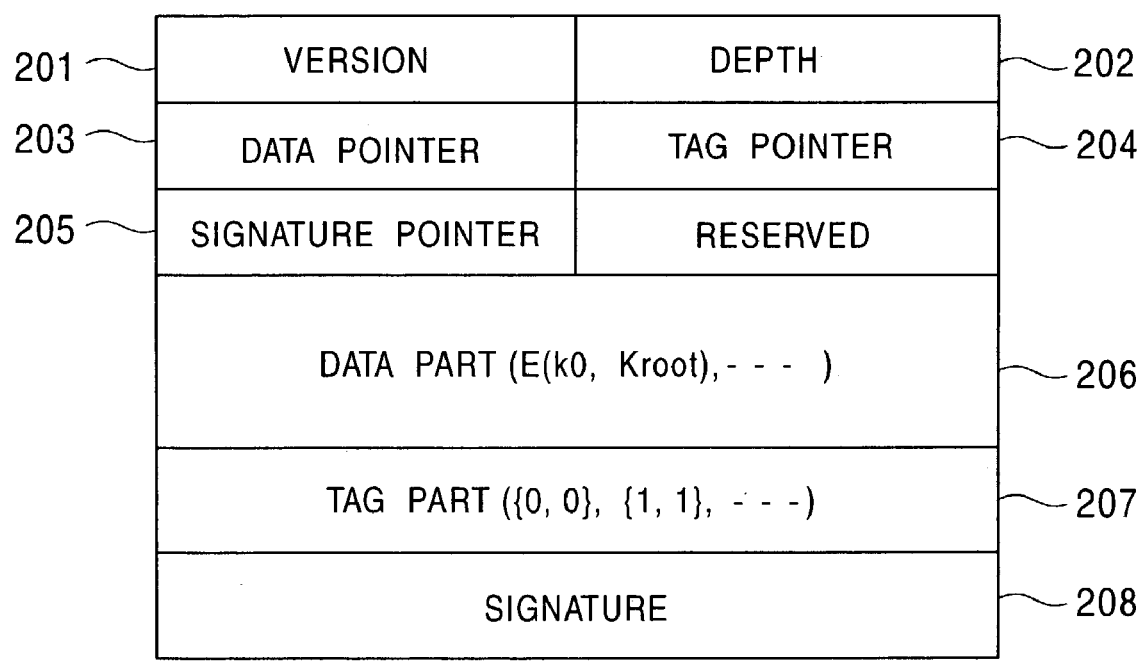
FIG. 7 is an illustration of an format example of an enabling key block (EKB) in the system of the present invention.

FIG. 7 shows an example of an enabling key block (EKB) format. Version 201 is an identifier representing the version of an enabling key block (EKB). The Version has a function of identifying the latest EKB and a function of indicating correspondence with content. Depth 202 represents the number of layers of a hierarchical tree for a device to which an enabling key block (EKB) is distributed. Data pointer 203 is a pointer indicating the position of a data part in the enabling key block (EKB), Tag pointer 204 is a pointer indicating the position of a tag part, and Signature pointer 205 is a pointer indicating the position of a signature 208.

Data part 206 store, for example, data obtained by encrypting a node key to be updated. For example, it stores encrypted keys on updated node keys as shown in FIG. 6, etc.

Figure 8:
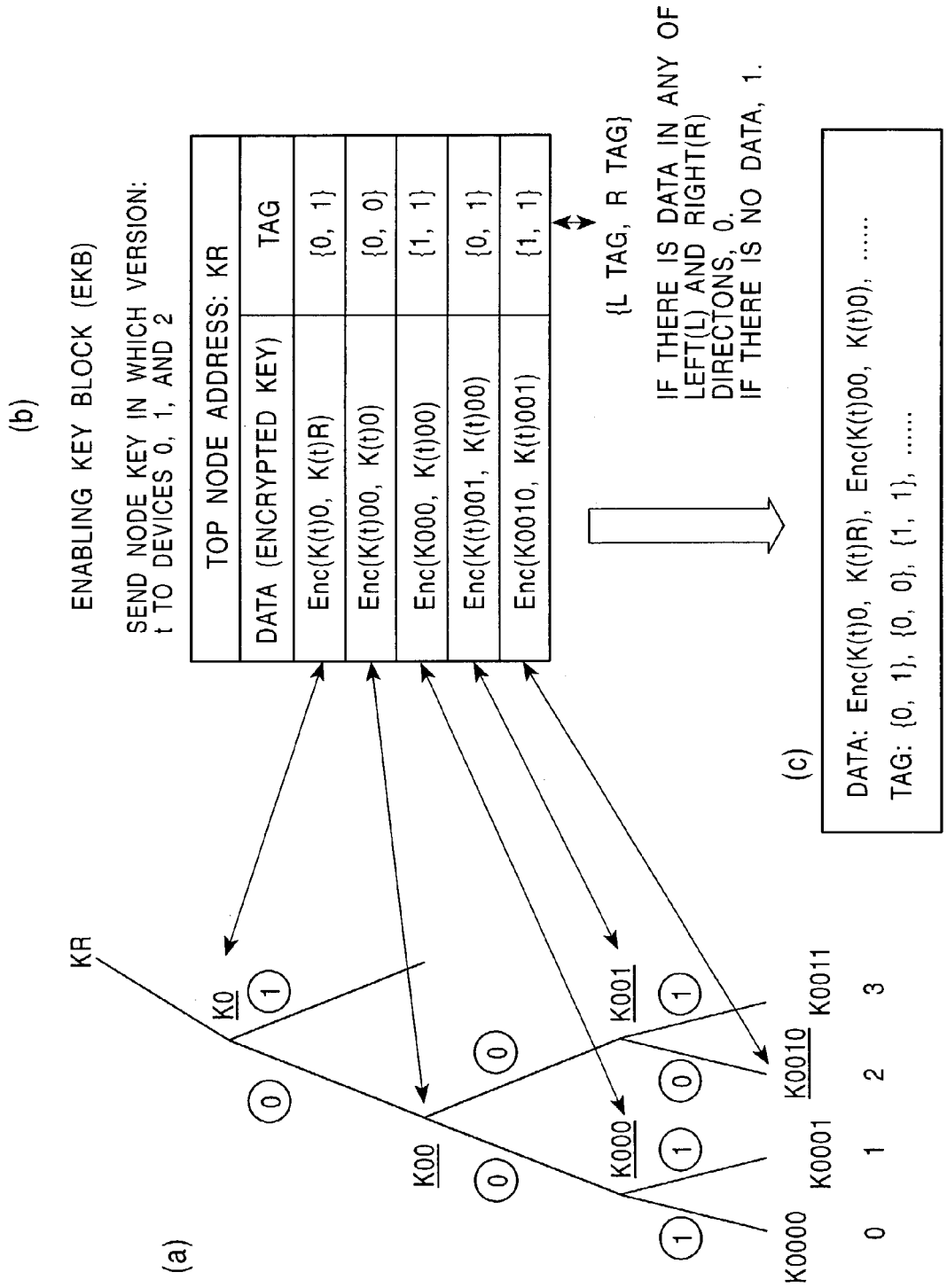
FIG. 8 is an illustration of tag construction of an enabling key block (EKB) in the system of the present invention.

Tag part 207 includes tags indicating the positional relationships of encrypted node keys and leaf keys which are stored in the Data part. Rules of giving the tags are described using FIG. 8. FIG. 8 shows an example of sending the enabling key block (EKB) described above as data in FIG. 5(A). The data at this time is as shown in the table (b) of FIG. 8. The address of a top node included in an encrypted key at this time is used as a top node address. Since a root-key updating key K(t)R is included in this case, the top node address is KR. At this time, for example, data Enc(K(t)0, K(t)R) in the top raw lies in a position indicated in the hierarchical tree shown in FIG. 8(a). Here, the next data is Enc(K(t)00, K(t)0) and is positioned in the tree at the lower left with respect to the previous data. When there is data, the tag is set to 0, and when there is no data, the tag is set to 1. The tag is set in the form of {left (L) tag, right (R) tag}. Since there is data on the left of the data in the top row, L tag=0, and since there is no data on the right, R tag=1. Subsequently, all the pieces of data are tagged, and the data string and the tag string shown in FIG. 8(c) are formed.

The tag is set in order to indicate where data Enc(Kxxx, Kyyy) is positioned. Key data Enc(Kxxx, Kyyy) stored in the Data part is nothing but a row of data of simply encrypted keys. Accordingly, by using the above-described tag, the position in the tree of an encrypted key stored as data can be recognized. It is possible that, by using node indices correlated with encrypted data as in the structure described in the above FIG. 5, without using the amplifier tag, such a data configuration that, for example, 0: Enc(K(t)0, K(t)root)
00: Enc(K(t)00, K(t)0)
000: Enc(K((t)000, K(T)00)
. . .

be formed. However, the structure using indices is not preferable in distribution using a network, etc., since it generates redundant data and increases the amount of data. Conversely, by using the above-described tag as key-position-representing index data, a small amount of data enables determination of a key position.

Referring back to FIG. 7, the EKB format is further described. Signature is a digital signature executed by the issuer of the enabling key block (EKB) such as, for example, the key management center, the content provider, the settlement organization. Based on signature verification, a device having received the EKB recognizes issuance of the EKB by a valid enabling key block (EKB) issuer.

Figure 9:
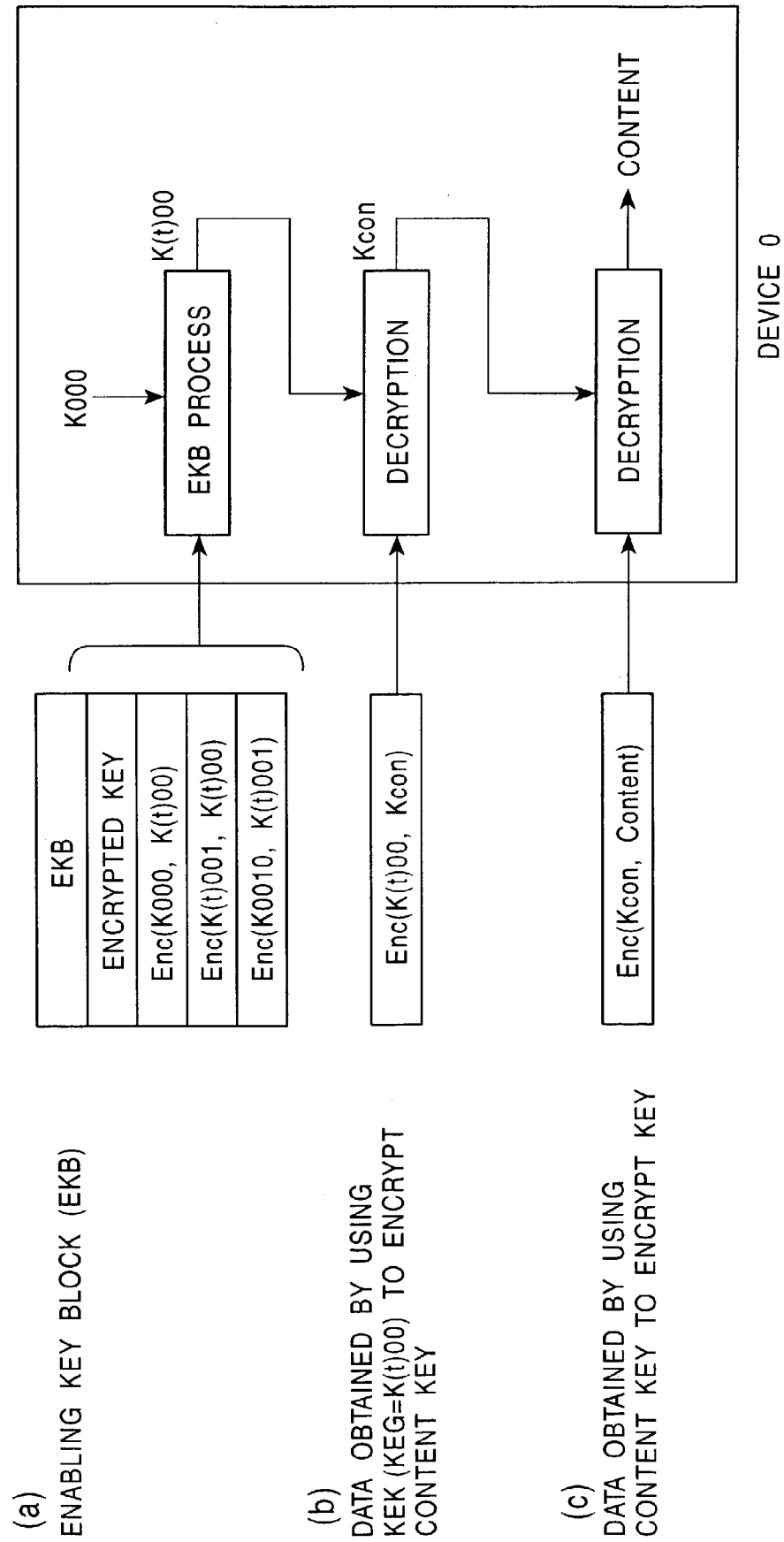
FIG. 9 is an illustration of data structure for distributing an enabling key block (EKB), a content key, and content in the system of the present invention.

FIG. 9 shows a case in which a content-key encryption-key KEK is formed as the updated node key K(t)00 obtained by updating the node key K00 shown in FIG. 4. In this case, assuming that device 3 in the dotted group in FIG. 4 has been revoked due to, for example, key leaking, devices 0, 1, and 2 can obtain content by distributing, to devices 0, 1, and 2, (a) the enabling key block (EKB) shown in FIG. 9, data obtained by using a content encryption key (KEK=K(t)00) to encrypt the content key (Kcon), and data obtained by using the content key (Kcon) to encrypt the content.

On the right side of FIG. 9, a decryption procedure in device 0 is shown. First, device 0 acquires a content-key encryption-key (KEK=K(t)00) from the received enabling key block by performing a decryption process using its own leaf key K000. Next, device 0 acquires the content key Kcon by using K(t)00 to perform decryption, and also uses the content key Kcon to decrypt the content. These processes enable device 0 to use the content. Also in devices 1 and 2, by using different processing procedures to process the EKB, acquisition of the content-key encryption-key (KEK=K(t)00) is made possible and use of the content is similarly made possible.

Devices 4, 5, 6, . . . of another group shown in FIG. 4 cannot acquire the content-key encryption-key (KEK=K(t)00) by using their own leaf key and node key, even if they receive similar data (EKB). Similarly, also the revoked device 3 cannot acquire the content-key encryption-key (KEK=K(t)00) by using its own leak key and node key. Accordingly, only each device having a legitimate right can decrypt and use the content.

By using the distribution using the EKB of the content key, as described above, encrypted content in which the amount of data is reduced and which is set so as to be safely decrypted only by a valid right holder can be distributed.

Although the enabling key block (EKB), the content key, the encrypted content, etc., are formed so as to be safely distributed by a network, the enabling key block (EKB), the content key, and the encrypted content can be provided in a form stored in a recording medium such as a DVD or a CD. In this case, by employing a construction in which, for decrypting the encrypted content stored in the recording medium, a content key obtained by decrypting the enabling key block (EKB) stored in the same recording medium, a simplified construction can realize processing for distributing the encrypted content which can be used only by the leaf key and node key that only the valid right holder possesses, that is, content distribution in which usable user devices are limited.

The devices such as recording/playback devices shown in FIG. 1 each store a key set comprised of leaf keys and node keys for the processing (decryption) of the above-described enabling key block (EKB), and acquire EKB-distributed keys (e.g., a root key, a key encryption key (KEK)) by using a key set which is stored as required to execute processing of the enabling key block (EKB).

[Media (Recording Media)]

Next, media such as a CD and a DVD for digital data recording, which are used in the system of the present invention, are described.

Areas on the media are distinguished between a user area and a protected area. The user area is an area in which recording/playback can be performed in accordance with a recording/playback system for ordinary content, while the protected area is an area in which recording/playback can be performed by only a system different from recording/playback system for ordinary content. The protected area is an area in which recording/playback can be performed by using only IC 195 as the above dedicated secret-information-recording/playback circuit described using FIG. 1. Here, regarding the user area and the protected area, there are two cases, on the media: they are distinguished as positional differences in the recording area; and they are distinguished as differences in signal processing system for recording/playback.

In the case of distinguishing between the user area and the protected area as positional differences in the recording area, the protected area is set in an area that is not set as a normal content-recording/playback area, for example, an inner circumferential area. In the case of distinguishing between the user area and the protected area as differences in signal processing system for recording/playback, recording/playback of data in the protected area is executed by applying signal processing which is different from normal content recording/playback. By way of example, in CDs, content data is recorded in the form of pits and lands on media. In order that the direct current component of the data signal at this time may be minimum, an EFM signal is added. A method for adding the EFM signal is determined in a signal modulating system for CD recording, and this signal cannot be operated by a command, etc. By controlling the EFM signal by using the IC 195 as the dedicated secret-information-recording/playback circuit, recording/playback of the secret information in the protected area is performed. The secret data part cannot be recorded or played back by using an ordinary content-recording/playback method, and can be recorded or played back only by the above IC 195.

In any of the case of distinguishing between the user area and the protected area as positional differences in the recording area, and the case of distinguishing between the user area and the protected area as differences in signal processing system, recording/playback of data in the protected area can be executed only by IC 195.

Figure 10:
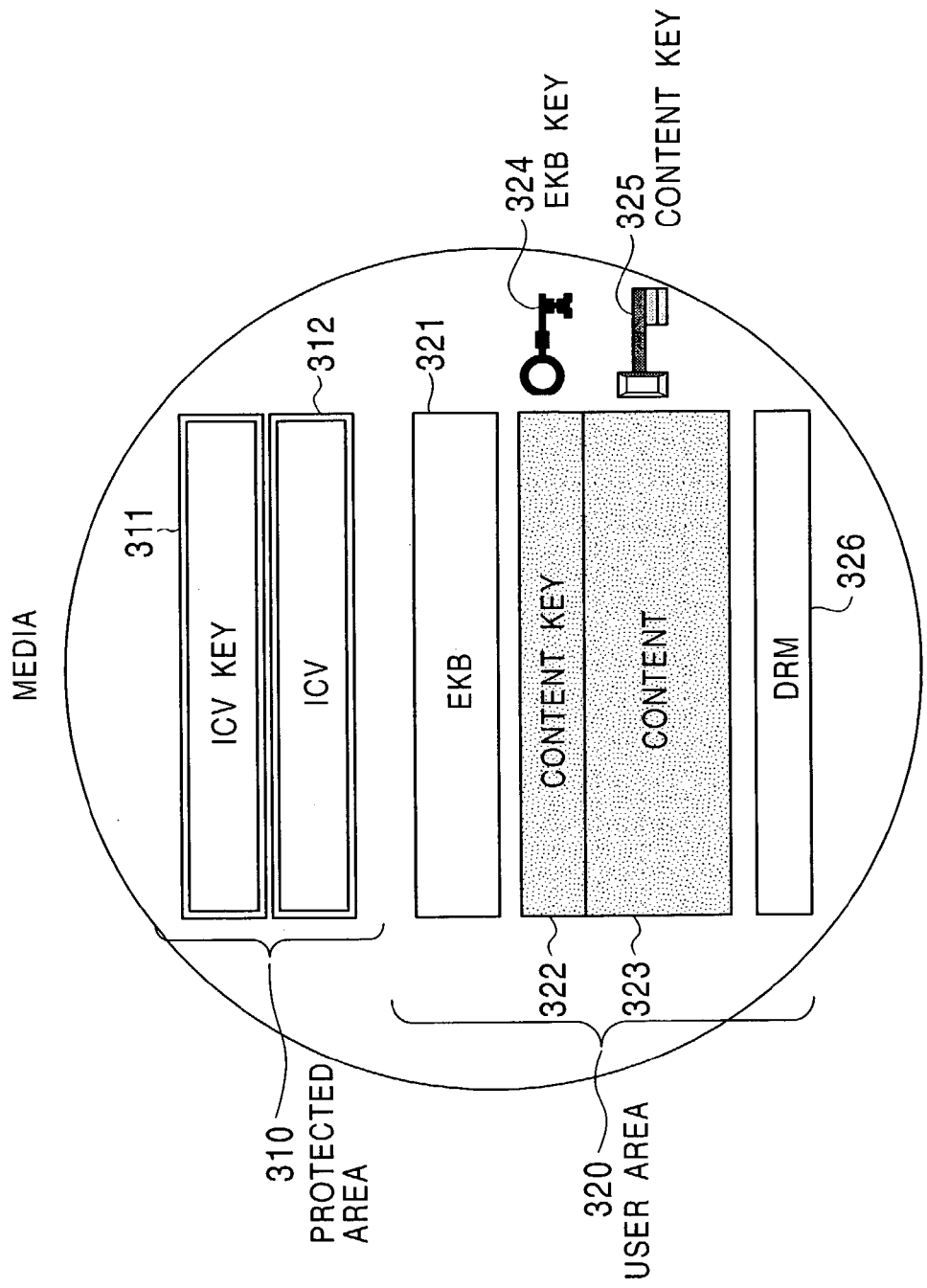
FIG. 10 is an illustration of a data configuration in media in the system of the present invention.

The data configuration of the media is described using FIG. 10. In a user area 320 as an ordinary data-recording area, an enabling key block (EKB) 321 corresponding to Contents, Contents encrypted by a content key 325, a content key 322 encrypted by an EKB key (e.g., a root key, a key encryption key (KEK)) obtained by the process of decrypting the above enabling key block (EKB), and DRM data 326 as described above which includes rules of use of content, for example, rights data as use-restriction information such as, for example, ability and inability to copy, are recorded.

In a protected area 310 as a secret information recording area, an ICV key 311 that is used as source data for the above ICV-generation verifying key for use in verification of DRM data integrity, and an integrity check value (ICV) 312 generated by using the ICV-generating verifying key to act on the DRM data are recorded.

[Authoring Device]

Figure 11:
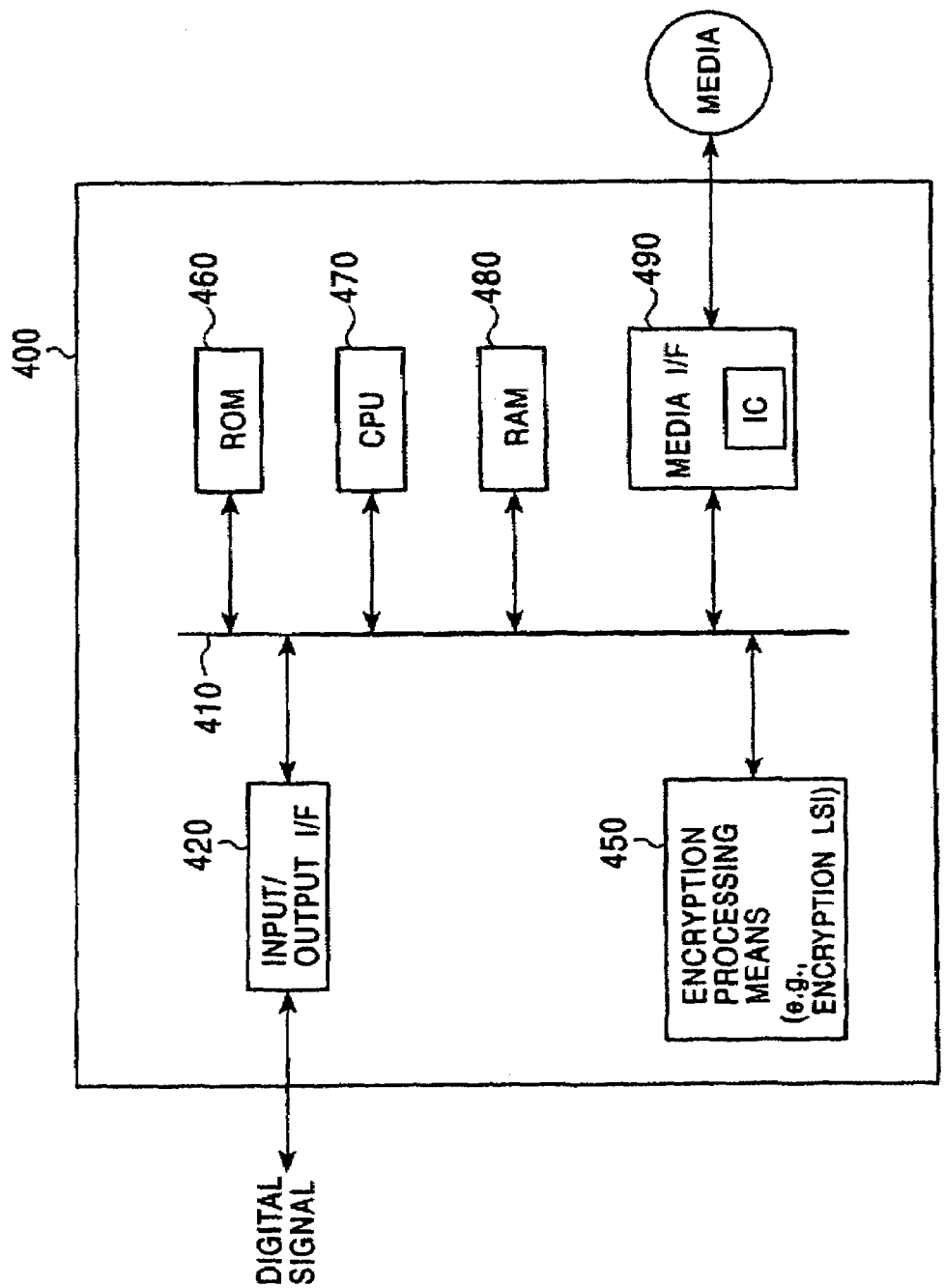
FIG. 11 is an illustration of the structure of an authoring device that execute a process for storing content in media in the system of the present invention.

Next, the structure of an authoring device that produces a device storing encrypted content is described using FIG. 11.

The device in FIG. 11 is described. An authoring device 400 includes an input/output I/F (Interface) 420, an encryption processing means 450, a ROM (Read Only Memory) 460, a CPU (Central Processing Unit) 470, a RAM 480, a media interface 490 as an interface with a recording medium (media), and these are connected to one another by a bus 410.

The interface I/F 420 receives externally supplied digital signals representing various types of content such as pictures, sound, and programs, and outputs the signals to the bus 410.

The encryption processing means 450 is formed by, for example, a single chip LSI (Large Scale Integrated Circuit), and has a construction that executes encryption on digital signals supplied as content through the bus 410 and outputs the encrypted data to the bus 410. The encryption processing means 450 can be realized by not only the single chip LSI but also by construction combining various types of software and hardware.

The ROM 460 stores program data that is processed by the authoring device. The CPU 470 controls the encryption processing means 450, etc., by executing a program stored in the RAM 480. The RAM 480 is, for example, a nonvolatile memory, and stores a program that the CPU 470 executes, the data required for the operation of the CPU 470, and key data for use in encryption processing, etc. By driving digital-data recordable/playable media (recording medium), the media interface 490 supplies and stores, in the media (recording medium), digital data supplied through the bus 410.

Here, the media (recording medium) is, for example, an optical disk such as a DVD or a CD, a magnetooptical disk, a magnetic disk, a magnetic tape, or a digital-data recordable medium such as a semiconductor memory such as a RAM. When many recording media having identical content, such as CDs or DVDs, are produced, a master disk is made by an authoring device, and a media stamper is used to manufacture CDs or DVDs having identical content.

Encryption on digital content in the authoring device and the process for recording to the media are described. First, the authoring device receives unencrypted digital content, and a protection for the content, that is, an EKB including EKB keys (e.g., a root key, a key encryption key (KEK)) for use in encryption. The EKB is issued by a reliable key distribution center (KDC).

The key distribution center KDC generates an EKB in which, for example, a root key as an encrypted key of a content key generated by a contents provider is set so as to be decrypted by only a valid user device. Based on information from an entity managed by each device, the key distribution center (KDC) can generate an EKB that can be decrypted by only a valid user device without directly knowing a stored key set of the device.

An authoring entity as a contents provider receives rights data which is added to content and which includes use-restriction information such as the number of times copying is performed, and a content identifier (ID), and generates, from the data, data which is recorded in the media. Regarding integrity check values (ICVs) to be added to the DRM data, for media in which identical content is recorded, the values may be identical in the content, or may be identical for each stamper. The values do not need to differ in each type of media. In other words, the values may be even ICVs generated by using identical ICV keys and EKB keys.

Figure 12:
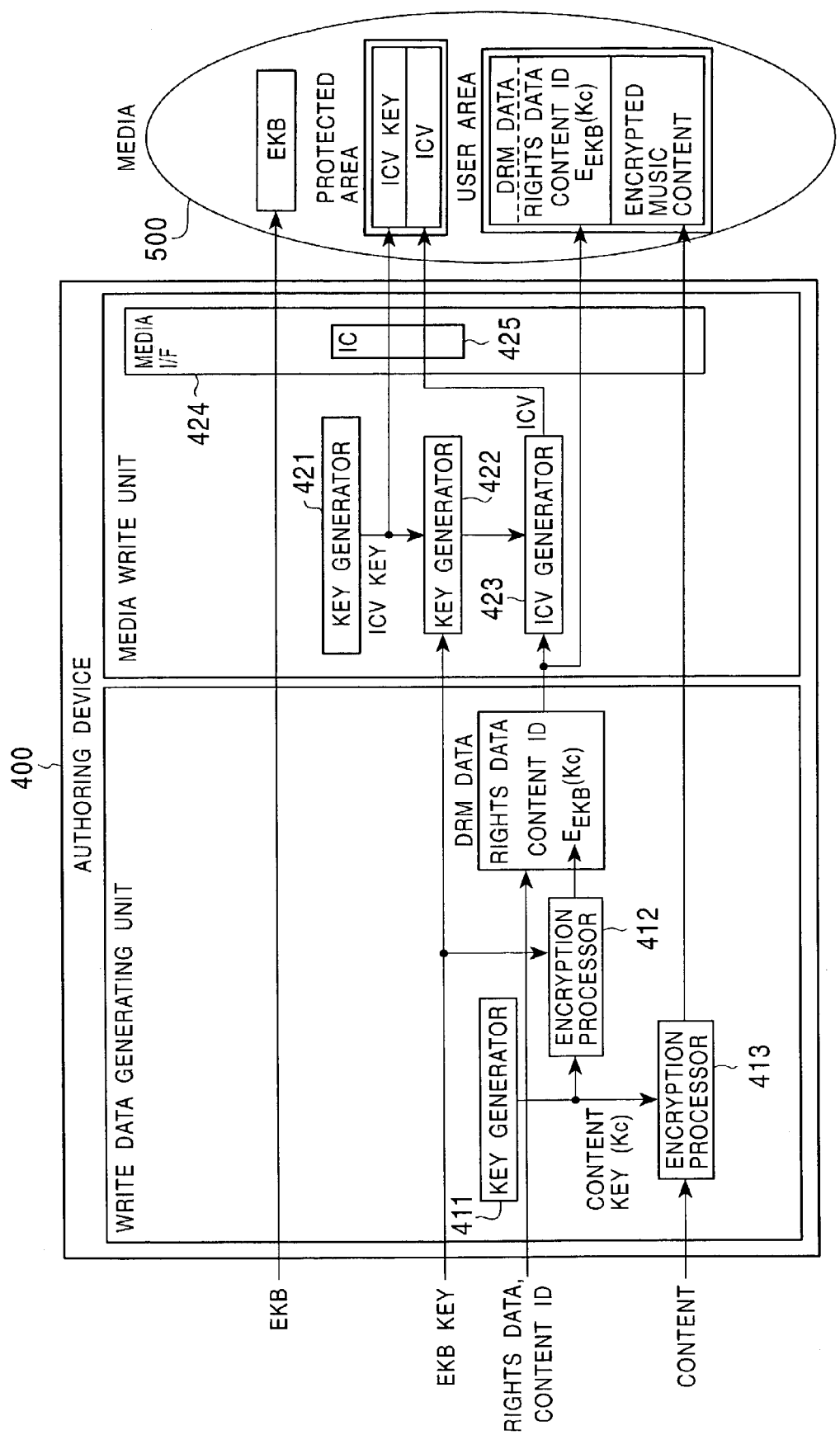
FIG. 12 is an illustration of the structure of an authoring device that execute a process for storing content in media in the system of the present invention.

In FIG. 12, a block diagram illustrating the encryption on content by the authoring device and the process for recording the media is shown.

An authoring device 400 executes a write data generating process and a process for performing media writing to media 500. As shown in FIG. 12, data to be written in the media includes, for a user area, an EKB, DRM data (rights data, content ID, and encrypted content key), and encrypted content. For a protected area, the data also includes an ICV key as source data of an ICV-generation verifying key, and a integrity check value (ICV) generated by using the ICV-generation verifying key to act on the DRM data. Processes for generating and recording each type of data are described.

a. EKB

The EKB is an EKB that can be decrypted by only a user having a valid license, that is, a right of valid use of content which is recorded in the media, and is issued by the key distribution center (KDC), as described above. The EKB is recorded in the user area of media 500.

b. ICV Key

The ICV key is generated by a key generator 421 such as a random number generator, and the generated ICV key is stored in the protected area of the media 500. Data writing to the protected area is executed as a process by a dedicated IC 425 as a dedicated circuit for secret-information recording/playback, that is, as a process for writing to a specified area, or a specified signal processing method.

c. ICV

The ICV is an integrity check value generated by using the ICV-generation verifying key to act on the DRM data (rights data, content ID, and encrypted content), and is generated by the processing construction in FIG. 2. The ICV-generation verifying key is a key generated in a key generating unit (Func) 422 in FIG. 12 by using the EKB keys (e.g., the root key, the key encryption key KEK) to act (e.g., DES encryption processing) on the ICV key generated by the key generator 421. The rights data and the content identifier which constitute the DRM data, and the encrypted content key are input to the authoring device, and it generates the DRM data. The encrypted key is generated such that the content key (Kc) generated by the key generator 411 is encrypted using the EKB keys (e.g., the root key, the key encryption key (KEK)) by an encryption processor (Enc) 412.

By using the ICV-generation verifying key to act on the thus generated DRM data including the encrypted content key, the rights data, and the content ID, the ICV generating means (Calculate ICV) 423 generates an integrity check value (ICV) in the construction in FIG. 2, and the generated ICV is stored in the protected area of the media 500. Data writing to the protected areas is executed as a dedicated IC 425 as a dedicated circuit for secret-information recording/playback in the media interface 424, that is, as a process for writing to a specified area, or a specified signal processing method.

d. DRM Data

The DRM data constituted by the rights data, the content ID, and the encrypted content key is data that is input to the above ICV generating means (Calculate ICV) 423, and DRM data identical to the input data is written into the user area of the media 500. This DRM data is written into the user area, in which recording/playback can be performed by a common recording/playback process.

e. Encrypted Content

The encrypted content is data encrypted by using the content key to encrypt content to be recorded in the media. Input content is encrypted using the content key generated by the key generator 411 by the encryption processor 413, and is written in the user area of the media 500. The encrypted content is written in the user area, in which recording/playback can be performed by the common recording/playback process.

Figure 13:
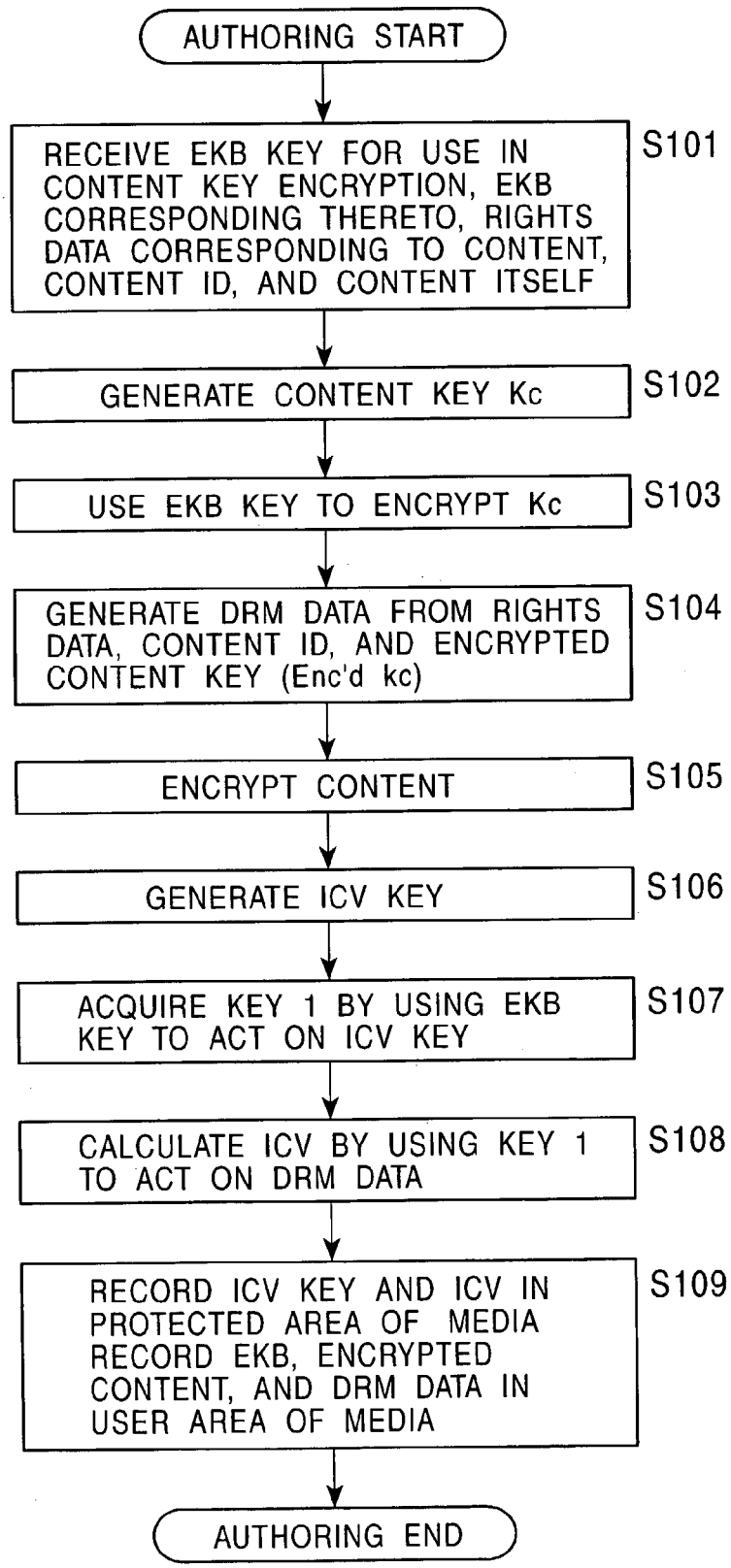
FIG. 13 is an illustration of a processing flow by an authoring device that execute a process for storing content in media in the system of the present invention.

FIG. 13 shows an illustrating flow of the encryption on digital content in the authoring device and the process for recording to the media. The steps are described.

First, an EKB key for use in content key encryption, an EKB which can be processed by a valid device and which can acquire EKB keys, rights data corresponding to the recording content, a content ID, and content are received (S101).

Next, a content key (Kc) is generated (S102) by the key generator 411, and the generated content key is encrypted (S103) by using the EKB key.

Based on the generated encryption content key, rights data, and content ID, DRM data is generated (S104), and encryption on the content is executed (S105) based on the content key (Kc).

Next, an ICV key is generated (S106) by the key generator 421. In the key generating unit (Func) 422 in FIG. 12, by using the EKB key (e.g., the root key, the key encryption key (KEK)) to act (e.g., DES encryption processing) on the ICV key generated by the key generator 421, an ICV-generation verifying key (key 1) is generated (S107).

By using the generated ICV-generation verifying key (key 1) to act on the DRM data including the encrypted content key, the rights data, and the content ID, the ICV generating means (Calculate ICV) 423 generates an ICV (S108) in accordance with the construction in FIG. 2.

The ICV key and the ICV generated as described above are recorded in the protected area of the media, while the EKB, the encrypted content, and the DRM data (the encrypted content key, the rights data, the content ID) are recorded in the user area of the media (S109). After that, the process ends.

[To-Media Recording Process in Recording Device]

Next, a to-media content recording process in a recording device as the user device that can record content is described. The recording device as the user device can record, in the media, content that is input to the device through a digital or analog interface. The content is content provided by a content provider, or content (e.g., self-recording/playback) that the user generates and acquires in another device, etc.

When the content is recorded, the encrypted content as a result of encryption using the content key is recorded in the user area of the media. The DRM data constituted by the rights data, the content ID, and the encrypted content key is recorded in the user area. An integrity check value (ICV) for the DRM data, an ICV key for generating an ICV-generation verifying key for verifying the generation of the integrity check value (ICV) are recorded in the protected area of the media. An EKB for use in generating the ICV-generation verifying key and in generating the content key are recorded in the user area of the media.

Regarding the EKB to be recorded in the media, for example, when an EKB is added to content as in the content provided to the user device, the EKB, which is input, is used. In the case of recording content having no EKB, as in a self-recording/playback mode, a self-recording/playback EKB stored in the device is used. The self-recording/playback EKB is an enabling key block (EKB) that is stored in the device beforehand, and is, for example, an EKB that can be decrypted only when a key set (key set consisting of a leaf key and a node key) stored in a particular device group is used. This EKB may be, for example, one that is stored in the media beforehand, and this case only needs to use such an appropriate method that, for content that is stored in the media, an EKB stored in the media beforehand must be used. When a revocation process on an invalid device is performed, an EKB having an updated version is provided to the user device through the network or media.

Figure 14:
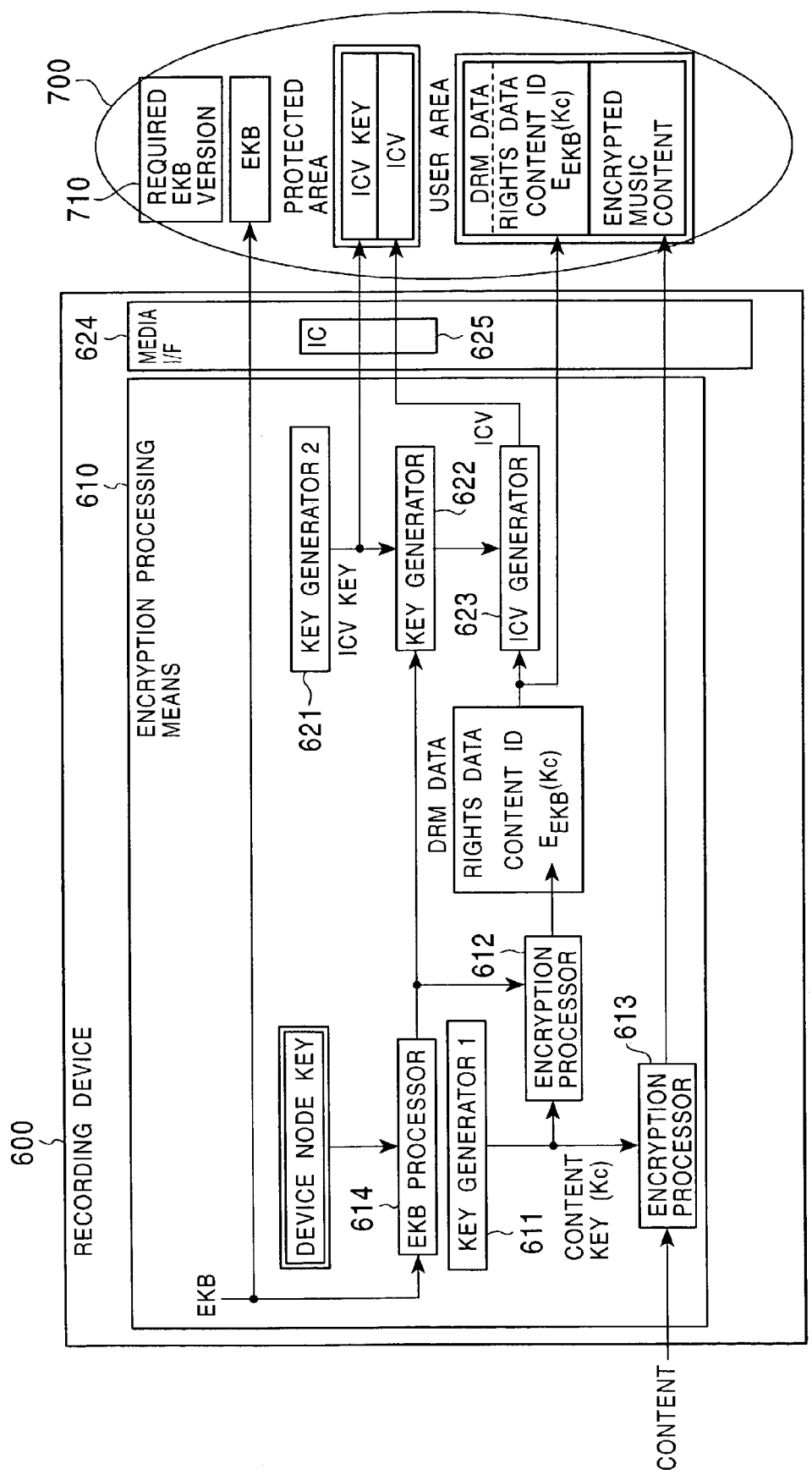
FIG. 14 is an illustration of the structure of a user device that executes a process for storing content in media in the system of the present invention.

In FIG. 14, a block diagram illustrating content encryption and recording process on media by a user device in which digital data can be recorded is shown.

As FIG. 14 shows, a user device 600 executes processing in which, for media 700, an EKB, DRM data (rights data, content ID, encrypted content key), and encrypted content are written in the user area, while an ICV key as the source data of an ICV-generation verifying key, and an integrity check value (ICV) generated by using the ICV-generation verifying key to act on the DRM data are written in the protected area. Processes for generating and recording each type of data are described. Although FIG. 14 shows an encryption processing means 610 (corresponding to the encryption processing means 150 in FIG. 1) in a form in which it is functionally divided into processors in accordance with a processing sequence, FIG. 14 does not show that such various processors are separate, but simply shows that the processes are executed by the encryption processing means 610 and shows the functions in divided blocks.

The required EKB version 710 shown in the top portion of the media 700 in FIG. 14 is data representing a lowest EKB version used when content is recorded in the media 700, and is recorded in the user area. First, after reading an EKB version recorded in the media, the device executes comparison with an EKB version for use in content recording, and become able to perform EKB-used content recording only when the used version is not older than the version recorded in the media. This process is further described in the description of the processing flow in FIG. 17. Here, assuming that the device has already acquired the latest EKB, processing for writing each type of data is described.

a. EKB

The EKB is an EKB that can be decrypted only by a user having a right of valid use of content to be recorded in the media. It is issued by the key distribution center (KDC), as described above, and is an EKB that is set correspondingly to content, or an EKB that is stored as one for self recording/playback in the device beforehand. The EKB is recorded in the user area of the media 700.

b. ICV Key

The ICV key is generated by the key generator 2 or 621 as a random number generator, and the generated ICV key is stored in a protected area on the media 700. Data writing to the protected area is executed as a process by a dedicated IC 625 as a secret-information recording/playback circuit in a media interface 624, that is, by a writing process to a specified area for a specified signal processing method.

The ICV is an integrity check value generated by using the ICV-generation verifying key to act on the DRM data (the rights data, the content ID, the encrypted content key), and is generated by the above-described processing structure in FIG. 2. The ICV-generation verifying key is generated in the key generating unit (Func) 622 by using the EKB key (e.g., the root key, the key encryption key (KEK)) to act (e.g., DES encryption processing) on the ICV key generated by a key generator 621. The EKB key is a key (see FIGS. 6 and 9) that can be acquired in an EKB processor (Process EKB) 614 by performing decryption on the EKB by using a key set (a leaf key and a node key) of the device. The user device generates the ICV-generation verifying key by performing processing (e.g., DES encryption) on the ICV key by using the EKB key acquired in the EKB processor (Process EKB) 613 by performing decryption on the EKB.

Rights data forming the DRM data, the content identifier, and the encrypted content key are input to the user device, and it generates DRM data. The encrypted content key is generated in the encryption processor (Enc) 612 by using the EKB key (e.g., the root key, the key encryption key (KEK) to encrypt a content key (Kc) generated by the key generator 1 or 611.

By using the ICV-generation verifying key to act on the generated DRM data including the encrypted content key, the rights data, and the content ID, an ICV generating means (Calculate ICV) 623 generates an integrity check value (ICV), and stores the generated ICV in the protected area of the media 700. Data writing to the protected area is executed as a process by the dedicated IC 625 as a dedicated secret-information-recording/playback circuit, that is, as a process for writing to a specified area, or a specified signal processing method.

d. DRM Data

The DRM data constituted by the rights data, the content ID, and the encrypted content key is data that is input to the above ICV generating means (Calculate ICV) 623, and DRM data identical to the input data is written in the user area of the media 700. The DRM data is written in a recordable/playable user area by common recording/playback processing.

e. Encrypted Content

The encrypted content is data obtained by using a content key to encrypt content to be recorded in media. By using a content key generated by the key generator 1 or 611, the encryption processor 613 encrypts input content, and writes the content in the user area of the media 700. By common recording/playback processing, the encrypted content is written in the user area, in which recording/playback can be performed.

As described above, in this user device, by using an EKB key obtained by processing the EKB corresponding to content, a content key used for content encryption which differs for each piece of content is encrypted, and DRM consisting of the encrypted content key, the content ID of content to be recorded, and rights data representing usage of the content is generated and recorded. In the rights data, rules on, for example, how to play back or copy, are described as mentioned above. Specifically, the number (play N times) of times playback is performed, the number (copy N times) of times copying is performed, an allowable number (copy N generation) of generations for intergeneration copying, etc., are enumerated.

Also, DRM data including these pieces of information is protected by the ICV so as not to be falsified. The ICV is a value generated for the DRM data, using a key (ICV-generation verifying key) generated by using the EKB key to act on an ICV key differing for each record. Processing as described using FIG. 2, specifically, for example, the DES-MAC algorithm described in ISO/IEC 9797 is used. The user device safely stores, in the protected area of the media, the ICV key used for the ICV calculation and the generated ICV itself, and can verify no falsification of DRM data by checking the ICV when using the DRM data in cases such as content playback and copying.

[Process for Recording Integrity Check Value (ICV)]

Figure 15:
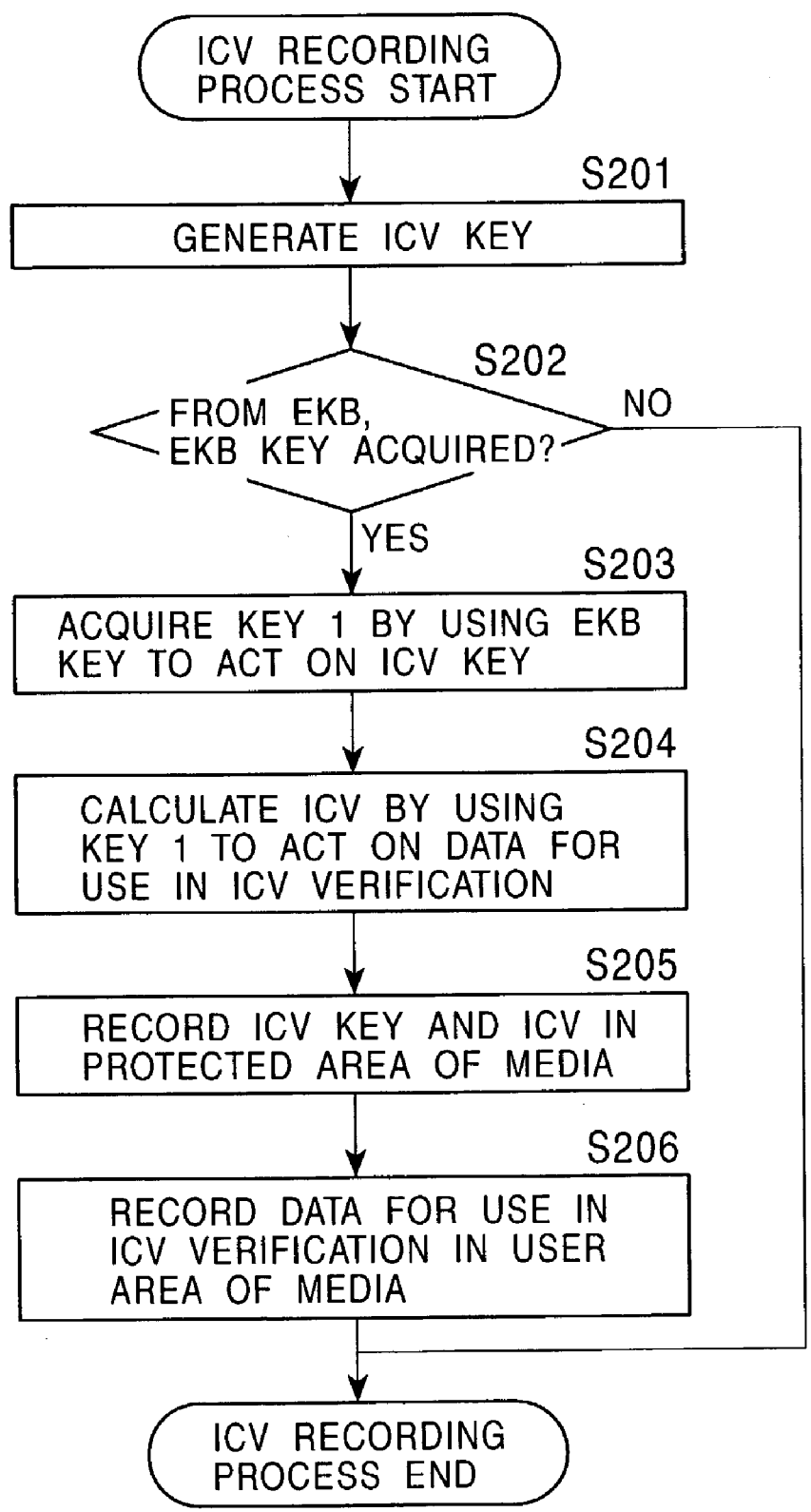
FIG. 15 is an illustration of a process flow for generating and recording an integrity check value (ICV) by using an EKB key in the system of the present invention.

Details of the process for generating and recording the ICV by the user device are described in accordance with the processing flow in FIG. 15.

First, by using the key generator 2 or 621 such as a random number generator, the ICV key is generated (S201). Next, by using a key set (a leaf key and a node key) that the device possesses, the EKB processor (Process EKB) 614 executes the process for decrypting the EKB. When acquisition of the EKB key is a success (Yes in S202), the process proceeds to step S203. When the device has been revoked, etc., it is impossible to acquire the EKB key by decrypting the EKB (No in step S202), the process ends.

Next, by using the EKB key to act (e.g., DES encryption processing) on the ICV key generated by the key generator 621, key 1 (ICV-generation verifying key) is acquired (S203), and by using key 1 (ICV-generation verifying key) to act on the DRM data (rights data, content ID, an encrypted content key), the integrity check value (ICV) is generated (S204) in the processing construction.

Next, the generated ICy key and ICV are recorded in the protected area of the media (S205), and data to be checked by using the ICV, that is, the DRM data (the rights data, the content ID, the encrypted content key) is recorded in the user area of the media (S206). In the case of the ICV key and the ICV, the process by the dedicated IC 625 as the dedicated secret-information recording/playback circuit in the media interface 624, that is, the process for writing to the specified area or particular signal-processing method is executed.

[Data Verifying Process Based on Integrity Check Value (ICV)]

Figure 16:
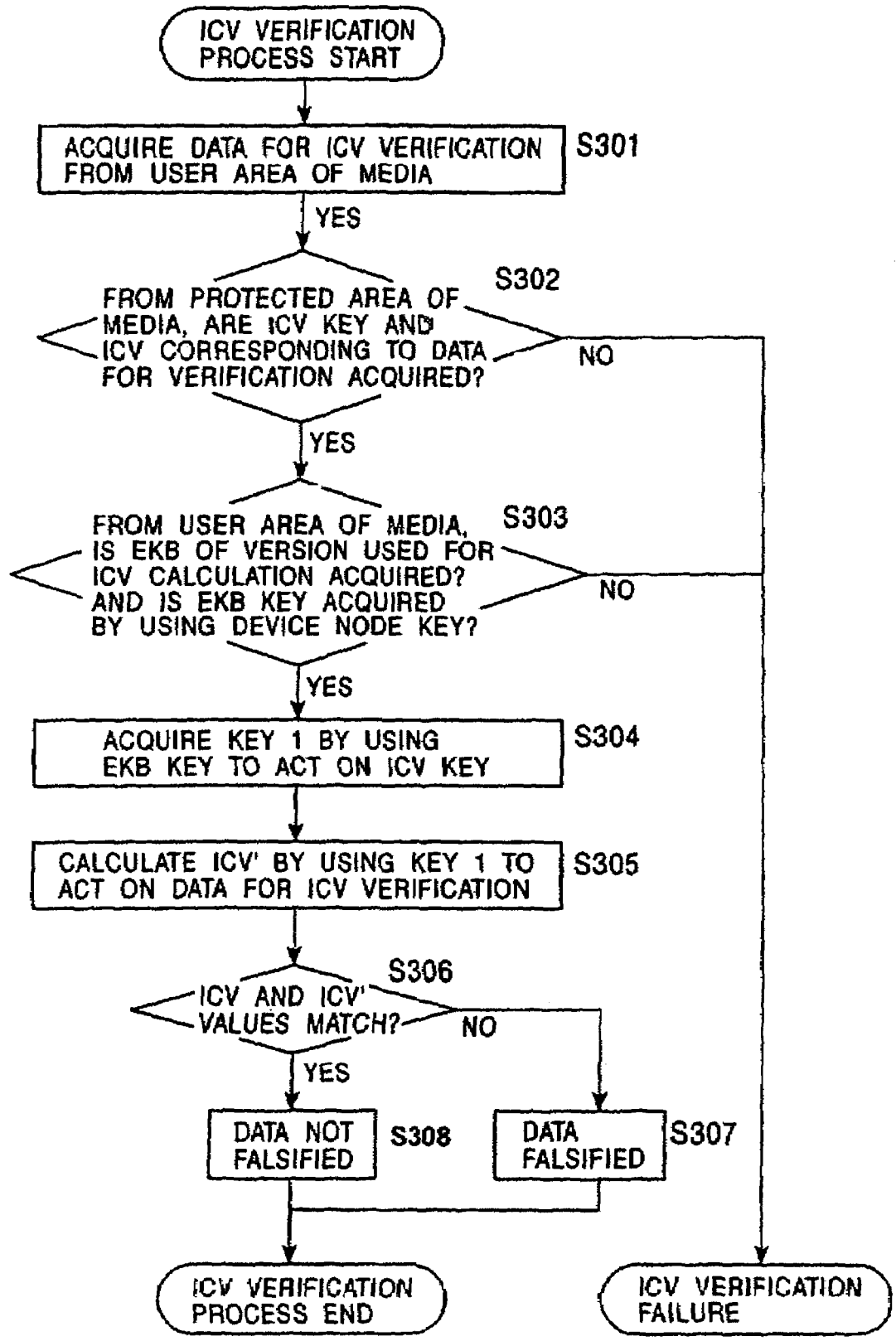
FIG. 16 is an illustration of a processing flow for verifying an integrity check value (ICV) by using an integrity check value (ICV) in the system of the present invention.

Next, a process that, by using the ICV written in the media by the above-described method, performs integrity checking on data to be verified is described in accordance with the processing flow in FIG. 16.

First, the data to be verified based on the ICV, in this case, the DRM data (the rights data, the content ID, the encrypted content key) is read from the user area of the media (S301). Next, reading of the ICV and the ICV key from the protected area of the media is executed. As described above, playback of data recorded in the protected area is executable by the IC (the IC 195 in FIG. 1) that executes, as a dedicated secret-information recording/playback circuit, dedicated processing. It is impossible for a device including no dedicated IC to perform reading.

When the reading of the ICV and the ICV key from the protected area of the media (S302) fails, the verification process cannot be executed and the process ends. When a device that includes a dedicated IC for executing the dedicated processing succeeds in reading the ICV and the ICV key, in step S303, it reads the EKB used for ICV calculation from the user area of the media, and acquires the EKB key by using its stored key set (a leaf key, a node key) to decrypt the read EKB. When the device has been revoked, etc., it fails to decrypt the EKB, so that it ends the process since subsequent processes cannot be executed.

When it succeeds in acquiring the EKB key decrypting the EKB by using its stored key set (the leaf key, the node key), it acquires key 1 (ICV-generation verifying key) (S304) by using the EKB to act (e.g., DES encryption processing) on the ICV key, and generates the ICV' (S305) in accordance with the processing described using FIG. 2 by using as a message the data to be checked by ICV verification which is read in step S301, that is, the DRM data (the rights data, the content ID, the encrypted content key).

In step S306, the process determines whether or not ICV=ICV' holds. When it does not hold, it is determined that the DPJA data as the data to be verified has been falsified (S307), and the process ends. Alternatively, when ICV=ICV' holds, it is determined that the DEN data as the data to be verified has not been falsified (S308), and the process ends.

[Content Recording Process in User Device]

Figure 17:
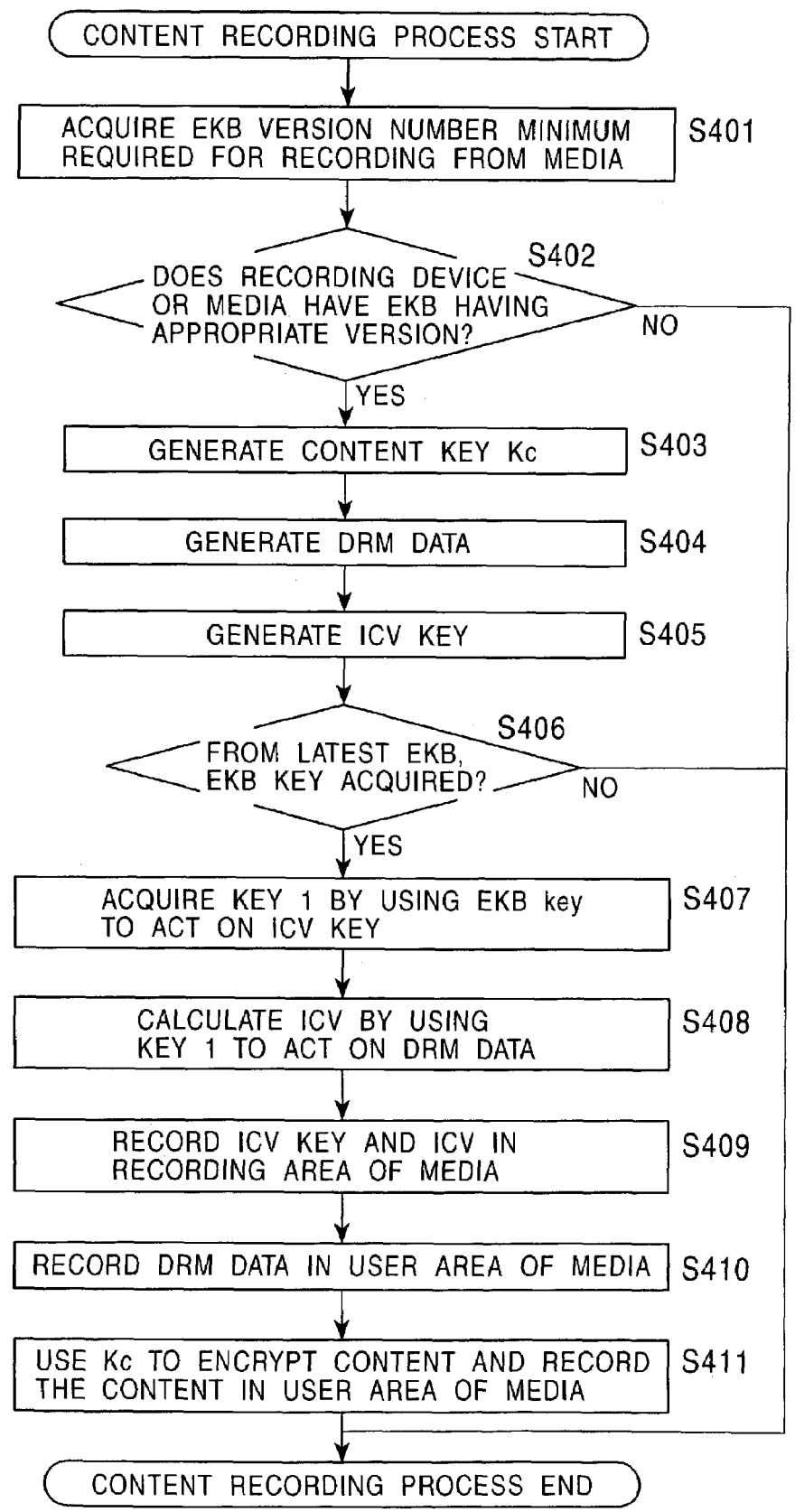
FIG. 17 is an illustration of a processing flow by a user device that executes a process for storing content in media in the system of the present invention.

Next, a content recording process in the user device is described in accordance with the processing flow in FIG. 17.

First, the user device reads an EKB version number from media that it attempts to record content (S401). A required EKB version is a number representing the lowest EKB version used when content is recorded in media.

The EKB is updated in cases such as device revocation, as described above, and is provided with a version number whenever updating is performed. In data-recordable media, the latest EKB version number is recorded in the user area since a content record using an EKB having an old version is revoked. Accordingly, the device executes comparison between the version of an EKB that it attempts to use and the EKB version recorded in the media, and becomes able to perform EKB-used content recording only when the version of the EKB for use is not older than the version recorded in the media.

When it is determined in the comparing process in step S402 that the EKB version for use is older than the version recorded in the media, the device ends the process without proceeding to the next step, and content recording is not executed. When it is determined in the comparing process in step S402 that the EKB version for use is not older than the version recorded in the media, then the device generates the content key (S403). The content key is generated by the key generator 1 or 611 (see FIG. 14).

Next, the user device generates the DRM data (S404). By acquiring rights data and a content identifier which constitute the DRM data with an encrypted content key, the DRM data is generated. The encrypted content key is generated such that the encryption processing unit 612 encrypts the content key (Kc) generated by the key generator 1 or 611 by using the EKB key (e.g., a root key, a key encryption key (KEK)).

Next, the ICV key is generated (S405) by the key generator 2, 621 such as a random number generator.

Also, in step S406, by using the key set (the leaf key and the node key) that the device possesses, the EKB processor (Process EKB) 614 executes the process for decrypting the EKB. When acquisition of the EKB key is a success (Yes in step S406), the device proceeds to step S407. When the device is revoked, etc., the EKB key cannot be acquired by decrypting the EKB (No in step S406), and the process ends.

Next, by using the EKB key to act (e.g., DES encryption processing) on the ICV key generated by the key generator 621, key 1 (ICV-generation verifying key) is acquired (S407), and by using key 1 (ICV-generation verifying key) to act on the DRM data (the rights data, the content ID, the encrypted content key), the integrity check value (ICV) is generated (S408) in the processing construction in FIG. 2.

Next, the generated ICV key and ICV are recorded in the protected area of the media (S409), and the data to be checked based on the ICV, that is, the DRM data (the rights data, the content ID, the encrypted content key) is recorded in the user area of the media (S410). In the case of the ICV key and the ICV, the process by the dedicated IC 625 as the dedicated secret-information recording/playback circuit, that is, the process for writing to the specified area or the particular signal-processing method is executed.

Also, the content is encrypted by using the content key generated in step S403 and is recorded in the user area of the media (S411), and the process ends.

[Content Playback Process (a) In User Device]

Next, the content playback process in the user device is described. A playback device as the user device can play back content by using the media interface from media (e.g., a CD, a DVD, etc.) in which content is recorded in digital data. The content needs to be processed for decryption since it is recorded in an encrypted form, and needs, in a playback mode, execution of verification of the above integrity check value (ICV).

Also, when various usage restrictions, such as, for example, a restriction on the number of times playback is performed and a restriction on the number of times copying is performed, are added as the rights data in the above DRM data, there may be a case in which updating of these restrictions is required. In this case, updating of the rights data is executed and it is required that the integrity check value (ICV) based on the DRM data including the rights data be updated and written in the media.

Figure 18:
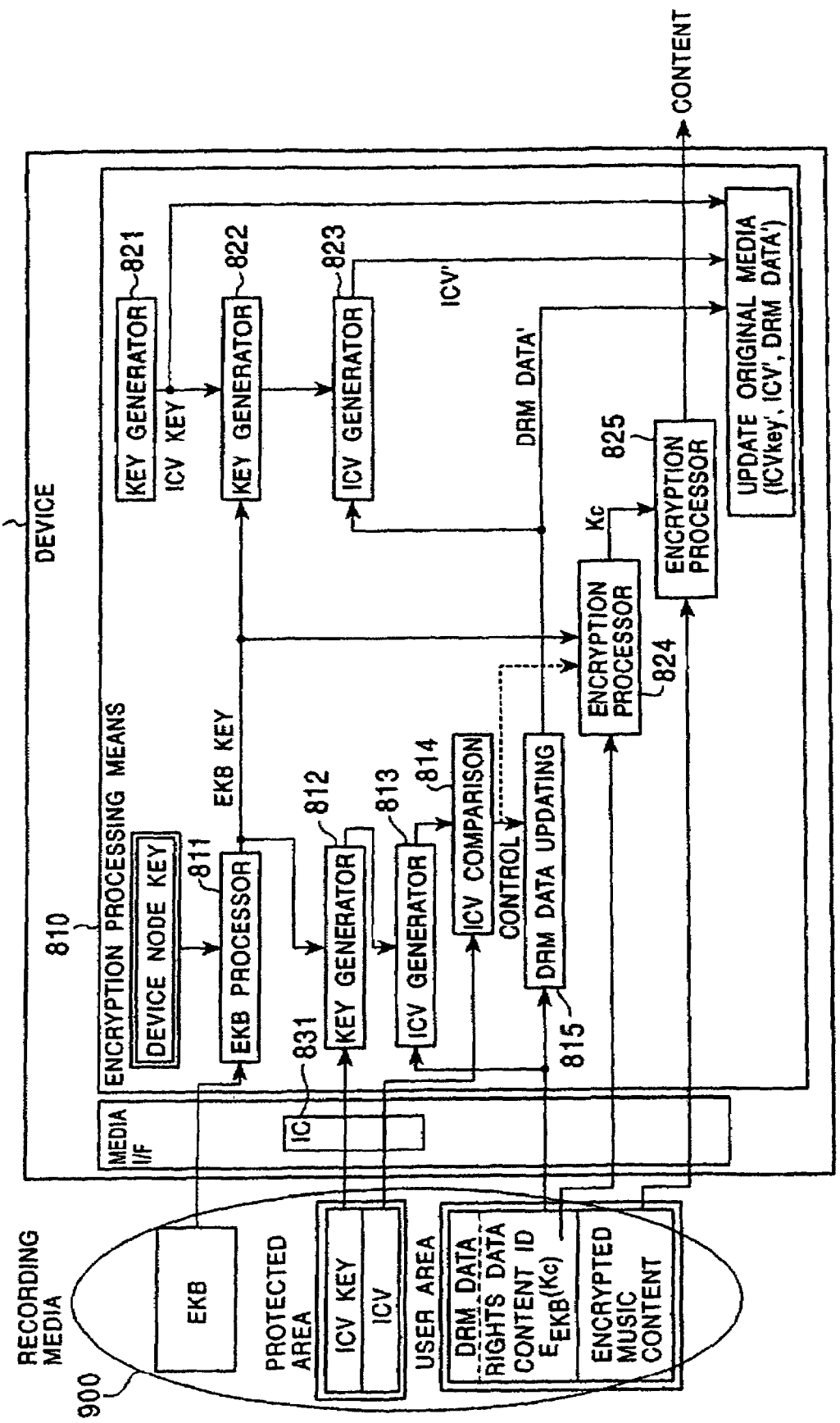
FIG. 18 is an illustration of the processing structure of a user device that executes a process for playing back content from media in the system of the present invention.
Figure 19:
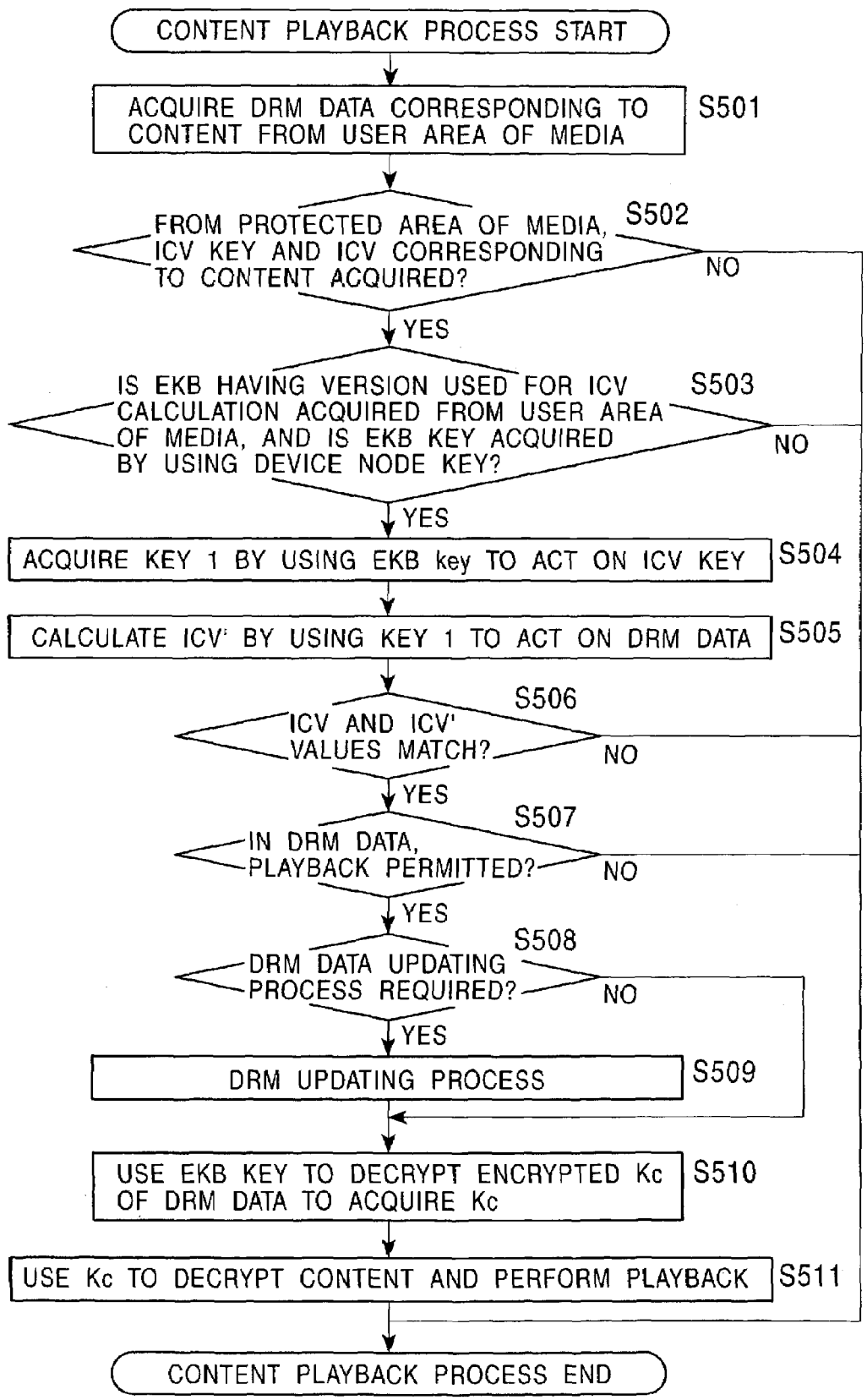
FIG. 19 is an illustration of a processing flow (example 1) by a user device that executes a process for playing back content from media in the system of the present invention.

A process for playing back content from media is described using FIG. 18 and FIG. 19. It is described in accordance with the processing flow in FIG. 19 with reference to FIG. 18. Although FIG. 18 shows an encryption-processing means 810 (corresponding to the encryption-processing means 150 in FIG. 1) in a form that is functionally divided into processing units in accordance with a processing sequence, it does not show that the various processing units are separate, but simply shows each function as a divided block for description because each process is executed by the encryption-processing means 810.

First, from the user area of media 900, the user device reads DRM data corresponding to content to be played back (S501). The DRM data includes rights data, a content ID, and an encrypted content key.

Next, the device reads the ICV key and ICV corresponding to the content from the protected area of the media 900. This reading process is executed by using a dedicated IC 831 for playing back in-protected-area data. Therefore, reading can be performed only in a device including the IC 831. When the reading of the ICV key and the ICV in step S502 fails, the sequence of the subsequent playback processing flow is stopped and the process ends in a playback process error.

When the reading of the ICV key and the ICV in step S502 is a success, the device reads an EKB having a version used for ICV calculation from the user area of the media 900, and executes decryption of the EKB in an EKB processor 811 (see FIG. 18) by using its key set (a leaf key and a node key), whereby an EKB key is acquired (S503). At this time, when the device has been revoked, etc., EKB processing using the key set stored in the device should fail, so that acquisition of the EKB key cannot be performed. In this case, the sequence of the subsequent playback processing flow is stopped and the process ends in a playback process error.

When the EKB processing using the key set stored in the device is a success, and acquisition of the EKB key is a success, by using the EKB key acquired in step S503 to act (e.g., DES encryption processing) on the ICV key acquired in step S502 in a key generator (Func) 812, key 1 (ICV-generation verifying key) is generated (S504).

Next, in step S505, the device generates a verifying integrity-check value (ICV') in an TCV generating means (Calculate ICV) 813 in accordance with the above-described construction in FIG. 2 by, for the DRM data read from the user area of the media in step S501, using the key 1 (ICV-generation verifying key) generated in step S504.

Next, the generated verifying integrity-check value (ICV'), and the ICV read from the media in step S502 are compared (S506) by an ICV comparison means 814. When ICV=ICV' holds, it is determined that the DPJA data is not falsified, and the process proceeds to the next step. When ICV=ICV' does not hold, it is determined that the DRM data is falsified, and the sequence of the subsequent playback processing flow is stopped and the process ends in a playback process error.

When ICV=ICV' holds, checking of the rights data in the DRM data is performed (S507). Specifically, the checking includes, for example, whether or not the number of times playback and use is performed is within a limit. When playback is permitted, the process proceeds to the next step. When the playback is not permitted, the sequence of the subsequent playback processing flow is stopped and the process ends in a playback process error.

When the playback is permitted, it is determined whether or not updating of the DRM data is required (S508), and if the updating is required, updating of the DRM data is executed by, for example, a DRM data updating unit 815. Specifically, for example, when the rights data of the DRM data has setting such as the number of times playback can be performed: N, a process for rewriting the number of times playback can be performed into N−1 is executed. Also, a process is executed in which a new integrity check value (ICV) is generated base don the rewritten DPM data and is written as an updated ICV in the media.

The generation of the ICV in the DRM data updated case is described using the processing block diagram in FIG. 18. The device generates an ICV key in a key generator 821 such as a random number generator, and generates an ICV-generation verifying key in a key generator (Func) 822 by using the EKB key to act (e.g., DES encryption processing) on the ICV key.

Also, in an ICV generating means (Calculate ICV) 823, by executing the ICV generating process described using FIG. 2 on the DRM data updated by using the ICV-generation verifying key, an integrity check value (ICV) updated based on the updated DRM data is generated. Each of the generated ICV key, ICV, and DRM data is stored in the media. These processes are executed only when updating of the DRM data is required.

Referring back to the flow in FIG. 19, the content playback process is continuously described. In step S508, updating of the DRM data is required, in step S509, the above-described DRM data updating and ICV updating are executed. When the updating of the DRM data is not required, step S509 is omitted and the process proceeds to step S510.

In step S510, the encrypted content key is extracted from the DRM data, and in the encryption-processing means 824, decryption of the encrypted content key is executed by using the EKB key acquired in step S503. Also in step S511, by executing decryption of the encrypted content in the encryption processing unit 825 by using the content key, the content is acquired and playback thereof is executed.

[Content Playback Process (b) in User Device]

Figure 20:
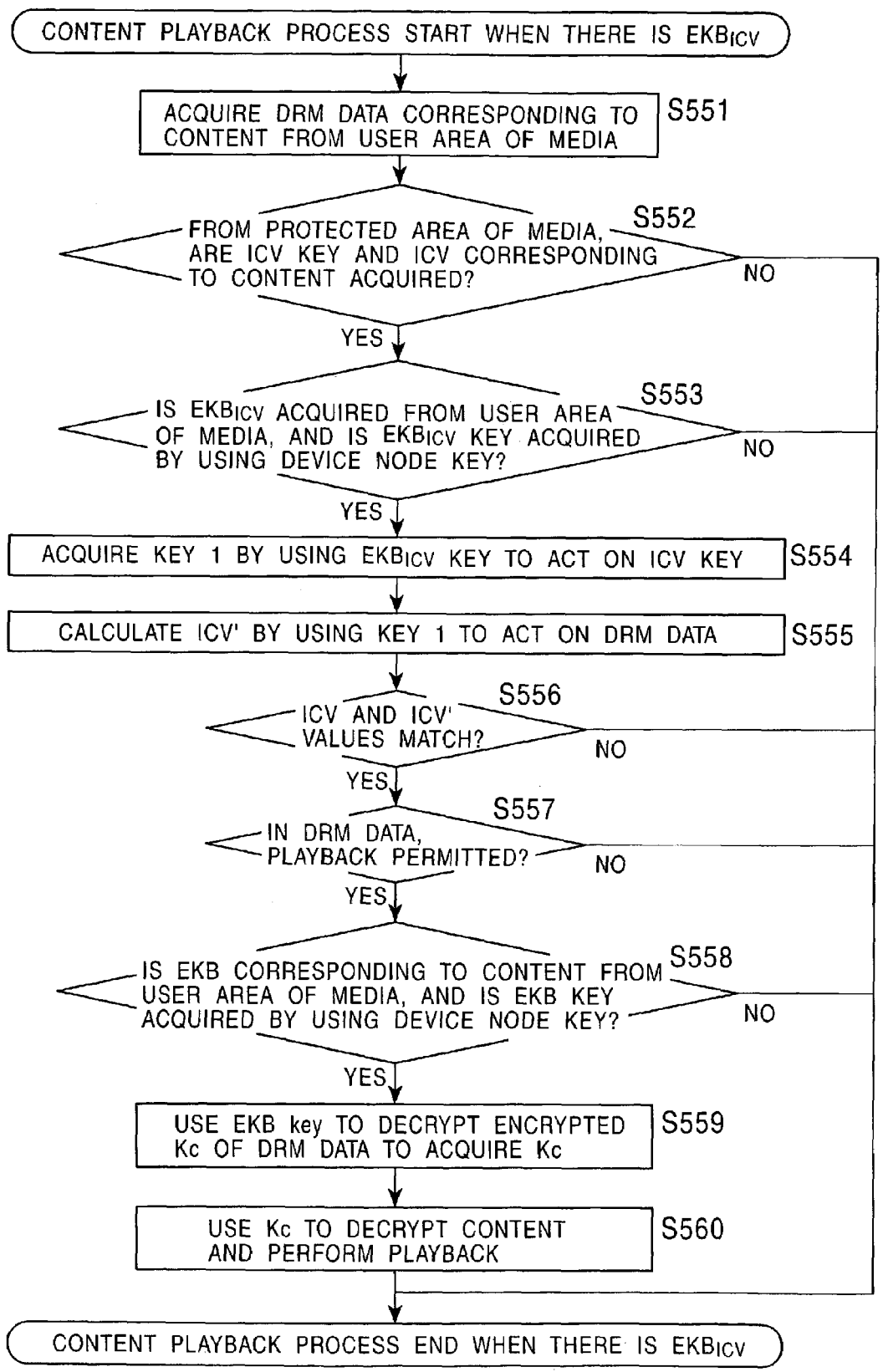
FIG. 20 is an illustration of a processing flow (example 2) by a user device that executes a process for playing back content from media in the system of the present invention.

Next, FIG. 18 and FIG. 20 are used to describe, in the content playback process in the user device, a case in which the encryption key for generating the ICV-generation verifying key, and the EKB key as an encrypted key of the content key Kc are stored by separate EKBs. The case is described in accordance with the processing flow in FIG. 20 with reference to FIG. 18.

First, from the user area of the media 900, the user device reads DRM data corresponding to content to be played back (S551). The DRM data includes rights data, a content ID, and an encrypted content key.

Next, the device reads an ICV key and an ICV which correspond to the content from the protected area of the media 900. This reading process is executed by using the IC 831 which is dedicated for playing back data in the protected area. Thus, the reading can be performed only in a device including the IC 831. When the reading of the ICV key and the ICV in step S552 fails, the sequence of the subsequent playback processing flow is stopped and the process ends in a playback process error.

When the reading of the ICV key and the ICV in step S552 is a success, then the device 800 acquires, from the user area of the media 900, EKBicv in which an EKB key for generating an ICV-generation verifying key is stored, and performs acquisition of an EKBicv key (S553) by using its key set (a leaf key and a device key) to perform decryption of the EKBicv. When the device has been revoked at this time, etc., EKBicv processing using the key set stored in the device should fail, so that the EKBicv key cannot be acquired. In this case, the sequence of the subsequent playback processing flow is stopped and the process ends in a playback process error.

When the EKBicv processing using the key set stored in the device is a success and the acquisition of the EKBicv is a success, key 1 (ICV-generation verifying key) is generated (S554) in the key generator (Func) 812 by using the EKBicv key acquired in step S553 to act on the ICV key acquired in step S552.

Next, by using the key 1 (ICV-generation verifying key) generated in step S554 for the DRM data read from the user area of the media in step S551, the device generates a verifying integrity-check value (ICV') (S555) in the ICV generating means (Calculate ICV) 813 in accordance with the above-described construction in FIG. 2.

Next, comparison of the generated verifying integrity-check value (ICV'), and the ICV read from the media in step S552 is performed (S556). When ICV=ICV' holds, it is determined that the DRM data is not falsified, and the process proceeds to the next step. When ICV=ICV' does not hold, it is determined that the DRM data is falsified, the sequence of the subsequent playback processing flow is stopped and the process ends in a playback process error.

When ICV=ICV' holds, checking of the rights data in the DRM data is performed (S557). Specifically, the checking includes, for example, whether or not the number of times playback and use is performed is within a limit. When playback is permitted, the process proceeds to the next step. When the playback is not permitted, the sequence of the subsequent playback processing flow is stopped and the process ends in a playback process error.

When the playback is permitted, the EKB corresponding to the content is read from the user area of the media 900, and the device acquires an EKB key as an encrypted key of the content key by using its key set (a leaf key and a node key) to execute decryption of the EKB in the EKB processor 811 (see FIG. 18) (S558). If the device has been revoked, etc., the EKB processing using the key set stored in the device should fail, so that the EKB key cannot be acquired. In this case, the sequence of the subsequent playback processing flow is stopped and the process ends in a playback process error.

Next, in step S559, the encrypted content key is extracted for the DRM data, and in the encryption processing unit 824, the EKB key acquired in step S558 is used to execute the process for decrypting the encrypted content key. Also in step S560, in the encryption processing unit 825, by using the content key to execute the decryption process on the encrypted content, content is acquired, and playback thereof is executed.

In the above flow, the DRM data updating process is omitted. However, updating of the DRM data is required, a DRM data updating process similar to that described using the flow in FIG. 19 is executed.

[Content Copy Process Between Devices]

Next, a content copy process between different devices, that is, a process for copying content from one device to the other device is described.

(Establishment of SAC (Secure Authenticated Channel))

For a content transfer between devices, a mutual authentication process between the devices is executed, and verification of both devices for communication is executed.

Figure 21:
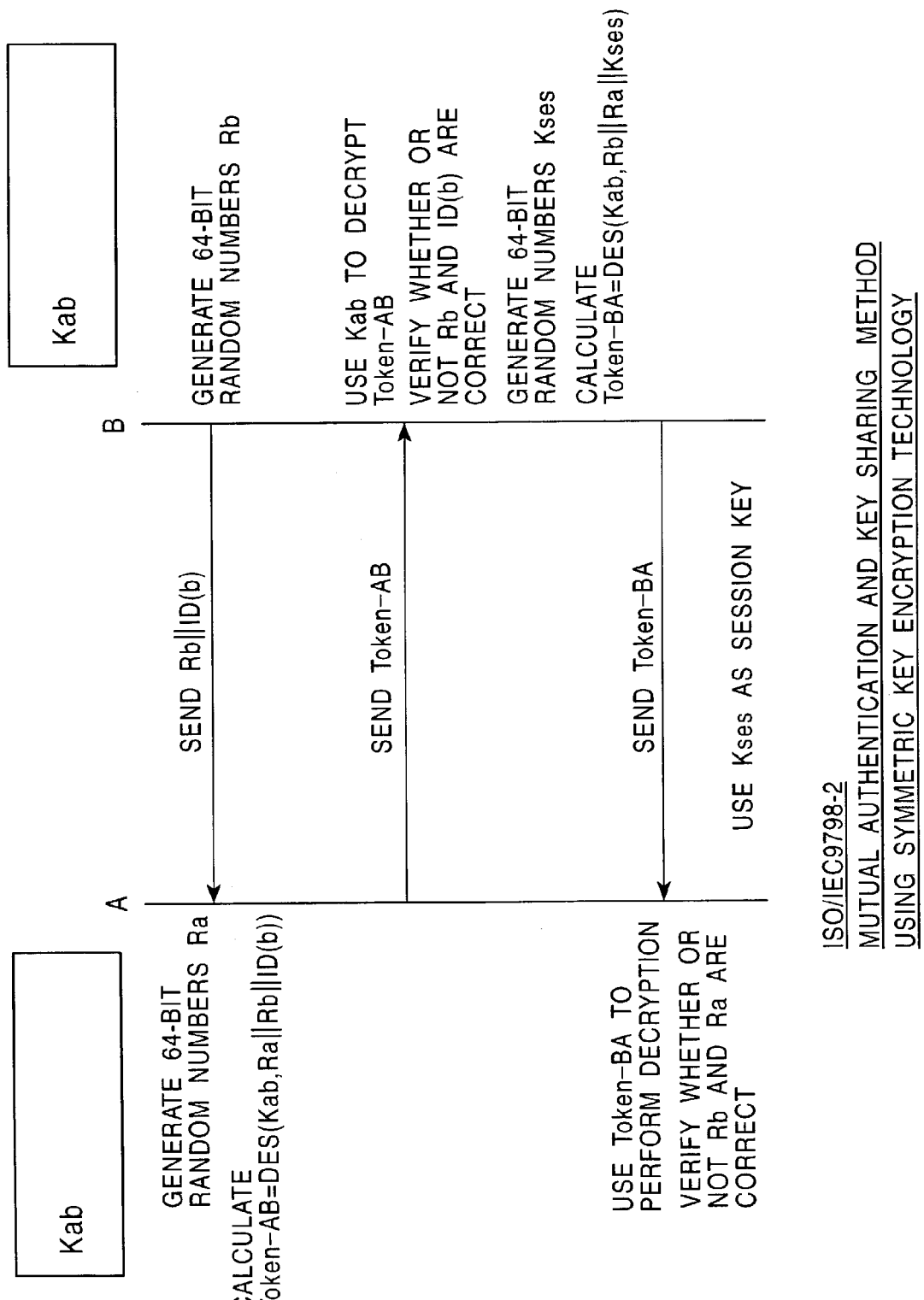
FIG. 21 is an illustration of a verification processing sequence based on a common key cryptosystem which is usable in the system of the present invention.

In FIG. 21 is shown a mutual authentication method (ISO/IEC 9798-2) using a common key cryptosystem. Although, in FIG. 21, DES is used as a common key cryptosystem, another system can be used within the common key cryptosystem. In FIG. 21, first, B generates 64-bit random numbers Rb, and transmits Rb and ID(b) as its own ID to A. A, which receives them, generates new random numbers Ra, encrypts data in the order of Ra, Rb, and ID(b) by using key Kab in the CBC mode of DES, and sends back the data to B. The key Kab is a key that is stored as a common secret key in a recording element of each of A and B. In encryption processing based on the key Kab using the CBC mode of DES, for example, in DES processing, exclusive logical addition of an initial value and Ra is implemented. In a DES encryption unit, a code E1 is generated by performing encryption using the key Kab, and to exclusive logical addition of the code E1 and Rb is consecutively implemented. In the DES encryption unit, a code E2 is generated by performing encryption using the key Kab, and exclusive logical addition of the code E2 and Id(b) is implemented. In the DES processing unit, a code E3 generated by performing encryption using the key Kab is used to generate a transmission data (Token-AB).

B, which receives this, decrypts the received data by using the key Kab (authentication key) that is stored as a common secret key in the recording element of each of both. In a method for decrypting the received data, first, by decrypting the code E1 by using the authentication key Kab, the random numbers Ra is obtained. Next, by using the authentication key Kab to decrypt the code E2, and implementing exclusive logical addition of the result and E1, Rb is obtained. Finally, by using the authentication key Kab to decrypt the code E3, and implementing exclusive logical addition of the result and E2, ID(b) is obtained. Among the obtained Ra, Rb, and ID(b), it is verified whether or not Rb and ID(b) match those transmitted by B. When they pass this verification, B authenticates A as it is valid.

Next, B generates a session key (Kses) for use after authentication (random numbers are used in the generating method). Rb, Ra, and Kses are encrypted in order by using the authentication key Kab in the CBC mode of DES, and are sent back to A.

A, which receives these, decrypts the received data by using the authentication key Kab. Since a method for decrypting the received data is similar to that in the decryption process by B, its details are omitted here. Among the thus obtained Rb, Ra, and Kses, it is verified whether Rb and Ra match those transmitted by A. When they pass this verification, A authenticates B as it is valid. After both authenticate each other, the session key Kses is used as a common key for secret communication after authentication.

When the received data verification finds invalidation or inconsistency, the mutual authentication is regarded as a failure, and the process is interrupted.

In the above authentication process, A and B shares the common authentication key Kab. The common authentication key Kab is distributed to the device by using the above-described enabling key block (EKB).

For example, the example in FIG. 21 may be formed so that either A or B transmits the authentication key Kab to the other one in a form encrypted by an enabling key block (EKB) which can be decrypted by both. Alternatively, the example may be formed so that the third party generates, for the devices A and B, an enabling key block (EKB) which can be encrypted by both, and distributes the authentication key Kab to the devices A and B in a form encrypted by using the generated enabling key block (EKB).

Figure 22:
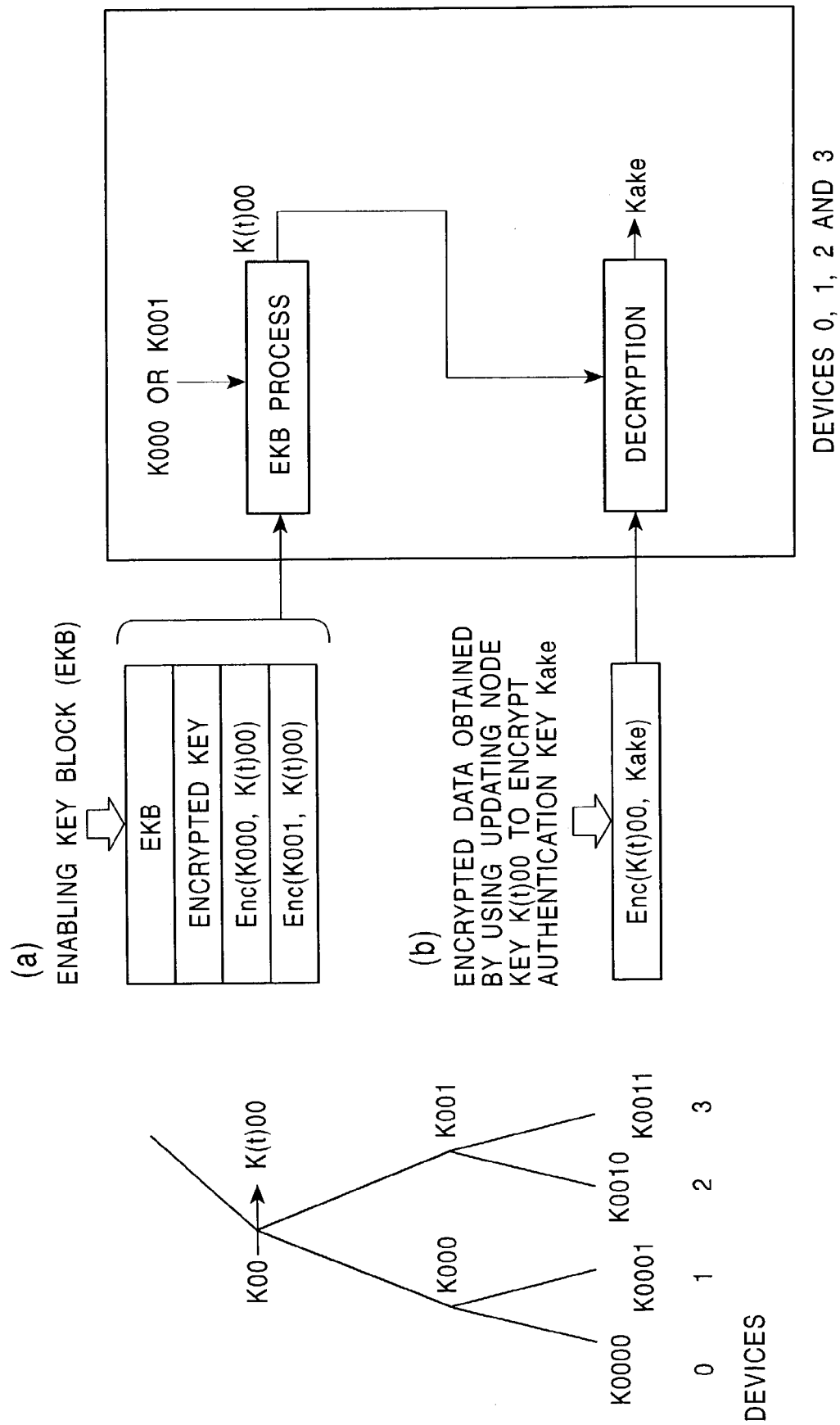
FIG. 22 consists of an illustration of data structure for distributing both an enabling key block (EKB) and an authentication key in the system of the present invention, and an illustration (No. 1) of an example of a process in a device.
Figure 23:
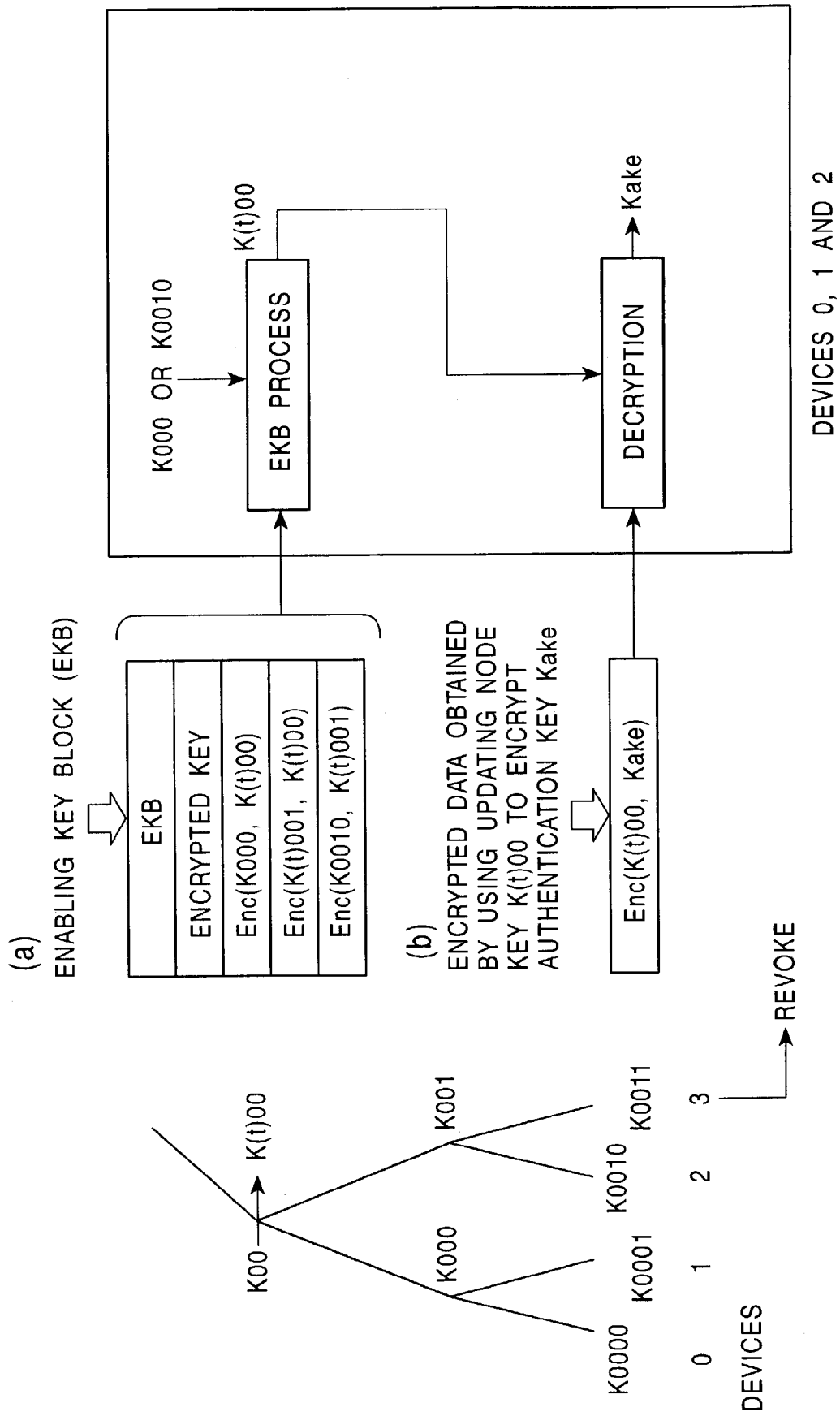
FIG. 23 consists of an illustration of data structure for distributing both an enabling key block (EKB) and an authentication key in the system of the present invention, and an illustration (No. 2) of an example of a process in a device.

In FIG. 22 and FIG. 23 are shown cases in which an authentication key Kake common to a plurality of devices is distributed by using the enabling key block (EKB). FIG. 22 shows a case in which a decryptable authentication key Kake is distributed to devices 0, 1, 2, and 3, and FIG. 23 shows a case in which a decryptable authentication key is distributed only to devices 0, 1, and 2 after revoking device 3 among devices 0, 1, 2, and 3.

In the case in FIG. 22, by using the updated node key K(t)00, an enabling key block (EKB) that can decrypt a node key K(t)00 updated by using the node and leaf keys of the device 0, 1, 2, or 3 is generated and distributed, with data (b) obtained by using the updated node key K(t)00 to decrypt the authentication key Kake. As shown on the right side of FIG. 22, each device acquires the updated node key K(t)00 by processing (decrypting) the EKB, and becomes able to acquire the authentication key Kake by using the acquired node key K(t)00 to decrypt the encrypted authentication key Enc(K(t)00, Kake).

Since the other devices 4, 5, 6, 7, . . . cannot acquire the updated node key K(t)00 by using their own node keys and leak keys to perform the EKB process, even if they receive identical enabling key blocks (EKBs), the authentication key can safely be sent to only a valid device.

In addition, in the case in FIG. 23, the device 3 in the group surrounded by the dotted line in FIG. 4 is regarded as revoked due to, for example, key leak, and a decryptable enabling key block (EKB) is generated and distributed only to members of another group, that is, the devices 0, 1, and 2. The enabling key block (EKB) (a) and the encrypted data obtained by using the node key (K(t)00) to encrypt the authentication key (Kake) which are shown in FIG. 23 are generated and distributed.

On the right side of FIG. 23 is shown a decryption procedure. First, the device 0, 1, or 2 acquires the updated node key (K(t)00) by performing decryption processing using its own leaf key or node key from the received enabling key block. Next, the authentication key Kake is acquired by decryption based on K(t)00.

The devices 4, 5, 6, . . . of another group shown in FIG. 4 cannot acquire the updated node key (K(t)00) by using their own leaf keys and node keys, even if they receive similar data (EKB). Similarly, the revoked device 3 cannot acquire the updated node key (K(t)00) by using its own leaf key and node key. Only a device having a legitimate right can use the authentication key by performing decryption.

As described above, by using the distribution using the EKB of the authentication key, the amount of data can be reduced and an authentication key set so as to be decrypted by a valid right holder can safely be distributed.

As a result of the above-described mutual authentication process, devices share a session key and can execute secure communication by executing encryption and decryption processing using the session key of communication data. In this way, between the devices, content transfer (copy) is executed after a secure communication channel (SAC (Secure Authenticated Channel)) is established.

The processes of devices on a content data transmitting side and a content data receiving side in the copy process are described below.

(a-1. Processes in Data Transmitting Device)

First, processes in a data transmitting side are described. A playback device as the data transmitting device uses a media interface to read content from media (e.g., a CD, a DVD, etc.) in which content is recorded in digital data. In a playback mode, it is required that the above-described integrity check value (ICV) verification be executed.

Also, when various usage restrictions, such as a restriction on the number of times copying can be performed, is added as rights data in the above-described DRM data, it is required that these usage restrictions be updated based on content copying. In this case, updating of the rights data is executed and a process in which the integrity check value (ICV) based on the DRM data including the rights data is updated and written in the media is required.

Figure 24:
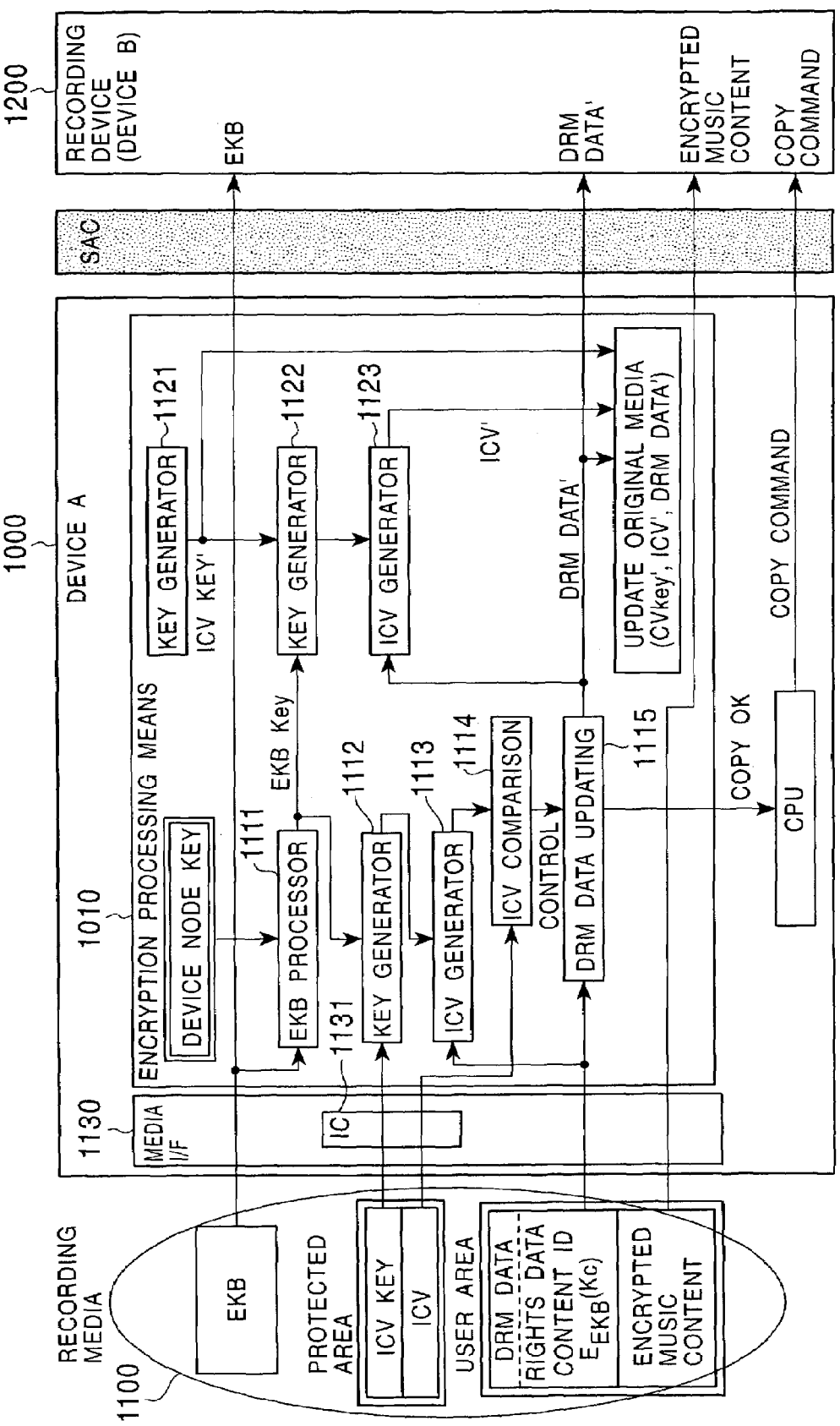
FIG. 24 is an illustration of the processing structure of a user device as a copy source that executes a process for copying content between pieces of media in the system of the present invention.
Figure 25:
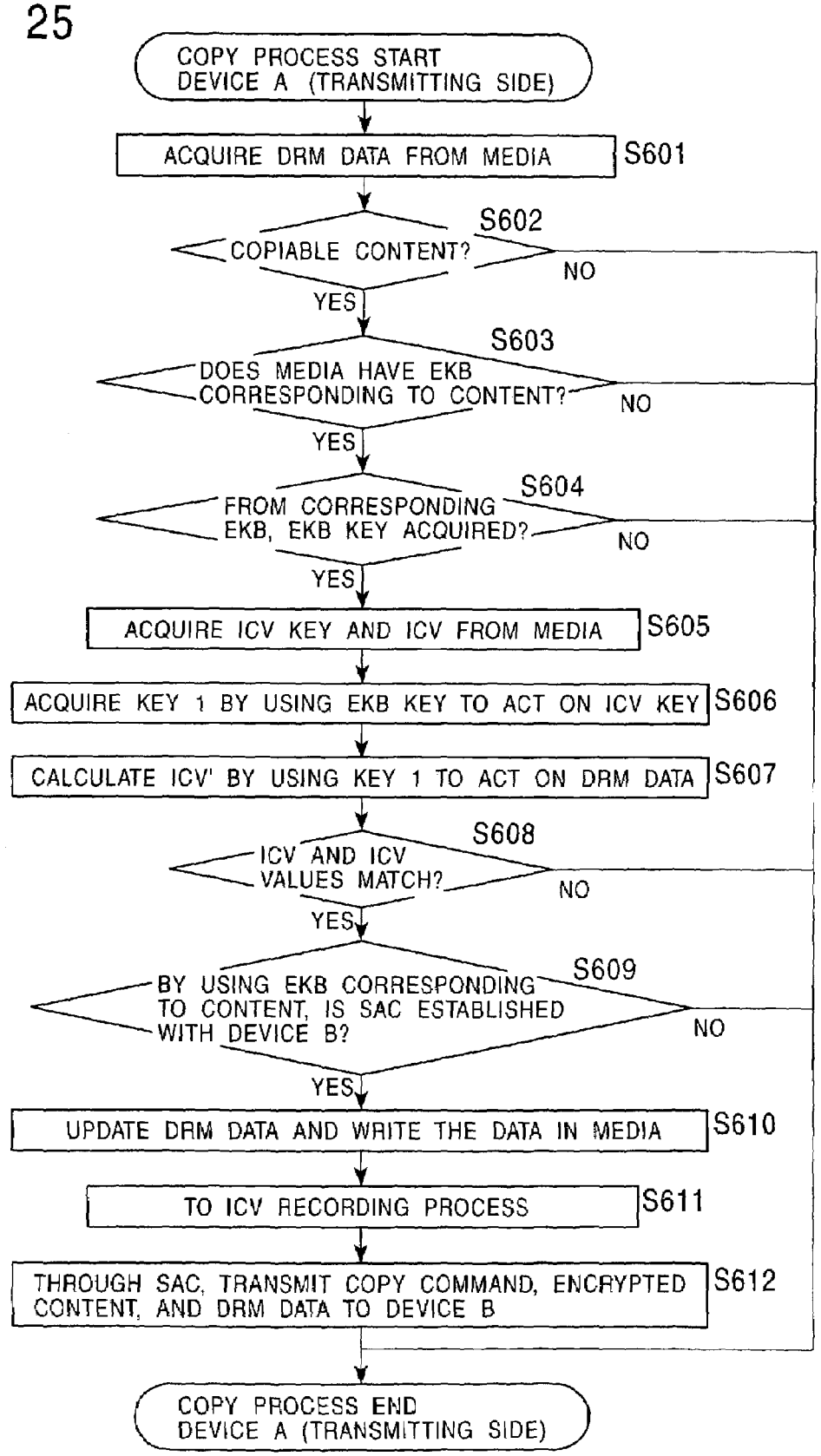
FIG. 25 is an illustration of a processing flow (example 1) by a user device as a copy source that executes a process for copying content between pieces of media in the system of the present invention.

The processes in the data transmitting side in the content copying are described using FIG. 24 and FIG. 25. They are described in accordance with the flow in FIG. 25 with reference to FIG. 24. Although FIG. 24 shows the encryption-processing means 1010 (corresponding to the encryption-processing means 150) of a device 1000 in a form functionally divided into processing units in accordance with the processing sequence, it does not show that the various processing units are separate, but simply shows each function as a divided block for description since each process is executed by the encryption-processing means 1010.

First, the user device 1000 reads, from the user area of media 1100, DRM data corresponding to content to be copied (S601). The DRM data includes rights data, a content ID, and an encrypted content key.

Next, by referring to the rights data in the DRM data, the device 100 determines whether or not the content may be copied (S602). When copying is not allowed, the sequence of the subsequent copy process is stopped and the process ends in a process error. When copying is allowed, in step S603, a search for the EKB of the content to be copied is performed, and in step S604, decryption on the EKB is executed in an EKB processor 1111 (see FIG. 24) by using the device's own key set (a leaf key and a node key), whereby acquisition of an EKB key is performed. At this time, when the device is revoked, etc., the EKB process using the key set stored in the device should fail, so that the EKB key cannot be acquired. In this case, the sequence of the subsequent copy process is stopped and the process ends in a process error.

Next, from the protected area of the media 1100, the device reads an ICV key and an ICV which correspond to the content (S605). This reading process is executed by using an IC 1131 as a dedicated secret-information recording/playback circuit for data playback processing in the protected area. Accordingly, the reading can be performed in only a device including the IC 1131.

When the reading of the ICV key and the ICV in step S605 is a success, by using the EKB key acquired in step S604 to act (e.g., DES encryption processing) on the acquired ICV key in a key generator (Func) 1112, key 1 (ICV-generation verifying key) is generated (S606).

Next, by using the key 1 (ICV-generation verifying key) generated in step S606 for the DRM data read from the user area of the media in step S601, the device generates a verifying integrity-check value (ICV') in an ICV generating means (Calculate ICV) 813 in accordance with the above-described construction in FIG. 2 (S607).

Next, comparison of the generating verifying integrity-check value (ICV') and the ICV read from the media in step S605 is performed (S608). If ICV=ICV' holds, it is determined that the DRM data is not falsified, and the device proceeds to the next step. If ICV=ICV' does not hold, it is determined that the DRM data is not falsified, the sequence of the subsequent copy processing flow is stopped and the process ends in a process error.

When ICV=ICV' holds, mutual authentication with a device receiving a copy is executed, and it is determined whether or not the establishment of the SAC (Secure Authenticated Channel) is a success (S609). The SAC establishing is executed by the above-described mutual authentication (see FIG. 21), and an authentication key (Kab) used therefor can be set as, for example, a key based on data obtained by decrypting an EKB corresponding to the content. When the SAC establishing fails, there is a possibility that the device receiving a copy is invalid, so that the sequence of the subsequent copy processing flow is stopped and the process ends in a process error.

When the establishment of the SAC (Secure Authenticated Channel) is a success, updating of the DRM data is executed (S610). Specifically, when the rights data of the DRM data includes, for example, setting such as the number of times copying can be performed: N, a process for rewriting the number of times copying can be performed into N−1. Also, a process in which a new integrity check value (ICV) is generated based on the rewritten DRM data and is written as an updated ICV in the media.

The generation of the ICV in the case of updating the DRM data is described using the processing block diagram in FIG. 24. The device uses a key generator 1122 such as a random number generator to generates the ICV key, and generates the ICV-generation verifying key by using the EKB key to act on the ICV key in the key generator (Func) 1122.

In addition, by using an ICV generating means (Calculate) 1123 to execute the ICV generating process described using FIG. 2 for the DRM data updated by using the ICV-generation verifying key, an updated integrity check value (ICV) based on the updated DRM data is generated.

Referring back to the flow in FIG. 25, the content copying process is continuously described. When the DRM data updating and the updated data writing process end in step S610, writing of the updated ICV is executed in step S611.

Next, the device 1000 outputs a copy command to a device 1200 through a SAC established with the device 1200 to which content is copied, and also transmits, to the device 1200, the encrypted content and DRM data read from the media 1100.

(a-2. Processes in Data Receiving Device)

Figure 26:
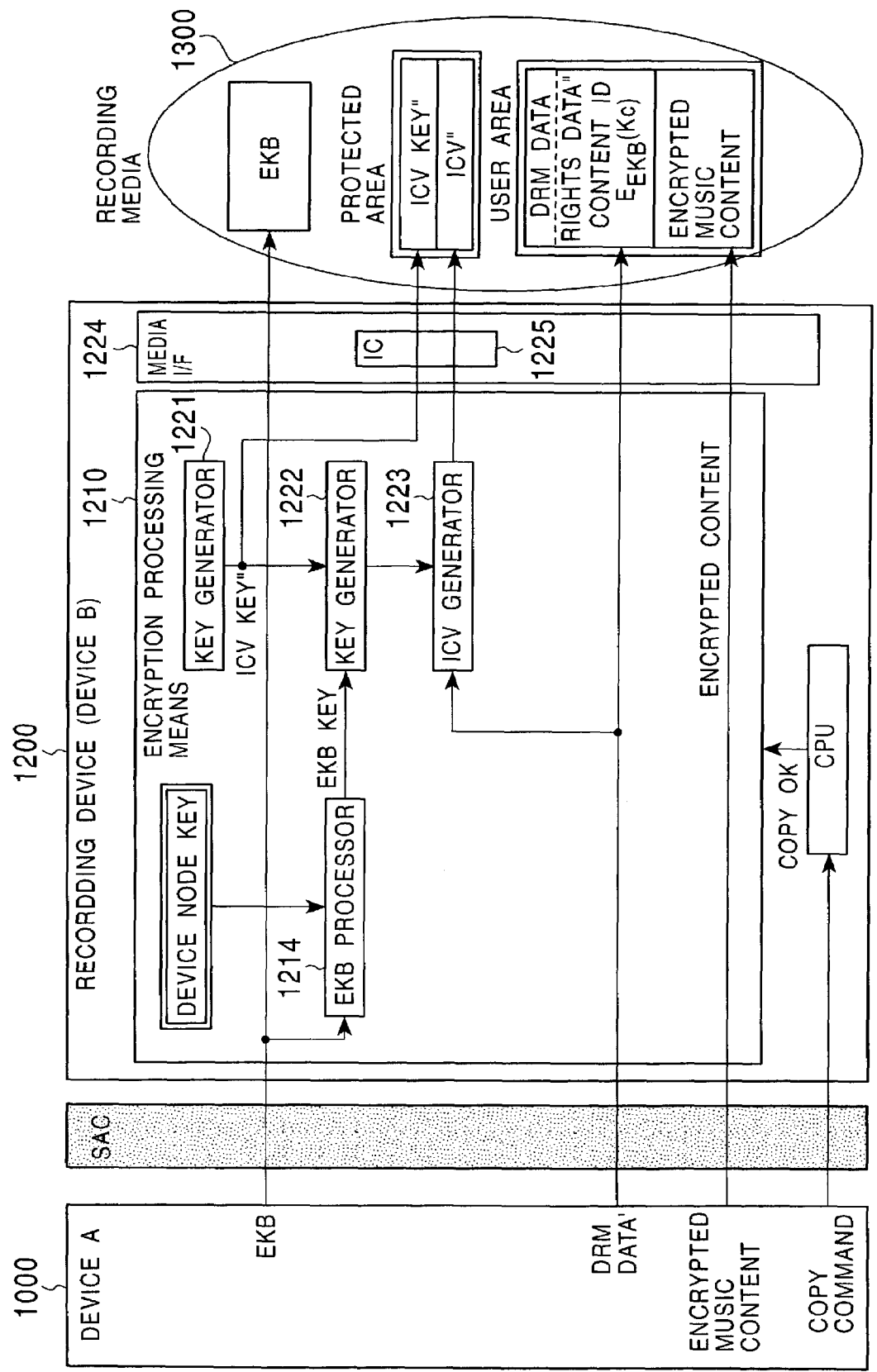
FIG. 26 is an illustration of the processing structure of a user device for receiving a copy which executes a process for copying content between pieces of media in the system of the present invention.
Figure 27:
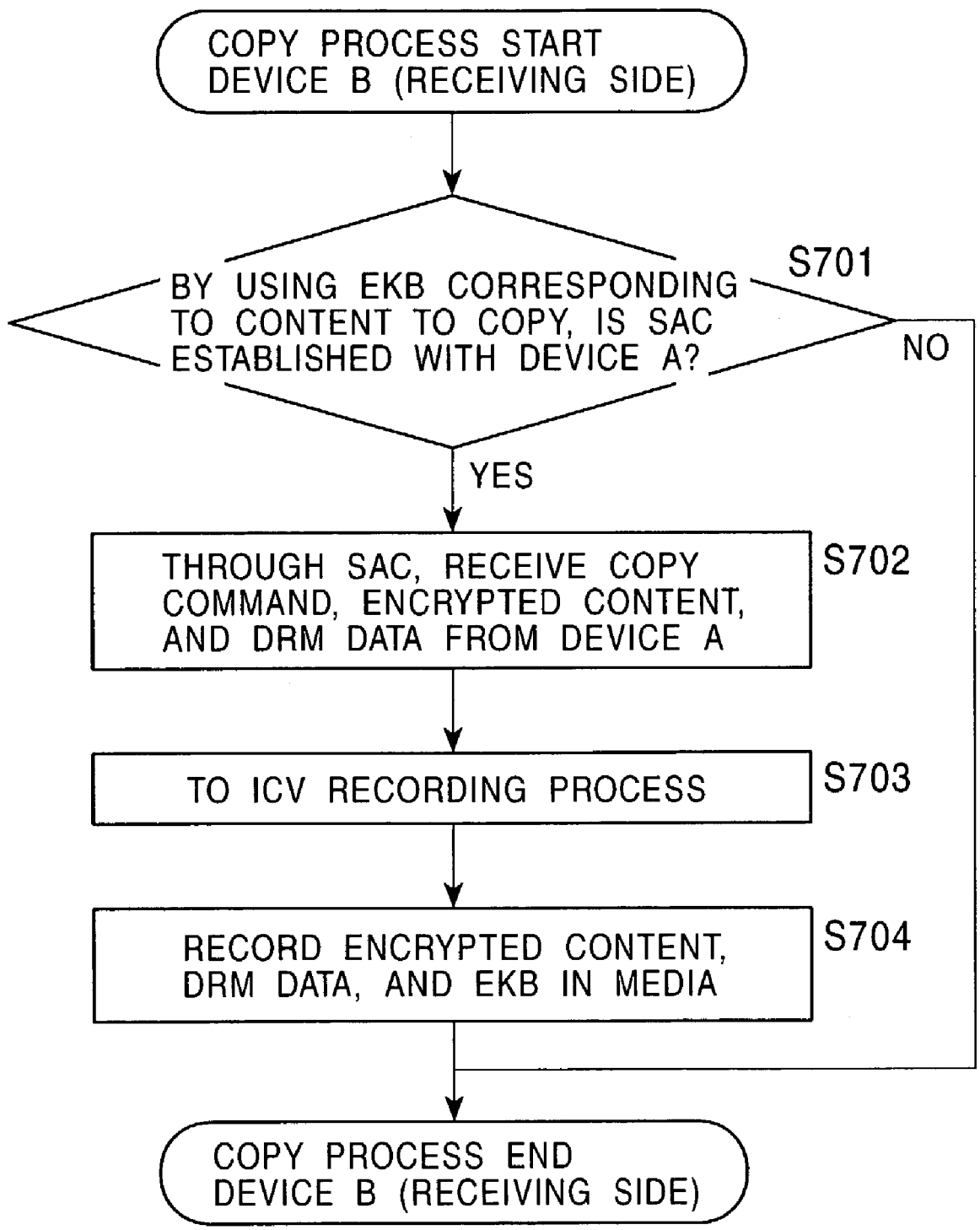
FIG. 27 is an illustration of a processing flow (example 1) by a user device for receiving a copy which executes a process for copying content between pieces of media in the system of the present invention.

Next, processes on the data receiving side are described using FIG. 26 and FIG. 27. They are described in accordance with the processing flow in FIG. 27 with reference to FIG. 26. Although FIG. 26 shows the encryption-processing means 1210 (corresponding to the encryption-processing means 150) of the device 1200 in a form functionally divided into processing units in accordance with the processing sequence, it does not show that the various processing units are separate, but simply shows each function as a divided block for description since each process is executed by the encryption-processing means 1210.

The processes are described in accordance with the processing flow in FIG. 27. First, the device determines whether or not the establishment of the SAC (Secure Authenticated Channel) is a success by executing mutual authentication with a copy source device (S701). The SAC establishing is executed by the above-described mutual authentication (see FIG. 21), and an authentication key Kab used therefor is set as, for example, a key based on data obtained by decrypting an EKB corresponding to content. When the SAC establishing fails, there is a possibility that the copy source device is invalid, so that the sequence of the subsequent copy processing flow is stopped and the process ends in a process error.

Next, the device receives the copy command through the SAC established with the device as the content copy source, and receives an encrypted content and DRM data from the copy source device (S702).

Next, the device executes ICV recording processing (S703). In the ICV recording processing, by using a key set (a leaf key and a node key) that the device 1200 possesses, EKB decryption processing is executed in an EKB processor (Process EKB) 1214. When acquisition of the EKB key is a success, then a key generator (Func) 1222 acquires key 1 (ICV-generation verifying key) by using the EKB key to act (e.g., DES encryption processing) on the ICV key generated by a key generator 1221, and an ICV generating means (Calculate ICV) 1223 generates an ICV in accordance with the processing construction in FIG. 2 by using key 1 (ICV-generation verifying key) to act on the DRM data (the rights data, the content ID, the encrypted content key).

The generated ICV key and ICV are recorded in the protected area of the media, and data to be checked based on the ICV, that is, the DRM data (the rights data, the content ID, the encrypted content key) is recorded in the user area of the media. In the case of the ICV key and ICV, a process by a dedicated IC 1225 as a dedicated secret-information recording circuit in a media interface 1224, that is, a process for writing to a specified area, or a particular signal-processing method is executed. Also, the received encrypted content is recorded in the user area of the media 1300 (S704).

In this construction, the processing load on the data receiving side is reduced since the updating of the DRM data and the ICV checking are executed by the data transmitting side. Next, processes on the data transmitting side and on the data receiving side in the case of updating the ICV are described.

(b-1. Process in Data Transmitting Device)

Figure 28:
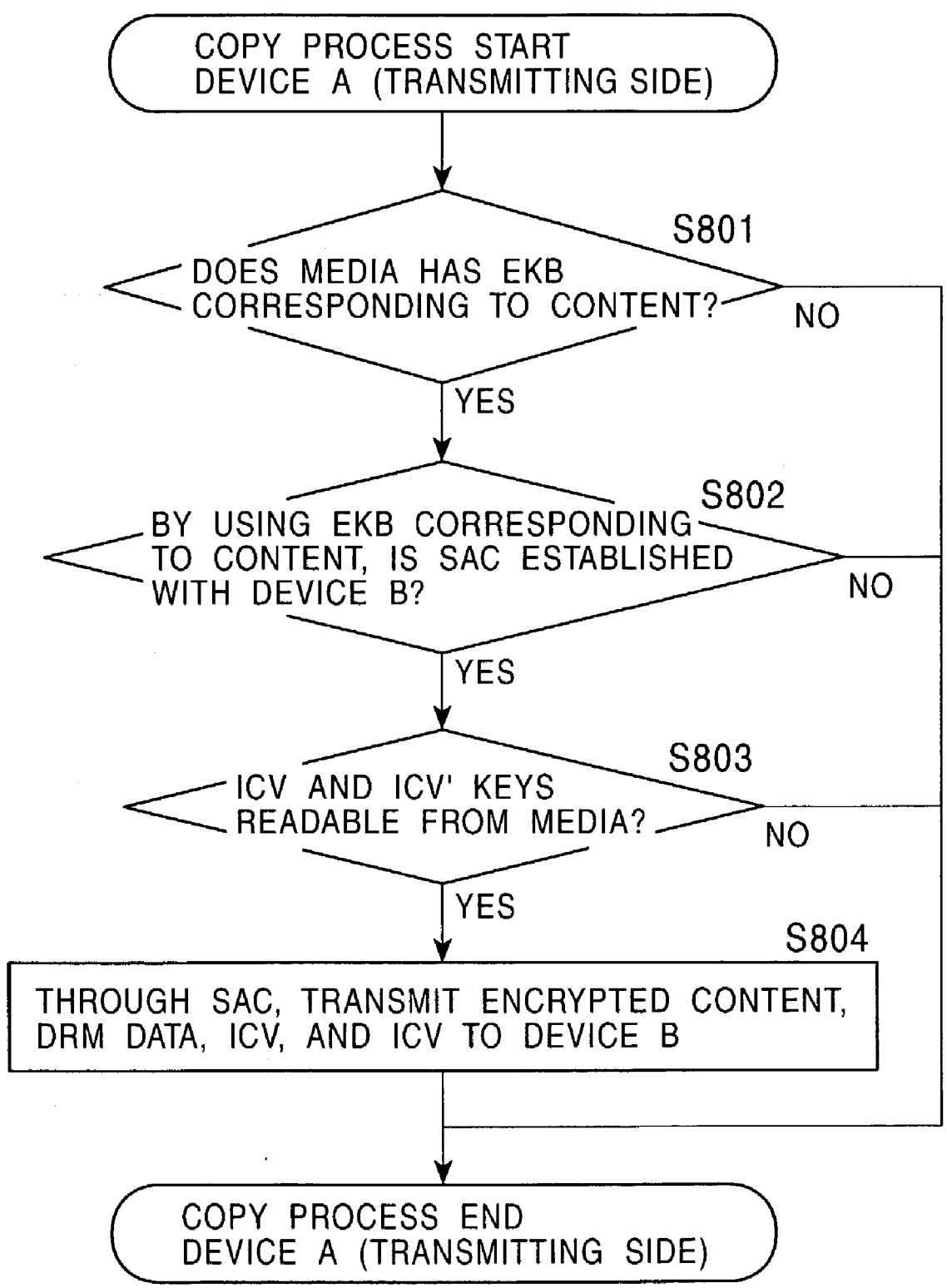
FIG. 28 is an illustration of a processing flow (example 2) by a user device for receiving a copy which executes a process for copying content between pieces of media in the system of the present invention.

The process on the data transmitting side in a case in which the ICV checking and the ICV updating are performed on the data receiving side is described in accordance with the flow in FIG. 28. In step S801, a search for the EKB of content to be copied is performed. When the EKB is not acquired, the sequence of the copy processing flow is stopped and the process ends in a process error.

Next, in step S802, by executing mutual authentication with a device receiving a copy, it is determined whether or not the establishment of a SAC (Secure Authenticated Channel) is a success. The SAC establishing is executed by the above-described mutual authentication process (see FIG. 21), and the authentication key Kab used therefor can be set as, for example, a key based on data obtained by decrypting the EKB corresponding to the content. When the SAC establishing fails, there is a possibility that the device receiving a copy is invalid, and the sequence of the subsequent copy processing flow is stopped and the process ends in a process error.

Next, in step S803, the device executes reading of the ICV key and the ICV which correspond to the protected area of the media. This reading process is executed by using an IC dedicated for playback processing on data in the protected area. Accordingly, only a device including the IC can perform reading. If the reading is impossible, the sequence of the subsequent copy processing flow is stopped and the process ends in a process error.

When the above process is a success, a copy command is output to the device receiving a copy through the SAC established with the device as one to which content is copied, and the encrypted content and the DRM data read from the media are transmitted to the device to which content is copied.

(b-2. Process in Data Receiving Device)

A process on the data receiving side in a case in which the ICV checking and the ICV updating are executed on the data receiving side is described. A recording device as the data receiving device records, in the media (e.g., a CD, a DVD, etc.), the content received as digital data from the data transmitting source. At this time, processing is executed in which the integrity check value (ICV) based on the updated DRM data for a restriction, as the rights data in the DRM data, on the number of times copying is performed is updated and written in the media.

Figure 29:
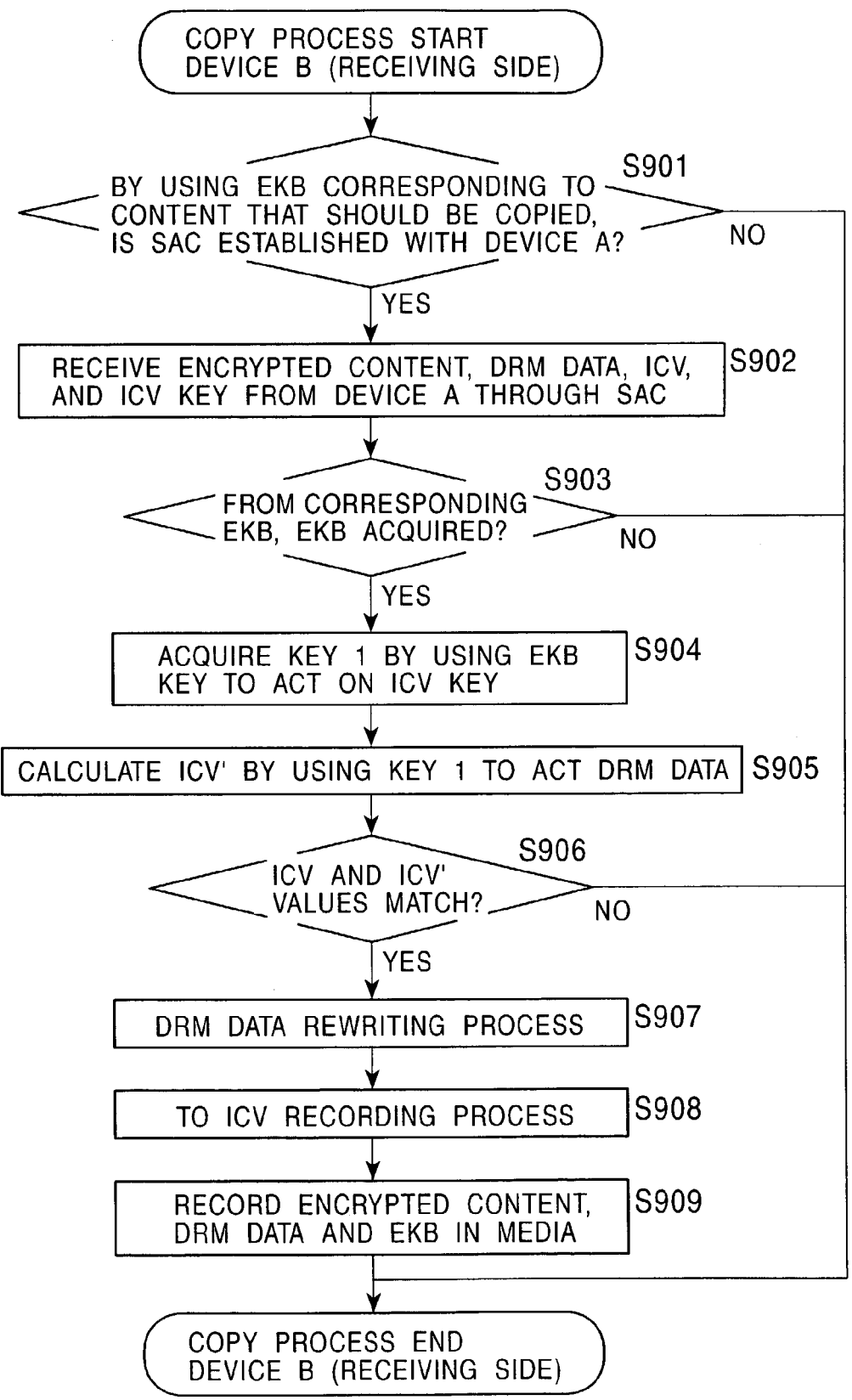
FIG. 29 is an illustration of a processing flow (example 2) by a user device for receiving a copy which executes a process for copying content between pieces of media in the system of the present invention.

The process on the data receiving side in the content copy process is described in accordance with the processing flow in FIG. 29 with reference to FIG. 26.

First, by executing mutual authentication with the device 1000 as a copy source, the user device 1200 determines whether or not the establishment of a SAC (Secure Authenticated Channel) is a success (S901). The SAC establishing is executed by the above-described mutual authentication process (see FIG. 21), and the authentication key Kab used therefor can be set as, for example, a key based on data obtained by decrypting the EKB corresponding to the content. When the SAC establishing fails, there is a possibility that the device receiving a copy is invalid, and the sequence of the subsequent copy processing flow is stopped and the process ends in a process error.

Next, the device 1200 receives the encrypted content, the DRM data, the ICV, and the ICV key through the SAC established with the device as a content copy source (S902).

Next, the user device 1200 performs acquisition of the EKB key by using its own key set (the leaf key and the node key) to execute decryption on the EKB in the EKB processor 1214 (S903). At this time, when the device is revoked, the EKB process using the key set stored in the device should fail, so that the EKB key cannot be acquired. In this case, the sequence of the subsequent copy processing flow is stopped and the process ends in a process error.

Next, the device 1200 acquires key 1 (ICV-generation verifying key) (S904) by using the EKB key acquired in step S903 to act (e.g., DES encryption processing) on the received ICV key in the key generator (Func) 1222.

Next, by using the key 1 (ICV-generation verifying key) generated in step S904 for the DRM data received from the copy source device 1000 in step S902, the device generates a verifying integrity-check value (ICV') (S905) in the ICV generating means (Calculate ICV) 1223 in accordance with the above-described construction in FIG. 2.

Next, comparison of the generated verifying integrity-check value (ICV') and the ICV received from the copy source device in step S902 is performed (S906). If ICV=ICV' holds, it is determined that the DRM data is not falsified, and the process proceeds to the next step. If ICV=ICV' does not hold, it is determined that the DRM data is falsified, so that the sequence of the subsequent copy processing flow is stopped and the process ends in a process error.

When ICV=ICV' holds, the DRM data rewriting processing (S907) and the ICV recording processing (S908) are executed. In the ICV recording processing, by using a key set (a leaf key and a node key) that the device 1200 possesses, EKB decryption processing is executed in an EKB processor (Process EKB) 1214. When acquisition of the EKB key is a success, then a key generator (Func) 1222 acquires key 1 (ICV-generation verifying key) by using the EKB key to act (e.g., DES encryption processing) on the ICV key generated by a key generator 1221, and an ICV generating means (Calculate ICV) 1223 generates an ICV in accordance with the processing construction in FIG. 2 by using key 1 (ICV-generation verifying key) to act on the DRM data (the rights data, the content ID, the encrypted content key).

The generated ICV key and ICV are recorded in the protected area of the media, and data to be checked based on the ICV, that is, the DRM data (the rights data, the content ID, the encrypted content key) is recorded in the user area of the media. In the case of the ICV key and ICV, a process by a dedicated IC 1225 as a dedicated secret-information recording circuit in a media interface 1224, that is, a process for writing to a specified area, or a particular signal-processing method is executed. Also, the received encrypted content is recorded in the user area of the media 1300 (S909).

In this construction, the processing load on the data transmitting side is reduced since the ICV checking is executed by the data receiving side.

(c-1. Process in Data Receiving Device)

Figure 30:
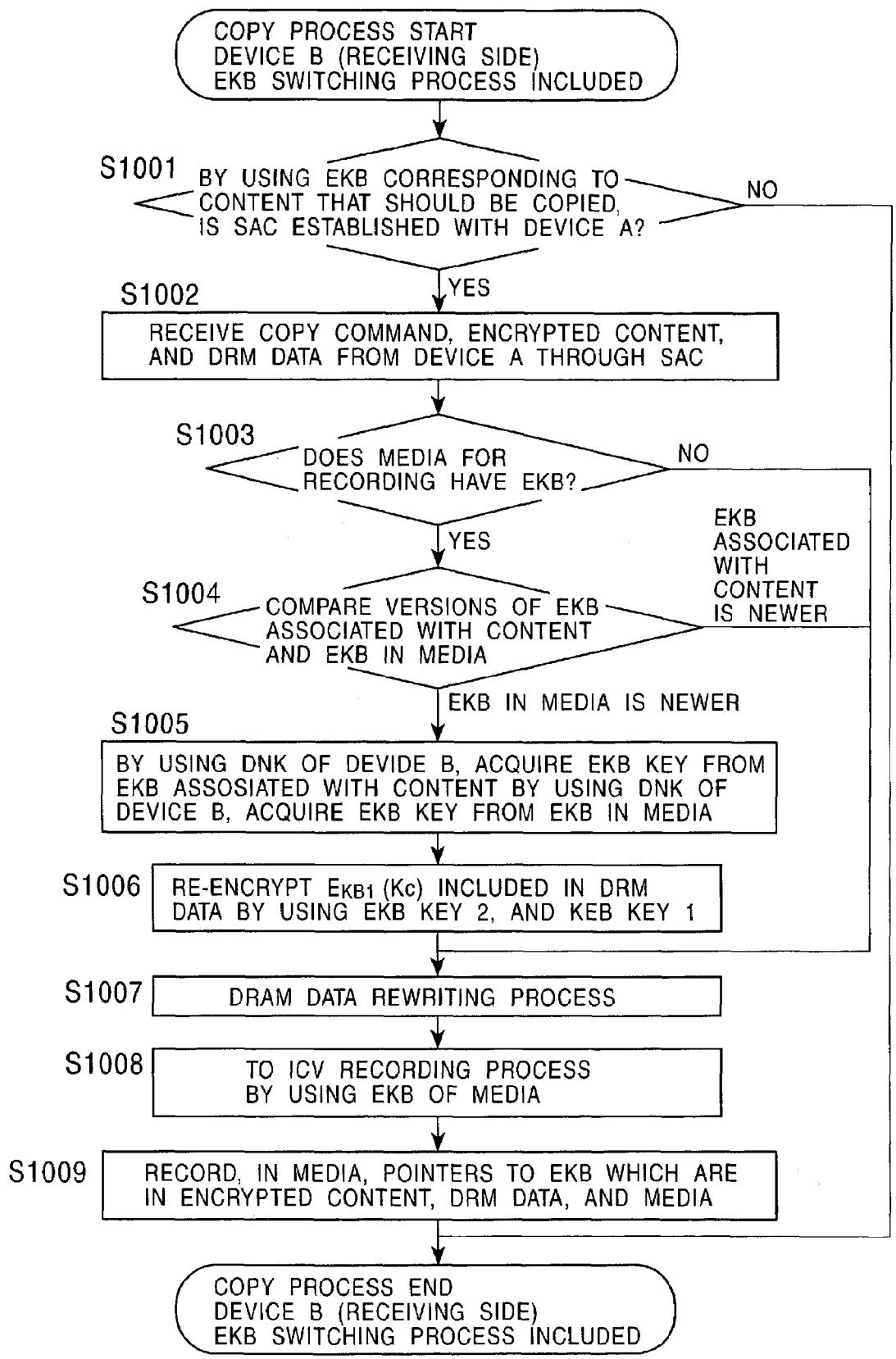
FIG. 30 is an illustration of a processing flow (example 3) by a user device for receiving a copy which executes a process for copying content between pieces of media in the system of the present invention.

Next, in a case in which, in the copy process, on the data receiving side, an EKB is stored in media in which content to be copied is recorded, and there is an EKB associated with the content to be copied, a process that executes comparison of EKB versions and records an EKB having a newer version so that it corresponds to the content is described in accordance with the processing flow in FIG. 30.

First, by executing mutual authentication with the copy source device, the user device determines whether or not the establishment of a SAC (Secure Authenticated Channel) is a success (S1001). The SAC establishing is executed by the above-described mutual authentication (see FIG. 21), and an authentication key Kab used therefor is set as, for example, a key based on data obtained by decrypting an EKB corresponding to content. When the SAC establishing fails, there is a possibility that the copy source device is invalid, so that the sequence of the subsequent copy processing flow is stopped and the process ends in a process error.

Next, the device receives a copy command through the SAC established with the content copy source device, and receives the DRM data from the copy source device (S1002).

Next, the user device determines whether or not an EKB is stored in media in which the content to be copied is recorded. When the EKB is not stored, the process proceeds to step S1007, and executes the processes of steps S1007 to S1009, the DRM data rewriting processing, the ICV recording processing, and the encrypted content recording processing. These processes are similar to the processes of S703 to S705 in the copy process described with reference to FIG. 27, and a description thereof is omitted.

When it is determined in step S1003 that the EKB is stored in the media in which the content to be copied is recorded, in step S1004, version comparison is executed between the EKB associated with the content and an EKB in the media. The EKB is sent from the device as the copy source, with the content.

When the EKB associated with the content is newer, the process proceeds to step S1007, and executes the processes in steps S1007 to S1009, that is, a DRM data rewriting process, an ICV recording process, and encrypted content recording process.

A description of these processes is omitted since they are similar to the processes in steps S703 to S705 in the copy process described with reference to FIG. 27.

When the EKB stored in the media is newer than the EKB associated with the content, in step S1005, the key set (the node key and the leaf key) of the device is used to acquire an EKB key (EKB key 1) from the EKB associated with the content, and an EKB key (EKB key 2) is acquired for the EKB stored in the media.

Next, switching processing on the encrypted key of the encrypted content key in the DRM data is executed. In other words, a process (S1006) is executed in which the content key encrypted by using the older version EKB key, that is, the EKB key (EKB key 1) for the EKB associated with the content is decrypted and is re-encrypted by using the EKB key (EKB key 2) stored in the media.

Next, the process proceeds to step S1007, and executes the processes in steps S1007 to S1009, that is, the DRM data rewriting process, the ICV recording process, and the encrypted content recording process. Then, when the EKB associated with the content is changed to the EKB of the media, a process for recording in the media a pointer indicating the position in the media of the EKB corresponding to the content is executed.

[5906]

In this processing construction, EKB updating is accelerated. In other words, when content is copied, a process is executed in which an old version EKB is rewritten into a new version EKB. For example, exclusion of invalid use of content by using an old version EKB in a revoked device is accelerated.

[Storage of EKB and ICV in Media]

Next, embodiments in which the EKB and the ICV are stored in media storing digital content, such as CDs and DVDs are described.

As is clear from the foregoing description, an encrypted content obtained by using a content key is stored in media. An EKB key for encrypting the content key is acquired, an EKB storing an EKB key for generating an ICV-generation verifying key for verifying the generation of an integrity check value (ICV) for DRM data is stored in the user area, and an integrity check value (ICV) based on the DRM data and the ICV key required for generating the ICV-generation verifying key is stored in the protected area.

In FIG. 31 are shown embodiments in which encrypted content, EKBs, ICVs, and ICV keys are stored. FIG. 31(A) shows a case in which EKBs unique to pieces of content are stored in the user area of media so that the pieces of content are correlated with the EKBs corresponding to the pieces of content. EKB 1 is correlated with content 1, EKB 2 is correlated with content 2, and EKB 3 is correlated with content 3.

Each integrity check value (ICVx) generated based on DRM data corresponding to each piece of content, and each ICV key are separately stored in the protected area.

However, as FIG. 31(A') shows, it is possible that one EKB be used for acquiring an EKB key for generating an encrypted key for a content key on each piece of content and an ICV-generation verifying key. In this case, in each piece of content, a pointer indicating the storage area of the EKB is set in the header part. In this structure, the data capacity is reduced and the efficiency of media use is increased.

Figure 32:
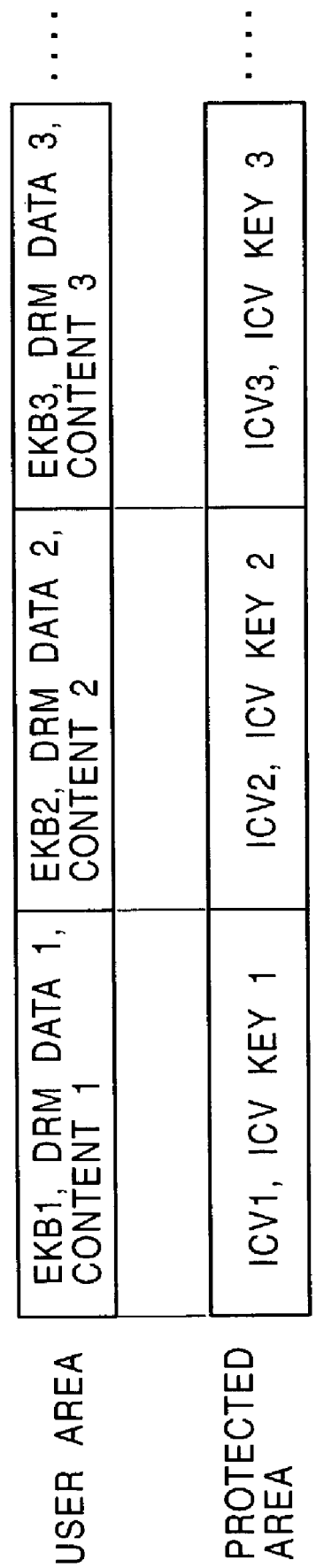
FIG. 32 is an illustration of a data storage form (example 1) of a user area and a protected area in media in the system of the present invention.

A specific recording system for the media is shown in FIG. 32(a). When EMF modulation as described above is used, a protected area is reserved so as to be superimposed on the same location where content is recorded in the user area. Accordingly, as FIG. 32(a) shows, the integrity check value (ICyx) and the ICV key are recorded in a superimposed form in the physically same location where the content is recorded, and the above-described dedicated IC is used to record/play back the integrity check value (ICVx) and the ICV key. For reading an ICV and an ICV key which correspond to recorded content, it is only necessary to scan the location when the content is recorded.

When the method shown in FIG. 32(a) is used, and the ICV and the ICV key must be rewritten by updating the DRM data, if the media is of a rewritable type, the values of the ICV and the ICV key simply need to be directly rewritten.

Figure 33:
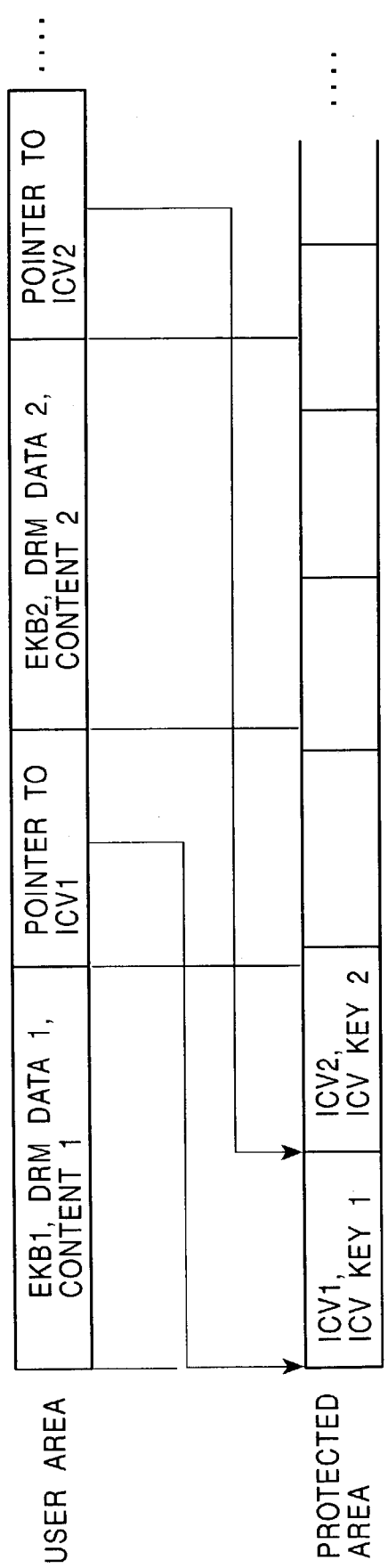
FIG. 33 is an illustration of a data storage form (example 2) of a user area and a protected area in media in the system of the present invention.

However, if the media is of an irrewritable type, the above method cannot be used since only the data recorded in the protected area cannot be rewritten without affecting the data recorded in the user area. In this case, as FIG. 33(b) shows, for each piece of content, an ICV and an ICV key are stored in a location physically separated from the location where the content is recorded, and may be rewritten based on updating of the DRM data.

Figure 34:
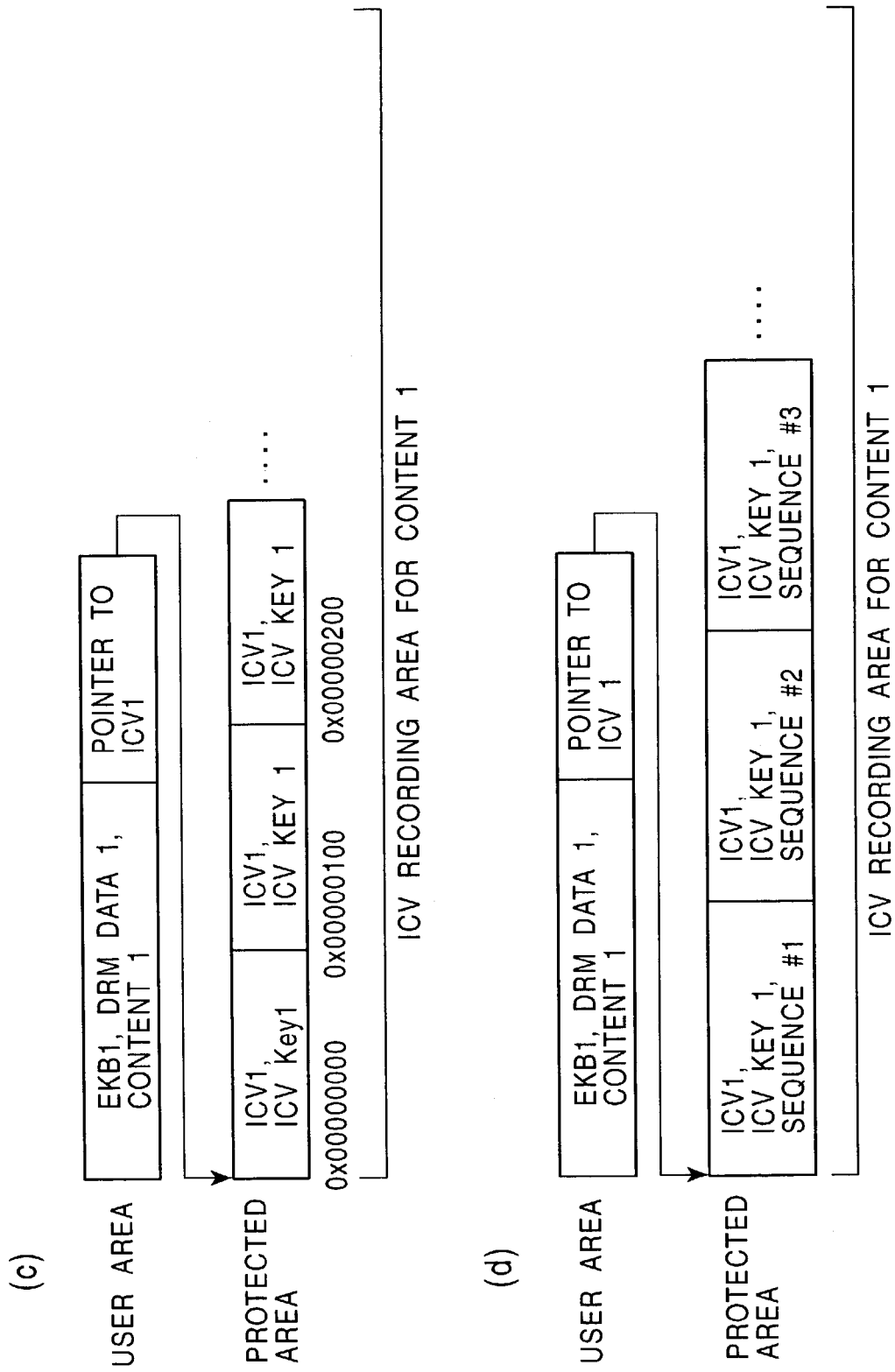
FIG. 34 is an illustration of a data storage form (example 3) of a user area and a protected area in media in the system of the present invention.

In addition, by reserving an area for storing updated data of the ICV and the ICV key beforehand, updated ICVs and ICV keys may sequentially be stored in the reserved area. In FIG. 34, (c) and (d) show that an ICV pointer for content 1 is a content continuing area, the position indicated by the ICV pointer is set as a storage area for the first ICV and ICV key, and storage areas for ICVs and ICV keys for pieces of updated DRM data are formed in a portion following the area. In (c), storage areas for updated ICVs and ICV keys are set for each predetermined byte area, while in (d), by storing sequence numbers in areas, latest data is identified depending on the sequence numbers.

Figure 35:
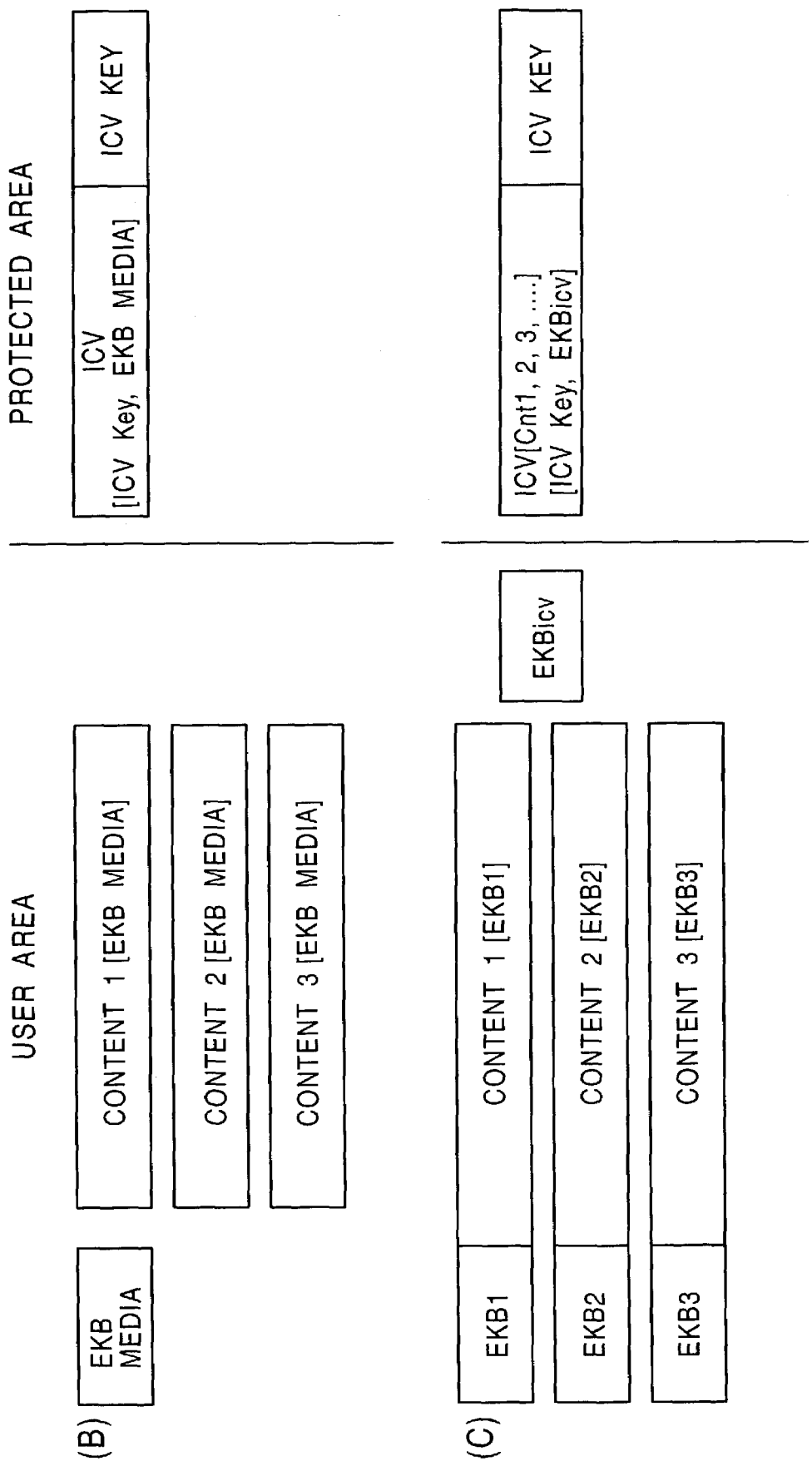
FIG. 35 is an illustration of a data storage form in media in the system of the present invention.

In addition, in FIG. 35(b) is shown a case in which an EKB (media EKB) is stored beforehand in the media. For example, when a media manufacturer manufactures data-writable media in which no data is written, it provides users with the media in a form in which the latest version EKB is recorded that time. When content is written in the media in which the media EKB is recorded, as described above, the user uses an encryption key acquired from the media EKB to execute content key encryption and also the generation of the ICV-generation verifying key. In this case, in the data storage configuration of the media, as FIG. 35(B) shows, the media EKB is stored in the user area, one or more pieces of content encrypted by using content keys encrypted by using an EKB key acquired from the media EKB are stored in the user area, and the ICV and the ICV key are stored in the protected area.

In FIG. 35(C) is shown a configuration in which an EKB key for encrypting the content key and an EKB key (EKBicv) for generating the ICV-generation verifying key are separately provided. In this case, it is possible that an EKB from which an EKB key for encrypting the content key can be acquired be variously formed similarly to those described using FIGS. 31 to 34. Separately therefrom, the EKB key (EKBicv) for generating the ICV-generation verifying key is stored in the user area.

As described above, when encrypted content is stored in media, an EKB for acquiring an EKB key for encrypting a content key, and an EKB for acquiring an EKB key for generating an ICV-generation verifying key for verifying the generation of an integrity check value (ICV) on DRM data are stored in the user area, and the ICV key required for generating the ICV-generation verifying key is stored in the protected area.

The storage form is not limited to the above cases. However, it is only required that the recording and playback of the integrity check value (ICV) generated based on the DRM data and the ICV-generation verifying key be executable only based on the dedicated IC, differently from the user area.

The present invention has been fully described with reference to specified embodiments. However, it is obvious that a person skilled in the art can correct and substitute the embodiments without departing from the gist of the present invention. In other words, the present invention has been disclosed in an exemplified form, and should not be interpreted in limited form. To determine the gist of the present invention, the section of the claims at the beginning should be considered.

INDUSTRIAL APPLICABILITY

As described above, according to an information recording device, an information playback device, an information recording method, an information playback method, an information recording medium, and a program storage medium of the present invention, in a digital recording medium (media) such as a CD and a DVD, rights data including content-use-restriction information, and DRM data including an encrypted content key are recorded, and an integrity check value (ICV) for the DRM data is stored in an area (protected area) in which recording/playback can be performed by only a dedicated IC different from that in an ordinary recording/playback method, whereby unauthorized use of content due to rewriting of rights data is prevented.

Also, according to the present invention, by using EKB distribution to execute the tree-structure key distribution to distribute keys for generating ICV-generation verifying keys, only a valid device capable of decrypting an EKB can acquire an EKB key, and ICV verification and generation and use of content which are based on acquisition of the EKB key are set to be executable, whereby EKB updating can execute revocation of an invalid device, as required.

Moreover, according to the present invention, by using EKB distribution to execute the tree-structure key distribution to distribute keys for generating ICV-distribution to distribute keys for generating ICV-generation verifying keys, and by providing media to users in a form in which the latest version media EKB is stored, a user device can execute updating to an newer version EKB after executing EKB versions, whereby EKB updating processing is accelerated, and use by an invalid device of content using an older version EKB can early be revoked.

The invention claimed is:

1. An information recording device for executing data-recording processing to a recording medium, said information recording device comprising:
   encryption-processing means which generates encrypted content by executing a process for encrypting content to be stored in the recording medium and which generates an integrity check value (ICV) based on an enabling key block (EKB) key, the ICV being associated with digital-rights-management (DRM) data on content including use-restriction information on content; and
   a dedicated secret-information recording circuit which is used for a process for recording the integrity check value (ICV) on a physically protected area on the recording medium and which is not used for a process for recording the encrypted content.

2. An information recording device according to claim 1, wherein said digital-rights-management (DEN) data includes information on use of the content, an encrypted content key obtained by encrypting a content key serving as a content encryption key, and a content identifier (ID).

3. An information recording device according to claim 1, wherein the dedicated secret-information recording circuit has a structure in which a process for recording the integrity check value (ICV) in the physically protected area on the recording medium is executed by using signal processing different from the signal processing used for a method for recording the content.

4. An information recording device according to claim 1, wherein:
   the dedicated secret-information recording circuit has a structure in which a process for recording the integrity check value (ICV) in the physically protected area on the recording medium is executed by using signal processing different from the signal processing used for a method for recording the content; and
   the dedicated secret-information recording circuit has a structure which executes a process for recording secret information, which includes the integrity check value (ICV), in a recording area superimposed on a recording area on a recording medium for content corresponding to the secret information.

5. An information recording device according to claim 1, wherein the dedicated secret-information recording circuit has a structure which executes the process for recording the integrity check value (ICV) in the physically protected area on the recording medium when the physically protected area is formed separately from a recording area for the content.

6. An information recording device according to claim 1, wherein the dedicated secret-information recording circuit has a structure which executes the process of recording, in the physically protected area on the recording medium, both the integrity check value (ICV) for the digital-rights-management (DRM) data on the content, and an ICV key used for generating an ICV-generation verifying key for verifying the generation of the ICV.

7. An information recording device according to claim 1, wherein said encryption-processing means has a structure in which the process for generating the integrity check value (ICV) for the digital-rights-management (DRM) data is executed as a message-authentication-code (MAC) generating process in which DES encryption processing is used.

8. An information recording device according to claim 1, wherein:
  said information recording device possesses, in a hierarchical tree structure having a plurality of different information recording devices serving as leaves, different key sets of node keys unique to nodes and leaf keys unique to the information recording devices; and
  the enabling key block (EKB) key is acquired by decrypting an EKB which can be decrypted only by a selected information recording device included in the leaves in said hierarchical tree structure.

9. An information recording device according to claim 8, wherein said encryption-processing means has a structure in which, from a usable enabling key block (EKB) stored in one information recording device, and an enabling key block (EKB) stored in a recording medium for content storage, an EKB having a newer version is selected and an EKB key is acquired.

10. An information recording device according to claim 8, wherein said encryption-processing means has a structure in which, by using the EKB key acquired by the process of decrypting the enabling key block (EKB), encryption on a content key, serving as an encrypted key for the content, is executed.

11. An information recording device according to claim 1, wherein said encryption-processing means has a structure in which, in the process of recording the content in the recording medium, when an integrity check value (ICV) for digital-rights-management (DRM) data corresponding to the content is added, a process for verifying the ICV is executed, and on condition that it is verified that there is no falsification of the digital-rights-management (DRM) data, processing associated with the process of recording the content in the recording medium is executed.

12. An information recording device according to claim 1, wherein said encryption-processing means has a structure in which, in the process of recording the content in the recording medium, when the content is transmitted from another device, processing associated with the process of recording the content in the recording medium is executed on condition that mutual authentication with the device is established.

13. An information recording device according to claim 1, wherein said encryption-processing means has a structure in which, in the process of recording the content in the recording medium, when updating of the digital-rights-management (DRM) data is executed, an integrity check value (ICV) based on the updated digital-rights-management (DRM) data is generated, and in the recording medium, the integrity check value (ICV) based on the updated digital-rights-management (DRM) data is recorded.

14. An information recording device according to claim 13, wherein, in the case of the updated integrity check value (ICV), a process for overwriting the integrity check value (ICV) is executed before the updating.

15. An information recording device according to claim 13, wherein, in the case of the updated integrity check value (ICV), a process for recording to an area different from the recording area of the integrity check value (ICV) is executed before the updating.

16. An information playback device for executing data-playback processing from a recording medium, said information playback device comprising:
  cryptosystem-processing means which executes a process for decrypting content stored in the recording medium and which executes verification of an integrity check value (ICV) for digital-rights-management data (DRM) on content including use-restriction information on content, the ICV being based on an enabling key block (EKB) key; and
  a dedicated secret-information playback circuit which is used for a process for playing back the integrity check value (ICV) from a physically protected area on the recording medium and which is not used for a process for playing back the encrypted content.

17. An information playback device according to claim 16, wherein said digital-rights-management (DRM) data includes information on use of the content, an encrypted content key obtained by encrypting a content key serving as a content encryption key, and a content identifier (ID).

18. An information playback device according to claim 16, wherein the dedicated secret-information playback circuit has a structure in which a process for playing back the integrity check value (ICV) from the physically protected area on the recording medium is executed by using signal processing different from signal processing used for a method of playing back the content.

19. An information playback device according to claim 16, wherein:
  the dedicated secret-information playback circuit has a structure in which a process for playing back the integrity check value (ICV) from the physically protected area on the recording medium is executed by using signal processing different from signal processing used for a method of playing back the content; and
  the dedicated secret-information playback circuit has a structure which executes a process for playing back secret information, which includes the integrity check value (ICV), from a recording area superimposed on a recording area on a recording medium for content corresponding to the secret information.

20. An information playback device according to claim 16, wherein the dedicated secret-information playback circuit has a structure which executes the process for playing back the integrity check value (ICV) from the physically protected area on the recording medium when the physically protected area is formed separately from a recording area for the content.

21. An information playback device according to claim 16, wherein the dedicated secret-information playback circuit has a structure which executes the process of playing back the integrity check value (ICV) for the digital-rights-management (DRM) data on the content and an ICV key used for generating an ICV-generation verifying key for verifying the generation of the ICV from the physically protected area on the recording medium.

22. An information playback device according to claim 16, wherein the verification of the integrity check value (ICV) for the digital-rights-management (DRM) data is executed as processing in which a message authentication code (MAC) in which DES encryption processing is used for the played back digital-rights-management (DRM) and is compared with a recorded ICV.

23. An information playback device according to claim 16, wherein:
said information playback device possesses, in a hierarchical tree structure having a plurality of different information recording devices serving as leaves, different key sets of node keys unique to nodes and leaf keys unique to the information recording devices; and
the enabling key block (EKB) key is acquired by decrypting an EKB which can be decrypted only by a selected information playback device included in the leaves in said hierarchical tree structure.

24. An information playback device according to claim 23, wherein said cryptosystem-processing means has a structure in which the EKB key is acquired by selecting an enabling key block (EKB) correlated with content stored in the recording medium storing the content.

25. An information playback device according to claim 23, wherein said cryptosystem-processing means has a structure in which decryption of the content key, serving as an encrypted key for the content, is executed by using the EKB key acquired by the process for decrypting the enabling key block (EKB).

26. An information playback device according to claim 16, wherein said cryptosystem-processing means has a structure in which, in the process for playing back the content from the recording medium, the verifying processing on the integrity check value (ICV) for the digital-rights-management (DRM) data corresponding to the content is executed, and on condition that it is verified that there is no falsification of the digital-rights-management (DRM) data, processing associated with the process of playing back the content from the recording medium is executed.

27. An information playback device according to claim 16, wherein said cryptosystem-processing means has a structure in which, in the process of playing back the content from the recording medium, when the content is transmitted from another device, processing associated with the process of transmitting the content in the recording medium is executed on condition that mutual authentication with the device is established.

28. An information playback device according to claim 16, wherein, in the process of playing back the content from the recording medium, when updating of the digital-rights-management (DRM) data is executed, said cryptosystem-processing means generates an integrity check value (ICV) based on the updated digital-rights-management (DRM) data, and records in the recording medium the integrity check value (ICV) based on the updated digital-rights-management (DRM) data.

29. An information playback device according to claim 28, wherein, in the case of the updated integrity check value (ICV), a process for overwriting the integrity check value (ICV) is executed before the updating.

30. An information playback device according to claim 28, wherein, in the case of the updated integrity check value (ICV), a process for recording to an area different from the recording area of the integrity check value (ICV) is executed before the updating.

31. An information recording medium on which content data capable of being played back is recorded, wherein an integrity check value (ICV) for digital-rights-management (DRM) data of content including use-restriction information on content is generated based on an enabling key block (EKB) key and stored in a physically protected area on the recording medium;
wherein the integrity check value is secret information.

32. An information recording medium according to claim 31, wherein said digital-rights-management (DRM) data includes information on use of the content, an encrypted content key obtained by encrypting a content key serving as a content encryption key, and a content identifier (ID).

33. An information recording medium according to claim 31, wherein said physically protected area has a structure based on a data recording area for which signal processing different from signal processing used for a method for recording the content is used.

34. An information recording medium according to claim 31, wherein said physically protected area is a data recording area for which signal processing different from signal processing used for a method for recording the content is used, and is an area superimposed on a recording area on a recording medium for the corresponding content.

35. An information recording medium according to claim 31, wherein said physically protected area is provided separately from a recording area for the content.

36. An information recording medium according to claim 31, wherein, in said physically protected area, both an integrity check value (ICV) for digital-rights-management (DRM) data on the content, and an ICV key used for generating an ICV-generation verifying key for verifying the generation of the ICV are stored.

37. An information recording method for executing data recording processing to a recording medium, said information recording method comprising:
an encryption-processing step which generates encrypted content by executing a process for encrypting content to be stored in the recording medium and which generates an integrity check value (ICV) based on an enabling key block (EKB) key, the ICV being associated with digital-rights-management (DRM) data on content including use-restriction information on content; and
a secret-information recording step which, by using a dedicated secret-information recording circuit, executes a process for recording the integrity check value (ICV) in a physically protected area on the recording medium.

38. An information recording method according to claim 37, wherein said digital-rights-management (DRM) data includes information on use of the content, an encrypted content key obtained by encrypting a content key serving as a content encryption key, and a content identifier (ID).

39. An information recording method according to claim 37, wherein, by using said dedicated secret-information recording circuit, signal processing different from signal processing used for a method for recording the content is used to execute a process for recording of the integrity check value (ICV) in the physically protected area on the recording medium.

40. An information recording method according to claim 37, wherein, in said secret-information recording step:
by using said dedicated secret-information recording circuit, signal processing different from signal processing used for a method for recording the content is used to execute a process for recording of the integrity check value (ICV) in the physically protected area on the recording medium; and said dedicated secret-information recording circuit is used to execute a process for recording secret information including the integrity check value (ICV) in an area superimposed on a recording area on a recording medium for the corresponding content.

41. An information recording method according to claim 37, wherein, in said secret-information recording step, said dedicated secret-information recording circuit is used to execute a process for recording the integrity check value (ICV) in the physically protected area on the recording medium which is provided separately from a recording area for the content.

42. An information recording method according to claim 37, wherein, in said secret-information recording step, said dedicated secret-information recording circuit is used to execute a process for recording, in the physically protected area on the recording medium, both the integrity check value (ICV) for the digital-rights-management (DRM) data on the content, and an ICV key used for generating an ICV-generation verifying key for verifying the generation of the ICV.

43. An information recording method according to claim 37, wherein, in said encryption-processing step, the process for generating the integrity check value (ICV) for the digital-rights-management (DRM) data is executed as a message-authentication-code (MAC) generating process in which DES encryption processing is used.

44. An information recording method according to claim 37, wherein:

an information recording device possesses, in a hierarchical tree structure having a plurality of different information recording devices serving as leaves, different key sets of node keys unique to nodes and leaf keys unique to the information recording devices; and the EKB key is acquired by decrypting an EKB which can be decrypted only by a selected information recording device included in the leaves in said hierarchical tree structure.

45. An information recording method according to claim 44, wherein said encryption-processing step further includes a step in which, from a usable enabling key block (EKB) stored in one information recording device, and an enabling key block (EKB) stored in a recording medium for content storage, an EKB having a newer version is selected and an EKB key is acquired.

46. An information recording method according to claim 44, wherein said encryption-processing step further includes a step in which, by using the EKB key acquired by the process of decrypting the enabling key block (EKB), encryption on a content key, serving as an encrypted key for the content, is executed.

47. An information recording method according to claim 37, wherein, in said encryption-processing step, in the process of recording the content in the recording medium, when an integrity check value (ICV) for digital-rights-management (DRM) data corresponding to the content is added, a process for verifying the ICV is executed, and on condition that it is verified that there is no falsification of the digital-rights-management (DRM) data, processing associated with the process of recording the content in the recording medium is executed.

48. An information recording method according to claim 37, wherein, in the process of recording the content in the recording medium, when the content is transmitted from another device, processing associated with the process of recording the content in the recording medium is executed on condition that mutual authentication with the device is established.

49. An information recording method according to claim 37, further comprising a step in which, in the process of recording the content in the recording medium, when updating of the digital-rights-management (DRM) data is executed, said encryption-processing means generates an integrity check value (ICV) based on the updated digital-rights-management (DRM) data, and records in the recording medium the integrity check value (ICV) based on the updated digital-rights-management (DRM) data.

50. An information recording method according to claim 49, wherein, in the case of the updated integrity check value (ICV), a process for overwriting the integrity check value (ICV) is executed before the updating.

51. An information recording method according to claim 49, wherein, in the case of the updated integrity check value (ICV), a process for recording to an area different from the recording area of the integrity check value (ICV) is executed before the updating.

52. An information playback method for executing data-playback processing from a recording medium, said information playback method comprising:

a cryptosystem-processing step which executes a process for decrypting content stored in the recording medium and which executes verification of an integrity check value (ICV) for digital-rights-management data (DRM) on content including use-restriction information on content, the ICV being based on an enabling key block (EKB) key; and a secret information playback step which, by using a dedicated secret-information playback circuit, executes a process for playing back the integrity check value (ICV) from a physically protected area on the recording medium.

53. An information playback method according to claim 52, wherein said digital-rights-management (DRM) data includes information on use of the content, an encrypted content key obtained by encrypting a content key serving as a content encryption key, and a content identifier (ID).

54. An information playback method according to claim 52, wherein, by using said dedicated secret-information playback circuit, a process for playing back the integrity check value (ICV) from the physically protected area on the recording medium is executed by using signal processing different from signal processing used for a method for playing back the content.

55. An information playback method according to claim 52, wherein, in said secret information playback step:

by using the dedicated secret-information playback circuit, a process for playing back the integrity check value (ICV) from the physically protected area on the recording medium is executed by using signal processing different from signal processing used for a method of playing back the content; and by using the dedicated secret-information playback circuit, a process for playing back the secret information, which includes the integrity check value (ICV), from a recording area superimposed on a recording area on a recording medium for the corresponding content is executed.

56. An information playback method according to claim 52, wherein, in said secret information playback step, the dedicated secret-information playback circuit is used to execute the process for playing back the integrity check value (ICV) from the physically protected area on the recording medium when the physically protected area is formed separately from a recording area for the content.

57. An information playback method according to claim 52, wherein, in said secret information playback step, the dedicated secret-information playback circuit is used to execute the process of playing back the integrity check value (ICV) for the digital-rights-management (DRM) data on the content and an ICV key used for generating an ICV-generation verifying key for verifying the generation of the ICV from the physically protected area on the recording medium.

58. An information playback method according to claim 52, wherein, in said cryptosystem-processing step, the verification of the integrity check value (ICV) for the digital-rights-management (DRM) data is executed as processing in which a message authentication code (MAC) in which DES encryption processing is used for the played back digital-rights-management (DRM) and is compared with a recorded ICV.

59. An information playback method according to claim 52, wherein:
- an information playback device possesses, in a hierarchical tree structure having a plurality of different information recording devices serving as leaves, different key sets of node keys unique to nodes and leaf keys unique to the information recording devices; and
- the enabling key block (EKB) key is acquired by decrypting an EKB which can be decrypted only by a selected information playback device included in the leaves in said hierarchical tree structure.

60. An information playback method according to claim 59, wherein said cryptosystem-processing step further includes a step in which the EKB key is acquired by selecting an enabling key block (EKB) correlated with content stored in the recording medium storing the content.

61. An information playback method according to claim 59, wherein said cryptosystem-processing step further includes a step in which decryption of the content key, serving as an encrypted key for the content, is executed by using the EKB key acquired by the process for decrypting the enabling key block (EKB).

62. An information playback method according to claim 52, wherein, in said cryptosystem-processing step, in the process for playing back the content from the recording medium, the verifying processing on the integrity check value (ICV) for the digital-rights-management (DRM) data corresponding to the content is executed, and on condition that it is verified that there is no falsification of the digital-rights-management (DRM) data, processing associated with the process of playing back the content from the recording medium is executed.

63. An information playback method according to claim 52, wherein, in the process of playing back the content from the recording medium, when the content is transmitted from another device, processing associated with the process of transmitting the content in the recording medium is executed on condition that mutual authentication with the device is established.

64. An information playback method according to claim 52, further comprising a step in which, in the process of playing back the content from the recording medium, when updating of the digital-rights-management (DRM) data is executed, said encryption-processing means generates an integrity check value (ICV) based on the updated digital-rights-management (DRM) data, and records in the recording medium the integrity check value (ICV) based on the updated digital-rights-management (DRM) data.

65. An information playback method according to claim 64, wherein, in the case of the updated integrity check value (ICV), a process for overwriting the integrity check value (ICV) is executed before the updating.

66. An information playback method according to claim 64, wherein, in the case of the updated integrity check value (ICV), a process for recording to an area separate from the recording area of the integrity check value (ICV) is executed before the updating.

67. A program storage medium for providing a computer program for controlling a computer system to execute data recording processing to a recording medium,
said computer program comprising:
- an encryption-processing step which generates encrypted content by executing a process for encrypting content to be stored in the recording medium and which generates an integrity check value (ICV) based on an enabling key block (EKB) key, the ICV being associated with digital-rights-management (DRM) data on content including use-restriction information on content; and
- a secret-information recording step which, by using a dedicated secret-information recording circuit, executes a process for recording the integrity check value (ICV) in a physically protected area on the recording medium.

68. A program storage medium for providing a computer program for controlling a computer system to execute data playback processing from a recording medium,
said computer program comprising:
- a cryptosystem-processing step which executes a process for decrypting content stored in the recording medium and which executes verification of an integrity check value (ICV) for digital-rights-management data (DRM) on content including use-restriction information on content the ICV being based on an enabling key block (EKB) key; and
- a secret information playback step which, by using a dedicated secret-information playback circuit, executes a process for playing back the integrity check value (ICV) from a physically protected area on the recording medium.

* * * * *